US011074235B2

(12) United States Patent
Goyal et al.

(10) Patent No.: US 11,074,235 B2
(45) Date of Patent: Jul. 27, 2021

(54) INCLUSION DEPENDENCY DETERMINATION IN A LARGE DATABASE FOR ESTABLISHING PRIMARY KEY-FOREIGN KEY RELATIONSHIPS

(71) Applicant: IO-Tahoe LLC, Jersey City, NJ (US)

(72) Inventors: Ram Dayal Goyal, Bengaluru (IN); Rohit Mahajan, Iselin, NJ (US)

(73) Assignee: IO-Tahoe LLC, New York, NY (US)

( * ) Notice: Subject to any disclaimer, the term of this patent is extended or adjusted under 35 U.S.C. 154(b) by 740 days.

(21) Appl. No.: 15/673,511

(22) Filed: Aug. 10, 2017

(65) Prior Publication Data

US 2019/0050437 A1  Feb. 14, 2019

(51) Int. Cl.
*G06F 16/22* (2019.01)
*G06F 16/21* (2019.01)

(52) U.S. Cl.
CPC ........ *G06F 16/2272* (2019.01); *G06F 16/211* (2019.01); *G06F 16/2282* (2019.01)

(58) Field of Classification Search
CPC .................................................. G06F 16/2272
USPC ........................................................ 707/802
See application file for complete search history.

(56) References Cited

U.S. PATENT DOCUMENTS

| | | |
|---|---|---|
| 7,349,898 B2 | 3/2008 | Gonzalez |
| 7,426,520 B2 | 9/2008 | Gorelik et al. |
| 7,685,086 B2 | 3/2010 | Brown et al. |
| 7,725,498 B2 | 5/2010 | Barsness et al. |
| 8,924,429 B1 | 12/2014 | Fisher et al. |
| 9,336,246 B2 | 5/2016 | Gorelik et al. |
| 2002/0095397 A1* | 7/2002 | Koskas ............. G06F 16/24534 |
| 2003/0217071 A1* | 11/2003 | Kobayashi ............... G06F 40/58 |
| 2004/0133581 A1* | 7/2004 | Shinjo .................... G06F 16/258 |
| 2005/0240615 A1* | 10/2005 | Barsness ............... G06F 16/221 |

(Continued)

FOREIGN PATENT DOCUMENTS

CN        105095522 A        11/2015

OTHER PUBLICATIONS

Jana Bauckmann, Ulf Leser, Felix Naumann, Efficient and Exact Computation of Inclusion Dependencies for Data Integration, Technical Report.

(Continued)

*Primary Examiner* — Syling Yen
(74) *Attorney, Agent, or Firm* — M&B IP Analysts, LLC

(57) ABSTRACT

A method and an inclusion dependency determination system (IDDS) for determining inclusion dependency between columns of tables in a target database to establish primary key (PK)-foreign key (FK) relationships among data in the columns with minimized disk input and output operations are provided. The IDDS determines dependency characteristic data (DCD) of each column and arranges the columns by applying one or more predefined rules to the columns based on a minimum value of the data of each column. The IDDS determines pairs of arranged columns that demonstrate a possibility of inclusion dependency based on the DCD and identifies a first column and a second column of each determined pair as a candidate PK and a candidate FK respectively. The IDDS determines inclusion dependency between the candidate PK and the candidate FK on comparing data of the candidate PK with the data of the candidate FK using dynamically determined search techniques.

18 Claims, 28 Drawing Sheets

(56) References Cited

U.S. PATENT DOCUMENTS

| | | | |
|---|---|---|---|
| 2009/0193006 A1* | 7/2009 | Herrnstadt | G06F 16/221 |
| 2010/0169671 A1* | 7/2010 | Coussieu | G06F 21/75 |
| | | | 713/193 |
| 2011/0246432 A1 | 10/2011 | Yang et al. | |
| 2013/0117255 A1* | 5/2013 | Liu | G06F 16/2456 |
| | | | 707/714 |
| 2015/0088834 A1 | 3/2015 | Wright | |
| 2016/0132787 A1 | 5/2016 | Drevo et al. | |
| 2017/0024421 A1* | 1/2017 | Kim | G06F 16/254 |
| 2018/0137148 A1* | 5/2018 | Kabra | G06F 16/215 |
| 2019/0034467 A1* | 1/2019 | Kwon | G06F 16/2228 |

OTHER PUBLICATIONS

The International Search Report and the Written Opinion of the International Searching Authority for PCT/IB2018/000931, dated Apr. 16, 2020, ISA/RU, Moscow, Russia.

* cited by examiner

| CITY_NAME | DATA_LENGTH |
|---|---|
| AHMEDABAD | 9 |
| BENGALURU | 9 |
| CHENNAI | 7 |
| DELHI | 5 |
| GOA | 3 |
| HYDERABAD | 9 |
| KOLKATA | 7 |
| KURUKSHETRA | 11 |
| MUMBAI | 6 |
| PATNA | 5 |

| | |
|---|---|
| TABLE NAME | CITY_TABLE |
| COLUMN NAME | CITY_NAME |
| DATA TYPE | STRING |
| MIN VALUE | AHMEDABAD |
| MAX VALUE | PATNA |
| TOTAL COUNT | 10 |
| DISTINCT COUNT | 10 |
| MIN_DATA_LENGTH | 3 |
| MAX_DATA_LENGTH | 11 |
| NULL/BLANK VALUE COUNT | 0 |
| AVERAGE STEP SIZE = (MAX VALUE-MIN VALUE)/TOTAL COUNT | - |

| POPULATION | DATA_LENGTH | |
|---|---|---|
| 30 | 2 | 203 |
| 32 | 2 | |
| 32 | 2 | |
| 45 | 2 | |
| 45 | 2 | |
| 145 | 3 | |
| 145 | 3 | |
| 165 | 3 | |
| 201 | 3 | |
| 230 | 3 | |

FIG. 2C

| | 204 |
|---|---|
| TABLE NAME | POPULATION_DATA |
| COLUMN NAME | POPULATION |
| DATA TYPE | NUMBER |
| MIN VALUE | 30 |
| MAX VALUE | 230 |
| TOTAL COUNT | 10 |
| DISTINCT COUNT | 7 |
| MIN_DATA_LENGTH | 2 |
| MAX_DATA_LENGTH | 3 |
| NULL/BLANK VALUE COUNT | 0 |
| AVERAGE STEP SIZE = (MAX VALUE− MIN VALUE)/TOTAL COUNT | 20 |

FIG. 2D

| CANDIDATE PRIMARY KEY | CANDIDATE PRIMARY KEY | REMAINING USAGE OF THE CANDIDATE PRIMARY KEY | REMAINING USAGE OF THE CANDIDATE FOREIGN KEY 801 |
|---|---|---|---|
| A | B | 1 | 1 |
| A | C | 0 | 3 |
| B | C | 0 | 2 |
| C | D | 1 | 0 |
| C | E | 0 | 1 |
| E | F | 0 | 0 |

ConditionA(c_i)

IF($c_i$) IS FOREIGN KEY RETURN TRUE
IF($c_i$) IS BLANK OR NULL RETURN TRUE
IF(WIDTH($c_i$) > 100 (CONFIGURABLE) RETURN TRUE
IF(DISTINCT($c_i$) < TOTAL($c_i$)) RETURN TRUE
OTHERWISE RETURN FALSE

ConditionB(c_i,c_j)

IF(MAX[$c_i$] < MAX [$c_j$]) RETURN TRUE
IF(DISTINCT_COUNT[$c_i$] < DISTINCT_COUNT [$c_j$]) RETURN TRUE
IF(TYPE[$c_i$] ≠ TYPE[$c_j$]) RETURN TRUE
IF($c_j$ IS PRIMARY KEY) RETURN TRUE
IF(WIDTH($c_j$) > 100 (CONFIGURABLE) RETURN TRUE
IF(UNIQUE_CONSTRAINT ON $c_j$) RETURN TRUE
IF(SEQUENCE_CONSTRAINT ON $c_j$) RETURN TRUE
IF($c_i$ AND $c_j$) ARE FROM SAME TABLE AND TYPE($c_i$) IS NOT NUMBER RETURN TRUE
IF($c_i$ AND $c_j$ ARE FROM SAME TABLE AND NAME($c_i$) OR NAME($c_j$)) DOES NOT END WITH "ID", "KEY", "NUM", "NUMBER", "CD", "CODE" RETURN TRUE
OTHERWISE RETURN FALSE

| COLUMN A |
|---|
| 1 |
| 2 |
| 3 |
| 4 |
| 5 |
| |
| |
| |
| |
| |
| |
| |
| |
| |
| |
| |
| 500000 |

TOTAL COUNT = 500000

702

| COLUMN B |
|---|
| 400001 |
| 400002 |
| 400003 |
| 400004 |
| 400005 |
| 400006 |
| 400007 |
| 400008 |
| 400009 |
| 400010 |

TOTAL COUNT = 10

FIG. 12

|  | ORIGINAL SIZE | CONVENTIONAL APPROACH | INCLUSION DEPENDENCY DETERMINATION SYSTEM'S APPROACH |
|---|---|---|---|
| NUMBER OF TABLES | 1000 | 1000 | 1000 |
| COLUMNS PER TABLE | 50 | 50 | 50 |
| TOTAL COLUMNS COUNT | 50000 | 50000 | 50000 |
| COLUMN ELIMINATED | 0 | 10000 | 10000 |
| REMAINING COLUMNS | 50000 | 40000 | 40000 |
| TOTAL COLUMNS PAIRS | 2500000000 | 1600000000 | 1600000000 |
| APPROXIMATE COLUMN PAIRS ELIMINATED | 0 | 80000000 | 900000000 |
| REMAINING COLUMN PAIRS | 2500000000 | 1520000000 | 700000000 |
| AVERAGE NUMBER OF DATA ELEMENTS IN EACH COLUMN | 100000 | 100000 | 100000 |
| NUMBER OF SEARCH OPERATIONS NEEDED | 2.5E+14 | 1.52E+14 | 7E+13 |
| AVERAGE NUMBER OF COMPARISONS FOR SEARCHING EACH DATA ELEMENT | 100000 | 30000 | 1000 |
| TOTAL COMPARISONS | 2.5E+19 | 4.56E+18 | 7E+16 |
| ADVANTAGE | 1 | 5.48245614 | 357.1428571 |

FIG. 13

INCLUSION DEPENDENCY DETERMINATION IN A LARGE DATABASE FOR ESTABLISHING PRIMARY KEY-FOREIGN KEY RELATIONSHIPS

BACKGROUND

For performing data integration in large enterprises, database structure and semantic relations between schema elements of a database have to be known and understood. Due to legacy data management in large enterprises, the semantic relations between schema elements, for example, columns of tables in a database are often lost or corrupted. Determining the semantic relations between the schema elements is a time consuming and costly process. When an explicit semantic relation is not available, identification of the semantic relation becomes time consuming due to the vast size of the database and nature of data stored in the tables.

A significant class of semantic relations between schema elements is primary key-foreign key relationships. A primary key is a column in a table that uniquely identifies each record in the table. A foreign key is a column in the same table or in another table that maps to the primary key to form a relationship in or between the tables. The relationship between the primary key and the foreign key is referred to as a "primary key-foreign key relationship". The primary key-foreign key relationship helps in fetching records queried by a user of the database quickly without having to access numerous tables in an enterprise, thereby saving time and effort. The primary key-foreign key relationship allows determination of data flow in a schema whenever any form of perturbation, insertion, or deletion occurs to any record in the database. However, determining primary key-foreign key relationships in databases of large enterprises is a time consuming process.

Consider an example where a primary key-foreign key relationship between 100 tables with 20 columns each has to be found. Around four million pairs of columns have to be explored to find a possible primary key-foreign key relationship. A brute force method for finding a possible primary key-foreign key relationship among four million pairs of columns is impractical. For a primary key-foreign key relationship to exist between the schema elements, a precondition of inclusion dependency needs to be satisfied. Inclusion dependency is a property of data which, when satisfied, requires every value of one column of a table to be present as a value of another column in a different or the same table. For a given pair of columns, even a single exception to the property of inclusion dependency will eliminate the presence of a primary key-foreign key relationship. Thus, there is a need for determining inclusion dependency prior to determining a primary key-foreign key relationship. On determining inclusion dependency between the schema elements, the number of pairs of schema elements to be evaluated for primary key-foreign key relationships is significantly reduced. However, inferring inclusion dependency between pairs of columns is an intensive computational challenge in a large database. Consider an example where inclusion dependency between 1000 tables with 50 columns each has to be determined. Around 2500 million pairs of columns have to be explored to determine possible primary key-foreign key relationships. For each pair of columns, inclusion dependency has to be determined. A brute force method for determining a possible inclusion dependency for each of the 2500 million pairs of columns by searching for values in each column that may be present in another column is impractical. Therefore, there is a need for a substantially faster method and system for determining inclusion dependencies between the schema elements in a large database.

There are a few conventional methods for determining inclusion dependencies. In one conventional method, metadata from pairs of columns in tables is used to determine inclusion dependencies. Possible features used for determining inclusion dependency are typically minimum and maximum values of the pairs of columns. Consider an example where a user needs to determine an inclusion dependency between column A and column B, wherein minimum values and maximum values of data of column A and column B are known. That is, the user needs to determine whether column A contains column B. The nonexistence of an inclusion dependency between column A and column B may be verified if either the minimum value of data of column A is higher than the minimum value of data of column B or if the maximum value of data of column A is lower than the maximum value of data of column B. On verifying the nonexistence of an inclusion dependency between a column pair, the column pair may be eliminated from a set of candidate column pairs used to test for an inclusion dependency. However, in cases where the minimum values or maximum values of data of column A and column B are equal, this verification for nonexistence of inclusion dependency using minimum or maximum values will not work. Therefore, there is a need for intelligently combining features of the data in the columns to verify nonexistence of inclusion dependency and eliminate column pairs from a set of candidate column pairs used to test for an inclusion dependency.

The target database comprising a set of candidate primary key-foreign key pairs is stored, for example, in a file system or in one or more solid state hard drives. To test for inclusion dependency, the candidate primary key-foreign key pairs need to be loaded to a memory unit from the file system or the solid state hard drives to be processed by a computer processor. The set of candidate primary key-foreign key pairs may comprise a candidate primary key paired with multiple candidate foreign keys. In such a case, to test for inclusion dependency, the candidate primary key is loaded to the memory unit from the file system or the solid state hard drives each time a different candidate foreign key is loaded to the memory unit. The number of disk input and output operations is increased due to reading the same candidate primary key along with different candidate foreign keys from the file system or the solid state hard drives multiple times. Similarly, there may be a need for loading the same candidate foreign key multiple times to the memory unit from the file system or the solid state hard drives, which increases the number of disk input and output operations due to reading the same candidate foreign key from the file system or the solid state hard drives multiple times. Consider an example where a processor needs to determine inclusion dependency for N column pairs available in a target database. For each of the N column pairs, the processor will typically read two columns from a file system or a solid state hard drive, load the read columns into a memory unit, and determine whether the column pair satisfies inclusion dependency. Thus, the processor accesses the target database 2N times, thereby affecting performance of the file system or the solid state hard drives in terms of latency and throughput. Therefore, there is a need for minimizing disk input and output operations in determining inclusion dependency between candidate primary key-foreign key pairs.

To determine inclusion dependency, the presence of every value of a candidate foreign key is searched in a candidate primary key. Using a brute force method to search for every value of the candidate foreign key in the candidate primary key is time consuming and tedious. In an example of a pair of columns, where column A is a candidate primary key and column B is a candidate foreign key, consider the minimum values of data of column A and column B are 10 and 210234 respectively, and the maximum values of data of column A and column B are 497268 and 215456 respectively. Since the minimum value of data of column B is too large compared to the minimum value of data of column A, comparing values of data of column B sequentially with values of data of column A starting from the minimum value of data of column A is time consuming. Similarly, since the maximum value of data of column A is too large compared to the maximum value of data of column B, comparing values of data of column B sequentially with values of data of column A starting from the maximum value of data of column A is time consuming. Therefore, there is a need for searching every value of the candidate foreign key in the candidate primary key for eliminating invalid candidate primary key-foreign key pairs using a substantially faster method requiring fewer processing steps by estimating values in the candidate primary key and the candidate foreign key.

Hence, there is a long felt need for a method and a system that determine inclusion dependencies between schema elements, that is, data in multiple columns in a large database substantially fast with minimized disk input and output operations.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above mentioned need for determining inclusion dependencies between schema elements, that is, data in multiple columns in a large database substantially fast with minimized disk input and output operations. Moreover, the method and the system disclosed herein intelligently combine features of the data in the columns to verify nonexistence of inclusion dependency and eliminate column pairs from a set of candidate column pairs used to test for an inclusion dependency. Furthermore, the method and the system disclosed herein search for every value of a candidate foreign key in a candidate primary key for eliminating invalid candidate primary key-foreign key pairs using a substantially faster method requiring fewer processing steps by estimating values in the candidate primary key and the candidate foreign key.

The method disclosed herein employs an inclusion dependency determination system (IDDS) comprising at least one processor configured to execute computer program instructions for determining inclusion dependency between multiple columns of multiple tables in a target database to establish primary key-foreign key relationships among data in the columns with minimized disk input and output operations. The IDDS prunes the target database based on a characteristic data type. After pruning, the IDDS sorts the data of the columns in the pruned target database. The IDDS determines dependency characteristic data comprising an average step size of each of the columns in the pruned target database. The IDDS arranges the columns in the pruned target database by applying one or more predefined rules to the columns based on a minimum value of the data of each of the columns. The IDDS extracts the minimum value of the data of each of the columns from the determined dependency characteristic data. The IDDS determines pairs of the arranged columns that demonstrate a possibility of inclusion dependency based on the determined dependency characteristic data of the pairs of arranged columns. The IDDS identifies a first column of each of the determined pairs of the arranged columns as a candidate primary key, and a second column of each of the determined pairs of the arranged columns as a candidate foreign key. The IDDS determines inclusion dependency between the candidate primary key and the candidate foreign key of each of the determined pairs of the arranged columns to establish primary key-foreign key relationships among the data in the columns, on comparing the data of the candidate primary key with the data of the candidate foreign key using multiple search techniques. The IDDS dynamically determines the search techniques based on the average step size extracted from the determined dependency characteristic data, while minimizing the disk input and output operations.

To minimize the number of disk input and output operations in the determination of inclusion dependency, the inclusion dependency determination system (IDDS) computes number of fetches of the candidate primary key and the candidate foreign key of each of the determined pairs of the arranged columns from a disk and performs retention or relinquishment of the candidate primary key and/or the candidate foreign key of each of the determined pairs of arranged columns in a non-transitory computer readable storage medium, for example, a memory unit of the IDDS based on the computed number of fetches.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIGS. 2A-2D exemplarily illustrate determination of dependency characteristic data of columns in tables by an inclusion dependency determination system.

FIG. 8 exemplarily illustrates a table generated by the inclusion dependency determination system for minimizing disk input and output operations in determining inclusion dependency between a candidate primary key and a candidate foreign key.

FIGS. 9A-9C exemplarily illustrate a flowchart comprising the steps performed by the inclusion dependency determination system for determining pairs of arranged columns that demonstrate a possibility of inclusion dependency.

FIG. 12 exemplarily illustrates a candidate primary key and a candidate foreign key in a pair of arranged columns determined by the inclusion dependency determination system for performing a comparison of a conventional approach and an approach followed by the inclusion dependency determination system for determining inclusion dependency between the candidate primary key and the candidate foreign key.

FIG. 13 exemplarily illustrates a table showing a comparison of a conventional approach and an approach followed by the inclusion dependency determination system for determining inclusion dependency between columns in a target database to establish primary key-foreign key relationships among data in the columns.

DETAILED DESCRIPTION OF THE INVENTION

Figure 1:
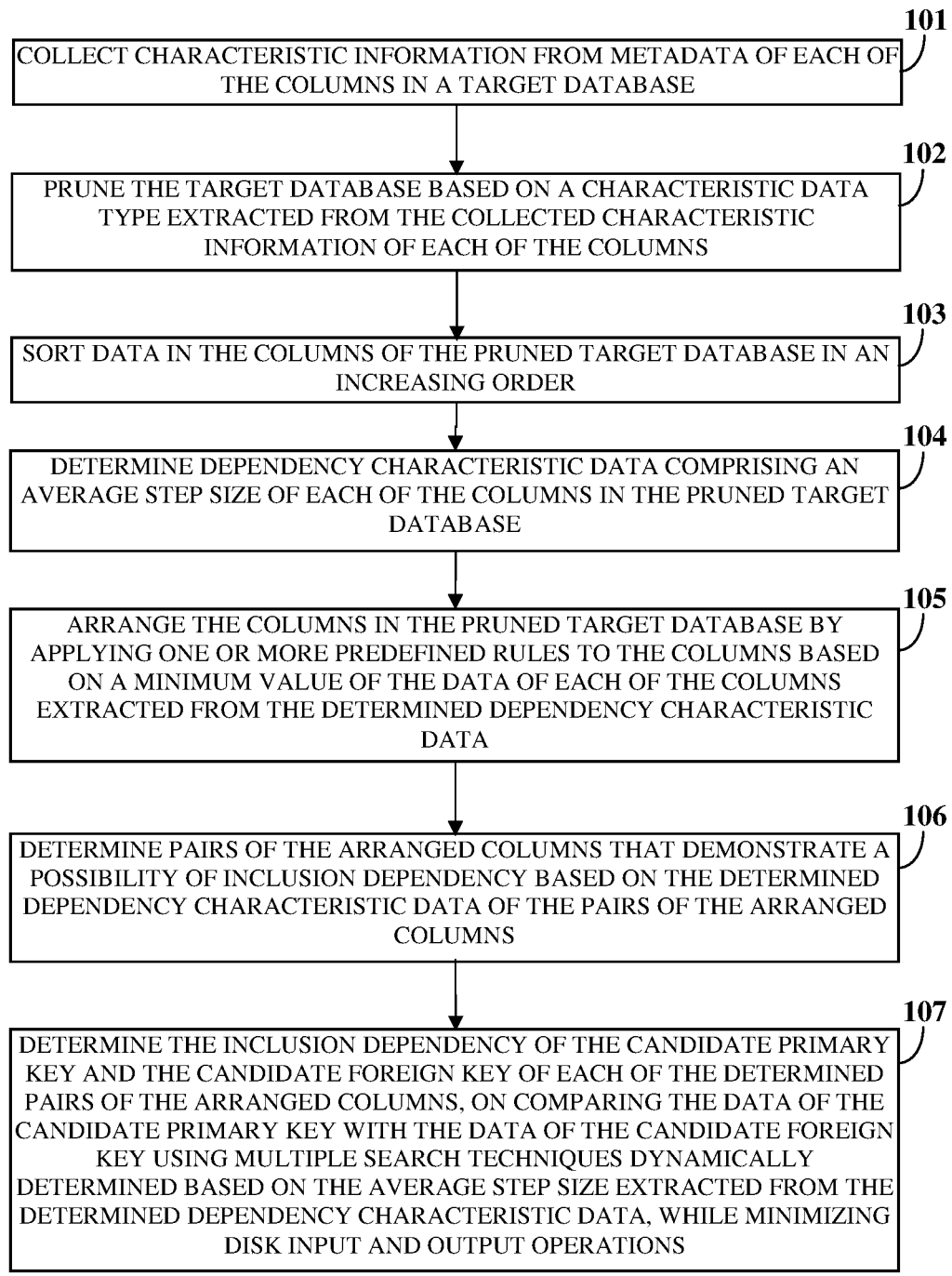
FIG. 1 illustrates a method for determining inclusion dependency between multiple columns of multiple tables in a target database to establish primary key-foreign key relationships among data in the columns with minimized disk input and output operations.

FIG. 1 illustrates a method for determining inclusion dependency between multiple columns of multiple tables in a target database to establish primary key-foreign key relationships among data in the columns with minimized disk input and output operations. As used herein, "target database" refers to a database that is targeted for determining inclusion dependency and subsequently primary key-foreign key relationships among a collection of data that is organized in multiple tables for access, management, and update of the data. Each table of the target database comprises multiple rows and columns. Also, as used herein, "primary key-foreign key relationship" refers to a relationship between a primary key in a table and a foreign key in the same table or another table. The primary key in a table is a column in the table that uniquely identifies a row of the table. The table with the primary key is identified as a parent table. A foreign key is a column in the parent table or in another table typically referred to as a "child table". If a foreign key is in the child table, the foreign key maps to a primary key in the parent table to control the data to be stored in the child table. If the foreign key is in the parent table, the foreign key refers to a primary key in the parent table. When a foreign key references or maps to a primary key, a link is created between the primary key and the foreign key, which defines the primary key-foreign key relationship between the columns. A precondition for a primary key-foreign key relationship between columns is an inclusion dependency between the columns. As used herein, "inclusion dependency" refers to a feature of the columns where data elements in a second column, referred to as a candidate foreign key, are a subset of data elements in a first column, referred to as a candidate primary key. That is, all the data elements in the second column are present in the first column. As used herein, "data elements" refer to individual entries of data or values in the columns in the tables of the target database. The target database is typically stored in a file system or one or more solid state hard drives. Also, as used herein, "disk input and output operations" refer to write and read operations of data from the file system or solid state hard drives to a memory unit. The read operation refers to transfer of data from the file system or the solid state hard drive to the memory unit and the write operation refers to transfer of data from the memory unit to the file system or the solid state hard drive.

The method disclosed herein employs an inclusion dependency determination system (IDDS) comprising at least one processor configured to execute computer program instructions for determining inclusion dependency between multiple columns of multiple tables in a target database to establish primary key-foreign key relationships among data in the columns with minimized disk input and output operations. In an embodiment, the IDDS is a computer system comprising at least one processor configured to execute computer program instructions for determining inclusion dependency between multiple columns of multiple tables in a target database to establish primary key-foreign key relationships among data in the columns with minimized disk input and output operations. In another embodiment, the IDDS comprises a software application downloadable and usable on a user device, for example, one of a personal computer, a tablet computing device, a mobile computer, a mobile phone, a smartphone, a portable computing device, a personal digital assistant, a laptop, a wearable computing device such as the Google Glass® of Google Inc., the Apple Watch® of Apple Inc., etc., a touch centric device, a client device, a portable electronic device, a network enabled computing device, an interactive network enabled communication device, any other suitable computing equipment, combinations of multiple pieces of computing equipment, etc. In another embodiment, the IDDS is implemented as a web based platform, for example, a website hosted on a server or a network of servers accessible by a user device via a network, for example, the internet, a wireless network, a mobile telecommunication network, etc. In another embodiment, the IDDS is implemented in a cloud computing environment and provides an open communication community service. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides on-demand network access to a shared pool of the configurable computing physical and logical resources. In another embodiment, the IDDS is configured as a cloud computing based platform implemented as a service for determining inclusion dependency between columns of multiple tables in a target database to establish primary key-foreign key relationships among data in the columns with minimized disk input and output operations.

The inclusion dependency determination system (IDDS) collects 101 characteristic information from metadata of each of the columns in the target database. For each of the columns, the IDDS extracts the metadata and from the extracted metadata, the IDDS collects the characteristic information comprising, for example, name of the column, data type of the column, column width, a null constraint on the column, a unique constraint on the column, a sequence constraint on the column, a primary key constraint on the column, and a foreign key constraint on the column. The null constraint on the column refers to a constraint on the column that enforces that the column can store a null value for the data type of the column. The unique constraint on the column enforces that all values in the column are unique and there are no duplicates. The sequence constraint on the column enforces that all values in the column are in a sequence. The primary key constraint on the column enforces uniqueness of the values in the column and indicates the column is a primary key of the table. The foreign key constraint on the column indicates the column is a foreign key that refers to a primary key in the same table or another table.

The inclusion dependency determination system (IDDS) prunes 102 the target database based on a characteristic data type of the collected characteristic information of each of the columns. Since the primary key and the foreign key in the target database are typically of a numeric data type or a string data type, the IDDS eliminates columns of other characteristic data types from the target database. For example, the IDDS eliminates the columns with the following characteristic data types: a binary large object (BLOB), a character large object (CLOB), an image, a date, a Boolean data type, an extensible markup language (XML) data type, a double data type, and a float data type, as the columns with these characteristic data types typically do not form primary key-foreign key pairs. The IDDS then sorts 103 data in the columns of the pruned target database in an increasing order. The pruned target database is a database comprising the remaining columns after elimination of the columns of the target database based on the characteristic data type. The first data element and the last data element in each of the remaining columns with the sorted data are a minimum value and a maximum value of data of each of the remaining columns in the pruned target database respectively.

In the method disclosed herein, the inclusion dependency determination system (IDDS) determines 104 dependency characteristic data comprising an average step size of each of the columns with the sorted data in the pruned target database as disclosed in the detailed description of FIGS. 2A-2D. In addition to the average step size of the column, the dependency characteristic data of each of the columns comprises a name of each column, a data type of each column, the minimum value of the data of each column, the maximum value of the data of each column, a total count of data elements in each column, a distinct count of the data elements in each column, a minimum length and a maximum length of the data in each column, and a null value count of the data of each column as exemplarily illustrated in FIG. 2B and FIG. 2D. The IDDS computes the average step size of a column in the pruned target database using the minimum value of the data of the column, the maximum value of the data of the column, and the total count of the data elements in the column. Since the IDDS has sorted the data of the columns, the IDDS determines the dependency characteristic data in one pass for each column.

The inclusion dependency determination system (IDDS) then arranges 105 the columns in the pruned target database by applying one or more predefined rules to the columns based on a minimum value of the data of each of the columns extracted from the determined dependency characteristic data. The predefined rules comprise arranging the columns in an increasing order of the minimum value of the data of each of the columns, if the minimum value of the data of each of the columns is unequal to the minimum value of the data of each of the other columns. If the minimum value of the data of a first column of each pair of columns is equal to the minimum value of the data of a second column of each pair of the columns, the IDDS applies tiebreaking rules to the pairs of columns as disclosed in the detailed description of FIGS. 3A-3B.

Since the data in each of the columns is sorted in an increasing order, the first data element in each of the columns is the minimum value of the corresponding column. The inclusion dependency determination system (IDDS) compares the first data element of each of the columns with the first data element of each of the other columns and arranges the columns in an increasing order of their first data elements. If pairs of columns have the same first data element, the IDDS applies tiebreaking rules to those pairs of columns. Consider an example of two columns, a first column and a second column, with sorted data. The IDDS compares the first data element of the first column with the first data element of the second column. If the first data element of the second column is less than the first data element of the first column, the IDDS arranges the second column to the left of the first column. If the first data element of the second column is greater than the first data element of the first column, the IDDS arranges the second column to the right of the first column. If the first data element of the second column is equal to the first data element of the first column, the IDDS applies tiebreaking rules to the first column and the second column as disclosed in the detailed description of FIGS. 3A-3B. On arranging the columns by applying the predefined rules, the IDDS creates a relationship mapping exemplarily illustrated in FIG. 4. Arranging the columns in an increasing order indicates that the preceding columns may contain the later columns. That is, in the above disclosed example of the first column and the second column, arranging the first column to the right of the second column indicates that the second column may contain all the data elements of the first column. Similarly, arranging the first column to the left of the second column indicates that the first column may contain all data elements of the second column.

The inclusion dependency determination system (IDDS) determines 106 pairs of the arranged columns that demonstrate a possibility of inclusion dependency based on the determined dependency characteristic data of the pairs of the arranged columns. The IDDS identifies a first column of each of the determined pairs of the arranged columns as a candidate primary key, and a second column of each of the determined pairs of the arranged columns as a candidate foreign key. On arranging the columns in an order by applying the predefined rules, the IDDS filters out some pairs of the arranged columns of the pruned target database that will not form an inclusion dependency pair based on the minimum values of the arranged columns. Since the first column of each of the determined pairs of columns has a less minimum value as compared to the minimum value of the second column of each of the determined pairs of columns, the first column may contain all the data elements of the second column but the second column will not contain all the data elements of the first column. The IDDS arranges the columns in an order, for example, the first column followed by the second column, to maintain a possible inclusion dependency in a forward direction only and thus eliminates the column pairs where the second column will not contain all the data elements of the first column. Consider an example where the IDDS determines inclusion dependencies between three columns A, B, and C. The IDDS arranges the columns A, B, and C in an increasing order of minimum values of data in the columns. On arranging the columns A, B, and C in an increasing order of minimum values of data in the columns, the IDDS has to examine only forward pairs of columns (A,B), (A,C), and (B,C) for inclusion dependency since column A may contain column B, column A may contain column C, and column B may contain column C. The IDDS eliminates the pairs of columns (B,A), (C,A), and (C,B) from being examined for inclusion dependency. The IDDS examines the remaining pairs of arranged columns based on the determined dependency characteristic data, for example, maximum values, distinct count, column width of the remaining arranged columns, etc., and forms pairs of arranged columns that have a probability of forming inclusion dependency pairs as disclosed in the detailed description of FIG. 6. A generic computer using a generic program cannot determine pairs of the arranged columns that demonstrate a possibility of inclusion dependency based on the determined dependency characteristic data of the pairs of the arranged columns in accordance with the method steps disclosed above.

Further, the inclusion dependency determination system (IDDS) determines 107 inclusion dependency between the candidate primary key and the candidate foreign key of each of the determined pairs of the arranged columns to establish primary key-foreign key relationships among the data in the columns, on comparing the data of the candidate primary key with the data of the candidate foreign key using multiple search techniques dynamically determined by the IDDS based on the average step size extracted from the determined dependency characteristic data, while minimizing the disk input and output operations. The search techniques comprise, for example, a binary search, a sequential search, a bidirectional search, etc., and any combination thereof. A binary search is a search algorithm executed by the IDDS for determining presence of a data element of the candidate foreign key in the candidate primary key by comparing the data element of the candidate foreign key to the data element at a middle position of the candidate primary key, determining whether the data element lies in the upper half or the lower half of the candidate primary key, and then searching in the upper half or the lower half of the candidate primary key. The binary search reduces the number of comparisons to be made between the candidate primary key and the candidate foreign key. In a binary search, a data element can be found in a column within $\log_2$ (number of data elements in the column). A sequential search, also referred to as a "linear search", is a search algorithm executed by the IDDS for determining presence of a data element of the candidate foreign key in the candidate primary key by comparing the data element of the candidate foreign key sequentially with each data element of the candidate primary key until a match is found, or until all the data elements of the candidate primary key have been searched, or if the data element in the candidate foreign key is greater than the data element in the candidate primary key. A bidirectional search is a search algorithm executed by the IDDS for determining the presence of data elements of the candidate foreign key in the candidate primary key by comparing the data elements of the candidate foreign key with the data elements from the top and the bottom of the candidate primary key, that is, from both the directions along the candidate primary key. The bidirectional search reduces the search time and the number of comparisons. In an embodiment, the IDDS performs a combination of the binary search and the bidirectional search substantially faster than performing the binary search or the sequential search alone.

Based on the computed average step size of the candidate primary key, the inclusion dependency determination system (IDDS) dynamically determines whether a binary search or a sequential search or a bidirectional search or any combination of the binary search, the sequential search, and the bidirectional search of the candidate primary key has to be performed for a data element of the candidate foreign key as disclosed in the detailed description of FIGS. 7A-7D. The IDDS minimizes the disk input and output operations by computing number of fetches of the candidate primary key and the candidate foreign key of each of the determined pairs of the arranged columns from a disk, for example, a file system or a solid state hard drive for the determination of inclusion dependency. As used herein, "fetches" refer to read operations of the candidate primary key and the candidate foreign key of each of the determined pairs of the arranged columns from the file system or the solid state drive to the memory unit. Based on the computed number of fetches, the IDDS retains or relinquishes the candidate primary key and/or the candidate foreign key of each of the determined pairs of the arranged columns in a non-transitory computer readable storage medium, for example, a memory unit of the IDDS, thereby minimizing the disk input and output operations.

On reading a determined pair of a candidate primary key and a candidate foreign key, the inclusion dependency determination system (IDDS) computes the number of subsequent read operations of the candidate primary key and the candidate foreign key in the determined pair from the file system or the solid state hard drive. The number of read operations of the candidate primary key and the candidate foreign key is referred to as "remaining usage" of the candidate primary key and the candidate foreign key. If the IDDS determines that the candidate primary key and the candidate foreign key have a remaining usage, the IDDS retains the candidate primary key and the candidate foreign key in the memory unit of the IDDS to minimize the latency and improve the throughput of the file system or the solid state drive in reading the candidate primary key and the candidate foreign key from the file system or the solid state drive repeatedly. The IDDS continues to compute the remaining usage of another determined pair of a second candidate primary key and a second candidate foreign key. The IDDS relinquishes the candidate primary key and the candidate foreign key when the computed remaining usage is 0. That is, the IDDS deletes the candidate primary key and the candidate foreign key from the memory unit once the number of fetches is reduced to 0 as disclosed in the detailed description of FIG. 8.

FIGS. 2A-2D exemplarily illustrate determination of dependency characteristic data of columns in tables 201 and 203 by the inclusion dependency determination system (IDDS). FIG. 2A exemplarily illustrates a table City_Table 201 containing the names of cities of a country, for example, India, under the column name City_name, that are lexicographically arranged. The data type of the column is the data type of the data in the column. In the table City_Table 201, the data type of the column City_name is string. A minimum value and a maximum value of the column City_name correspond to strings at the beginning of the column and the end of the column respectively, when the data elements or values of the column City_name are lexicographically arranged. Thus, the minimum value of the column City_name is a string "Ahmedabad", since the string starts with letter "A", while the maximum value of the column City_name is a string "Patna", since the string starts with letter "P". Total count of the column City_name is the number of data elements in the column, that is, 10. A distinct count of the column City_name is the number of data elements in the column that are distinct. Since there is no duplication in the column City_name, the distinct count is equal to the total number of data elements in the column, that is, 10. Minimum data length referenced as "Min_Data_Length", and maximum data length referenced as "Max_Data_Length" correspond to minimum length and maximum length of the strings in the column City_name. The minimum data length is 3, that is, the length of the string "Goa" in the column City_name, while the maximum data length is 11, that is, the length of the string "Kurukshetra" in the column City_name. Null or blank value count is a count of rows in the column City_name that are left blank or null. Since all the data elements are filled in rows of the column City_name, the null or blank value count is 0. Furthermore, since the data elements in the column City_name are strings, the average step size of the column City_name cannot be computed. A table 202 exemplarily illustrated in FIG. 2B, tabulates the above disclosed dependency characteristic data determined by the IDDS.

FIG. 2C exemplarily illustrates a table 203 containing a column processed by the inclusion dependency determination system (IDDS) to determine dependency characteristic data of the column. As exemplarily illustrated in FIG. 2C, the table Population_Data 203 contains integer data representing population, under the column name Population, that is arranged in an increasing order. In the table Population_Data 203, the data type of the column Population is number. A minimum value and a maximum value of the column Population correspond to a minimum and a maximum of the data elements in the column Population respectively. The minimum value is 30 and the maximum value is 230 in the column Population. Total count of the column Population is the number of data elements in the column, that is, 10. Distinct count of the column Population is the number of data elements in the column that are distinct. The distinct count is 7 since the data elements 32, 45, and 145 are repeated twice in the column Population. Minimum data length referenced as "Min_Data_Length", and maximum data length referenced as "Max_Data_Length", correspond to the minimum length and the maximum length of the numbers in the column Population. The minimum data length is 2 and the maximum data length is 3 in the column Population. Null and blank value count is a count of null values in the column Population. Since all the data elements are filled in the column Population, the null or blank value count is 0. The IDDS can compute the average step size of the column Population since the data elements in the column Population are numbers. The IDDS computes the average step size as (maximum value-minimum value)/Total count. The average step size of the data elements in the column Population is (230-30)/10=20. A table 204 exemplarily illustrated in FIG. 2D, tabulates the above disclosed dependency characteristic data determined by the IDDS. A generic computer using a generic program cannot determine dependency characteristic data in accordance with the method steps disclosed above.

Figure 3A:
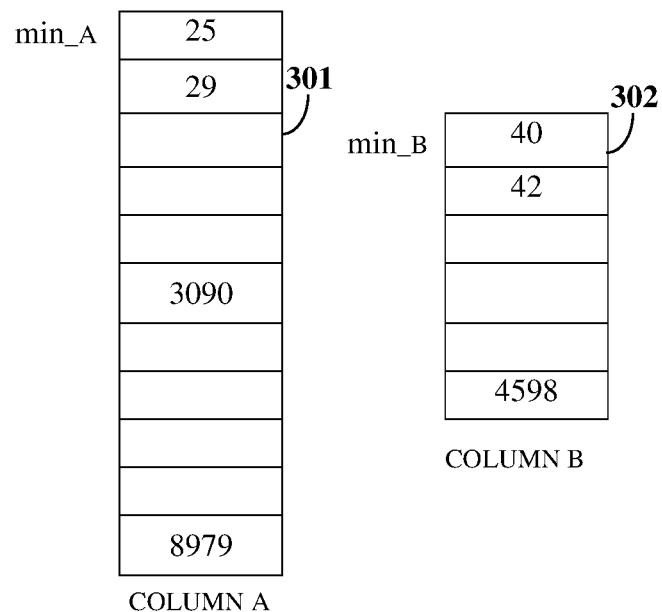
FIGS. 3A-3B exemplarily illustrate columns arranged by the inclusion dependency determination system by applying one or more predefined rules to the columns based on a minimum value of data of each of the columns.
Figure 3B:
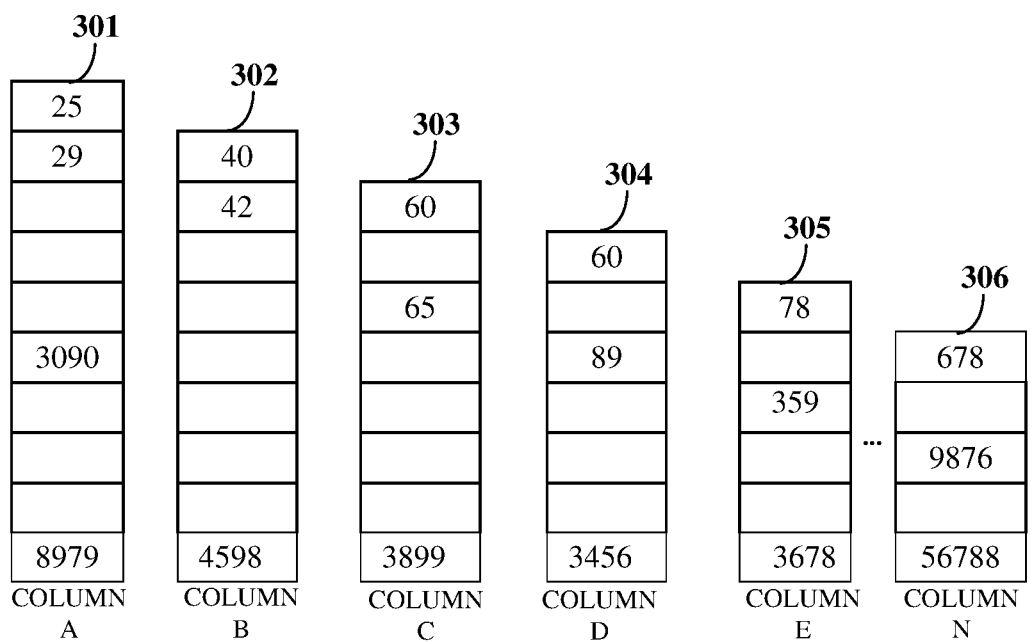

FIGS. 3A-3B exemplarily illustrate columns 301 and 302 arranged by the inclusion dependency determination system (IDDS) by applying one or more predefined rules to the columns 301 and 302 based on a minimum value of data of each of the columns 301 and 302. FIG. 3A exemplarily illustrates two columns column A 301 and column B 302 with minimum values 25 and 40 respectively. The IDDS sorts the data elements in the columns column A 301 and column B 302 in an increasing order. The predefined rules instruct the IDDS to arrange the columns 301 and 302 in an increasing order of minimum values, if the minimum values of the columns 301 and 302 are unequal. If the minimum values of the columns 301 and 302 are equal, the IDDS applies tiebreaking rules to the columns 301 and 302 as disclosed in the detailed description of FIG. 3B. The IDDS compares the minimum values of the columns 301 and 302 and determines that the minimum values are unequal. Using the predefined rules, the IDDS arranges column A 301 and column B 302 in an increasing order of minimum values. If the minimum value min_A of column A 301 is greater than the minimum value min_B of column B 302, the IDDS deduces that column A 301 cannot fully contain all the data elements of column B 302. Also, if the minimum value min_B is greater than the minimum value min_A, there is a probability that column A 301 may contain all the data elements of column B 302. As exemplarily illustrated in FIG. 3A, since the minimum value min_B is 40 which is greater than the minimum value min_A, which is 25, the columns column A 301 and column B 302 are arranged in an increasing order of min_A and min_B. There is a probability that column A 301 contains column B 302, while column B 302 cannot contain column A 301. Thus, the IDDS arranges column A 301 before or to the left of column B 302.

FIG. 3B exemplarily illustrates six columns 301, 302, 303, 304, 305, and 306 arranged by the inclusion dependency determination system (IDDS) by applying one or more predefined rules based on a minimum value of data of each of the columns 301, 302, 303, 304, 305, and 306. The minimum values of the data of column A 301, column B 302, column C 303, column D 304, column E 305, and column N 306 are, for example, 25, 40, 60, 60, 78, and 678 respectively. As exemplarily illustrated in FIG. 3A, the IDDS arranges column A 301 to the left of column B 302. Column N 306 has the highest minimum value and thus, the IDDS arranges column N 306 at the end. The minimum value of the data of column E 305 is less than the minimum value of the data of column N 306 but greater than the minimum values of the data of column C 303 and column D 304. The IDDS therefore arranges column E 305 to the left of column N 306. To determine the arrangement of column C 303 and column D 304, the IDDS applies tiebreaking rules to column C 303 and column D 304 since their minimum values are equal. The tiebreaking rules are based on the determined dependency characteristic data. An example of the tiebreaking rules is disclosed below:

If (max_D>max_C) then order should be D→C
Else if (max_C>max_D) then order should be C→D
Else if (distinct_D>distinct_C) then order should be D→C
Else if (distinct_C>distinct_D) then order should be C→D
Else if Col_D contains duplicate then order should be C→D
Else if Col_C contains duplicate then order should be D→C
Else if blank/null is present in Col_D then order should be C→D
Else if blank/null is present in Col_C then order should be D→C
Else if unique constraint is defined on Col_C then order should be C→D
Else if unique constraint is defined on Col_D then order should be D→C
Else if sequence constraint is defined on Col_C then order should be C→D
Else if sequence constraint is defined on Col_D then order should be D→C
Else put column C before and after column D so that we have both the possibilities of pairs C→D and D→C.

If the minimum values of a pair of columns are equal, the inclusion dependency determination system (IDDS) compares the maximum values of the pair of columns. If the maximum value max_D of column D is greater than the maximum value max_C of column C, then the IDDS arranges column C after or to the right of column D. If max_D is less than max_C, the IDDS arranges column D after or to the right of column C. Moreover, if the maximum values are also equal, the IDDS compares the distinct counts distinct_C and distinct_D of the columns C and D respectively. If the distinct count distinct_D is greater than the distinct count distinct_C, the IDDS arranges column C after or to the right of column D. If the distinct count distinct_C is greater than the distinct count distinct_D, the IDDS arranges column D after or to the right of column C. If column D contains duplicate data elements, the IDDS arranges column D after or to the right of column C. If column C contains duplicate data elements, the IDDS arranges column C after or to the right of column D. If blank or null value is present in column D, the IDDS arranges column D after or to the right of column C. If blank or null value is present in column C, the IDDS arranges column C after or to the right of column D. If a unique constraint is defined on column C, then the IDDS arranges column D after or to the right of column C, and if a unique constraint is defined on column D, then the IDDS places column C after or to the right of column D. If a sequence constraint is defined on column C, then the IDDS arranges column D after or to the right of column C and if a sequence constraint is defined on column D, the IDDS arranges column C after or to the right of column D. If none of the above conditions are met, the IDDS arranges column C before or to the left of column D and after or to the right of column D. On arranging the column C before or to the left of column D and after or to the right of column D, the IDDS examines the column pairs (C,D) and (D,C) for inclusion dependency.

In the above example, since the minimum values of the data of column C 303 and column D 304 are equal as exemplarily illustrated in FIG. 3B, the inclusion dependency determination system (IDDS) compares the maximum values of the data of the column C 303 and the column D 304. The maximum values max_C and max_D of the columns 303 and 304 are 3899 and 3456 respectively. Since max_C is greater than max_D, the IDDS arranges column D 304 after or to the right of column C 303. Thus, the order is column A-column B-column C-column D-column E-column N as exemplarily illustrated in FIG. 3B. That is, column A 301 may contain column B 302, column C 303, column D 304, column E 305, and column N 306. Column B 302 may contain column C 303, column D 304, column E 305, and column N 306. Column C 303 may contain column D 304, column E 305, and column N 306. Column D 304 may contain column E 305 and column N 306, and column E 305 may contain column N 306. Therefore, the possible inclusion dependency pairs are (A,B), (A,C), (A,D), (A,E), (A,N), (B,C), (B,D), (B,E), (B,N), (C,D), (C,E), (C,N), (D,E), (D,N), and (E,N). The IDDS eliminates the pairs (B,A), (C,A), (D,A), (E,A), (N,A), (C,B), (D,B), (E,B), (N,B), (D,C), (E,C), (N,C), (E,D), (N,D), and (N,E) based on the arrangement of the columns 301, 302, 303, 304, 305, and 306 performed by applying the predefined rules to the columns 301, 302, 303, 304, 305, and 306 based on the minimum values of the data of the columns 301, 302, 303, 304, 305, and 306. A generic computer using a generic program cannot arrange the columns 301, 302, 303, 304, 305, and 306 in the pruned target database by applying one or more predefined rules to the columns 301, 302, 303, 304, 305, and 306 based on a minimum value of the data of each of the columns 301, 302, 303, 304, 305, and 306 extracted from the determined dependency characteristic data in accordance with the method steps disclosed above.

Figure 4:
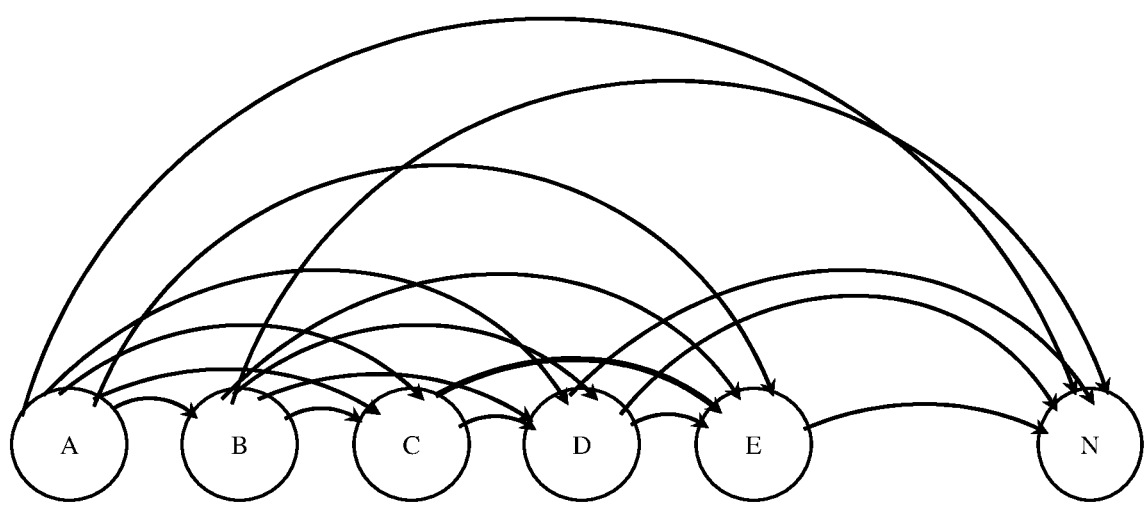
FIG. 4 exemplarily illustrates a relationship mapping between the arranged columns indicating possibilities of inclusion dependencies between the arranged columns.

FIG. 4 exemplarily illustrates a relationship mapping between the arranged columns 301, 302, 303, 304, 305, and 306 exemplarily illustrated in FIG. 3B, indicating possibilities of inclusion dependencies between the arranged columns 301, 302, 303, 304, 305, and 306. The relationship mapping exemplarily illustrated in FIG. 4, provides a visual chart that depicts one-to-many relations between the arranged columns 301, 302, 303, 304, 305, and 306. The inclusion dependency determination system (IDDS) deduces the relationship mapping on arranging the columns 301, 302, 303, 304, 305, and 306 in an order as disclosed in the detailed description of FIGS. 3A-3B. As exemplarily illustrated in FIG. 4, each of the arranged columns 301, 302, 303, 304, 305, and 306, represented as circles, is connected to other of the arranged columns 301, 302, 303, 304, 305, and 306 with which the other arranged columns 301, 302, 303, 304, 305, and 306 can form inclusion dependency pairs. The IDDS creates a unidirectional chain between the arranged columns 301, 302, 303, 304, 305, and 306 such that the columns, for example, 301, 302, 303, etc., occurring earlier in the chain can fully contain columns, for example, 304, 305, and 306 occurring later in the chain while the vice versa is not true. That is, as exemplarily illustrated in FIG. 4, column A 301 can contain column B 302, column C 303, column D 304, etc., while column B 302, column C 303, and column D 304 cannot contain column A 301 as disclosed in the detailed description of FIGS. 3A-3B. Such a relationship mapping helps in reducing 50% of unwanted column pairs from being examined for inclusion dependency.

Figure 5A:
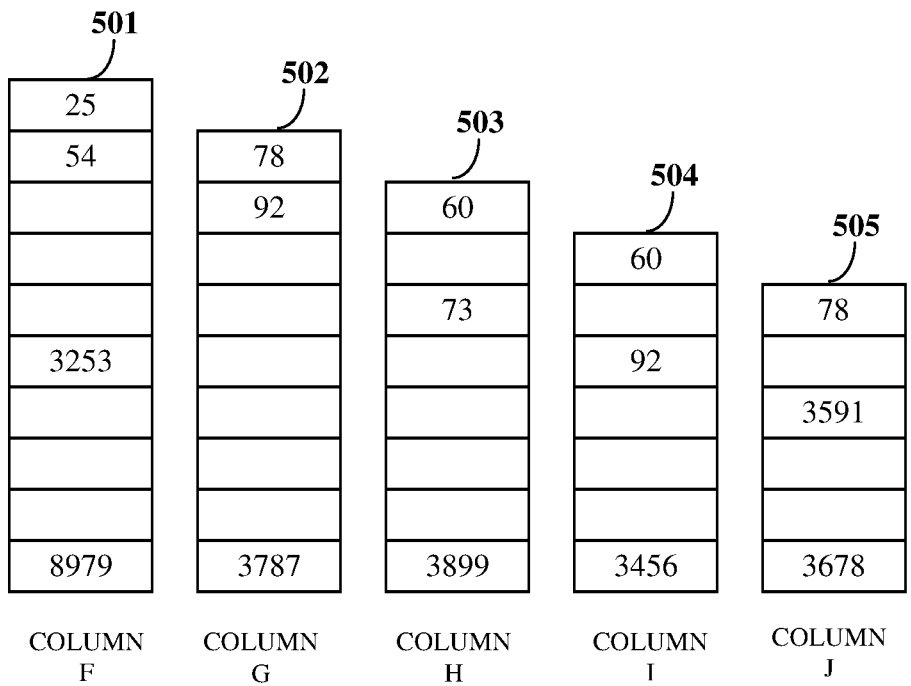
FIGS. 5A-5D exemplarily illustrate columns arranged by the inclusion dependency determination system by applying one or more predefined rules to the columns based on a minimum value of data of each of the columns.
Figure 5B:
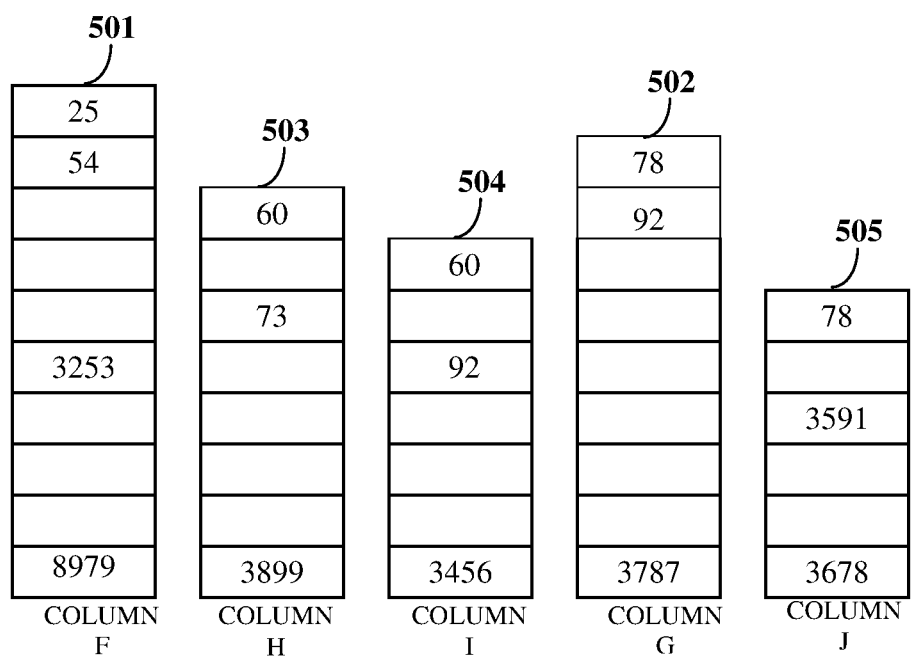

FIGS. 5A-5D exemplarily illustrate columns 501, 502, 503, 504, 505, 506, and 507 arranged by the inclusion dependency determination system (IDDS) by applying one or more predefined rules to the columns 501, 502, 503, 504, 505, 506, and 507 based on a minimum value of data of each of the columns 501, 502, 503, 504, 505, 506, and 507. Consider an example of five columns 501, 502, 503, 504, and 505 as exemplarily illustrated in FIG. 5A. The IDDS arranges the five columns 501, 502, 503, 504, and 505 based on a minimum value of the data of each of the columns 501, 502, 503, 504, and 505 in an order as exemplarily illustrated in FIG. 5B. In FIG. 5A, the minimum values of the data of column F 501, column G 502, column H 503, column I 504, and column J 505 are 25, 78, 60, 60, and 78 respectively. The minimum values of the data of column G 502 and column J 505 are 78 and are equal and the minimum values of the data of column H 503 and column I 504 are 60 and are equal. As disclosed in the detailed description of FIGS. 3A-3B, the IDDS compares the minimum value of the data of column F 501 with the minimum values of the data of column G 502, column H 503, column I 504, and column J 505, and arranges the column F 501 to the left of the remaining columns 502, 503, 504, and 505 as the minimum value of the data of column F 501 is less than the minimum values of the data of the remaining columns 502, 503, 504, and 505. The IDDS further compares the minimum value of the data of column G 502 with the minimum values of the data of the remaining columns 503, 504, and 505. As the minimum value of the data of column G 502 is greater than the minimum values of the data of column H 503 and column I 504, the IDDS arranges the column G 502 after or to the right of column H 503 and column I 504.

To arrange column H 503 and column I 504, and column G 502 and column J 505, the inclusion dependency determination system (IDDS) applies tiebreaking rules as disclosed in the detailed description of FIG. 3B, to column H 503 and column I 504, and column G 502 and column J 505. The IDDS compares the maximum values of the data of column H 503 and column I 504 and the maximum values of the data of column G 502 and column J 505. The maximum values of the data of column H 503, column I 504, column G 502, and column J 505 are 3899, 3456, 3787, and 3678 respectively. The IDDS arranges column I 504 after or to the right of column H 503 since the maximum value of the data of column I 504 is less than the maximum value of the data of column H 503. In the pair of columns, column G 502 and column J 505, the IDDS arranges the column J 505 after or to the right of column G 502 since the maximum value of the data of column J 505 is less than the maximum value of the data of column G 502. Thus, the order of columns 501, 502, 503, 504, and 505 exemplarily illustrated in FIG. 5A, is column F-column H-column I-column G-column J as exemplarily illustrated in FIG. 5B. That is, column F 501 may contain column H 503, column I 504, column G 502, and column J 505. Column H 503 may contain column I 504, column G 502, and column J 505. Column I 504 may contain column G 502 and column J 505, and column G 502 may contain column J 505. Therefore, the IDDS determines the possible inclusion dependency pairs as (F,H), (F,I), (F,G), (F,J), (H,I), (H,G), (H,J), (I,G), (I,J), and (G,J), and eliminates the column pairs (G,F), (H,F), (I,F), (J,F), (I,H), (J,H), (G,H), (G,I), (J,G), and (J,I).

Figure 5C:
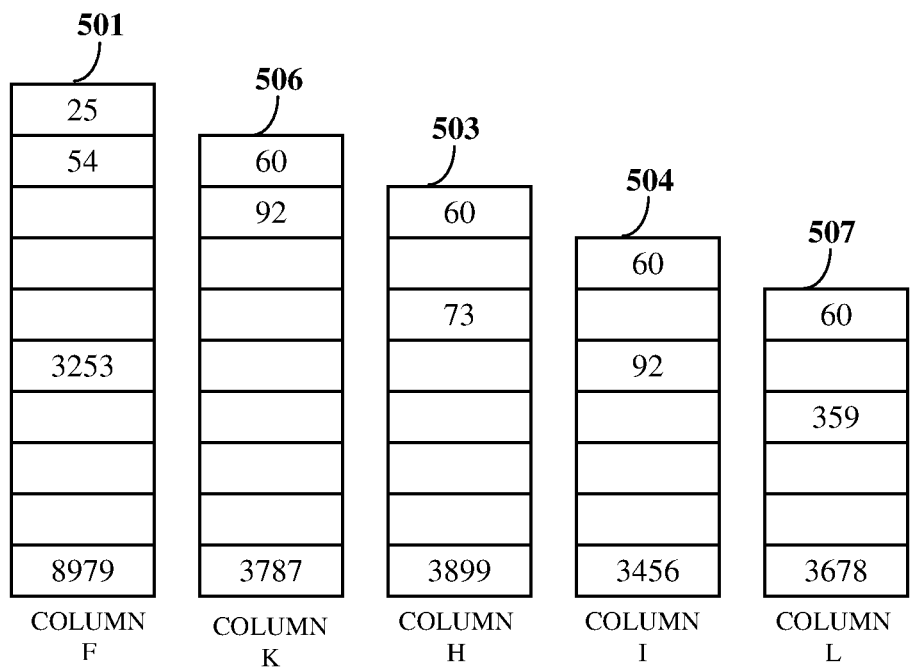
Figure 5D:
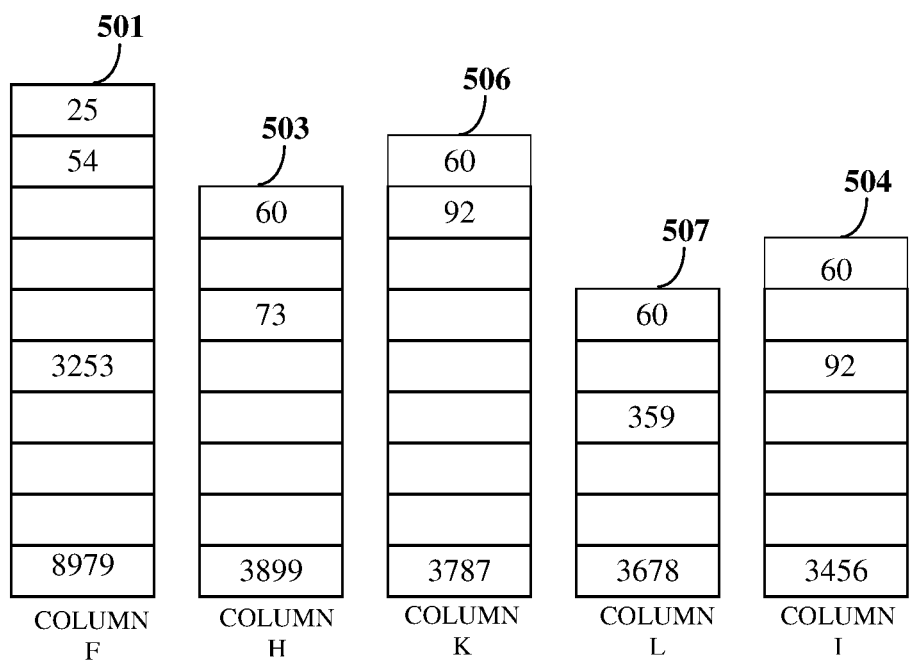

In another example, the inclusion dependency determination system (IDDS) arranges the five columns 501, 506, 503, 504, and 507 exemplarily illustrated in FIG. 5C, based on the minimum values of the data of the columns 501, 506, 503, 504, and 507 in an order as exemplarily illustrated in FIG. 5D. As exemplarily illustrated in FIG. 5C, the minimum values of the data of column F 501, column K 506, column H 503, column I 504, and column L 507 are 25, 60, 60, 60, and 60 respectively. The minimum values of the data of column K 506, column H 503, column I 504, and column L 507 are 60 and are equal. As disclosed in the detailed description of FIGS. 3A-3B, the IDDS compares the minimum value of the data of column F 501 with the minimum values of the data of column K 506, column H 503, column I 504, and column L 507, and arranges column F 501 to the left of the remaining columns 506, 503, 504, and 507 as the minimum value of the data of column F 501 is less than the minimum values of the data of the remaining columns 506, 503, 504, and 507.

To arrange column K 506, column H 503, column I 504, and column L 507, the IDDS applies tiebreaking rules to the pairs of columns (K,H), (K,I), (K,L), (H,K), (H,I), (H,L), (I,K), (I,H), (I,L), (L,K), (L,H), and (L,I) as disclosed in the detailed description of FIG. 3B. The IDDS compares the maximum values of the data of column K 506, column H 503, column I 504, and column L 507. The maximum values of the data of column K 506, column H 503, column I 504, and column L 507 are 3787, 3899, 3456, and 3678 respectively. On comparing the maximum values of the data of column K 506 and column H 503, The IDDS arranges column K 506 after or to the right of column H 503 as the maximum value of the data of column K 506 is less than the maximum value of the data of column H 503. The IDDS determines the maximum value of the data of column K 506 to be greater than the maximum value of the data of column I 504 and arranges column I 504 after or to the right of column K 506. The IDDS further compares the maximum value of the data of column K 506 with the maximum value of the data of column L 507 and arranges column L 507 after or to the right of column K 506. The order of the columns is column F-column H-column K-column I/column L-column L/column I. The IDDS applies tiebreaking rules on column I 504 and column L 507 and determines that the maximum value of the data of column L 507 is greater than the maximum value of the data of column I 504. Thus, the IDDS arranges column L 507 before or to the left of column I 504. The resulting order of the columns 501, 506, 503, 504, and 507 exemplarily illustrated in FIG. 5C, is column F-column H-column K-column L-column I as exemplarily illustrated in FIG. 5D. That is, column F 501 may contain column H 503, column K 506, column L 507, and column I 504. Column H 503 may contain column K 506, column L 507, and column I 504. Column K 506 may contain column L 507 and column I 504, and column L 507 may contain column I 504. Therefore, the IDDS determines the possible inclusion dependency pairs as (F, H), (F, K), (F, L), (F, I), (H, K), (H, L), (H, I), (K, L), (K, I), and (L, I), and eliminates the column pairs (H,F), (K,F), (K,H), (I,K), (I,H), (I,L), (I,F), (L,K), (L,H), and (L,F).

Figure 6:
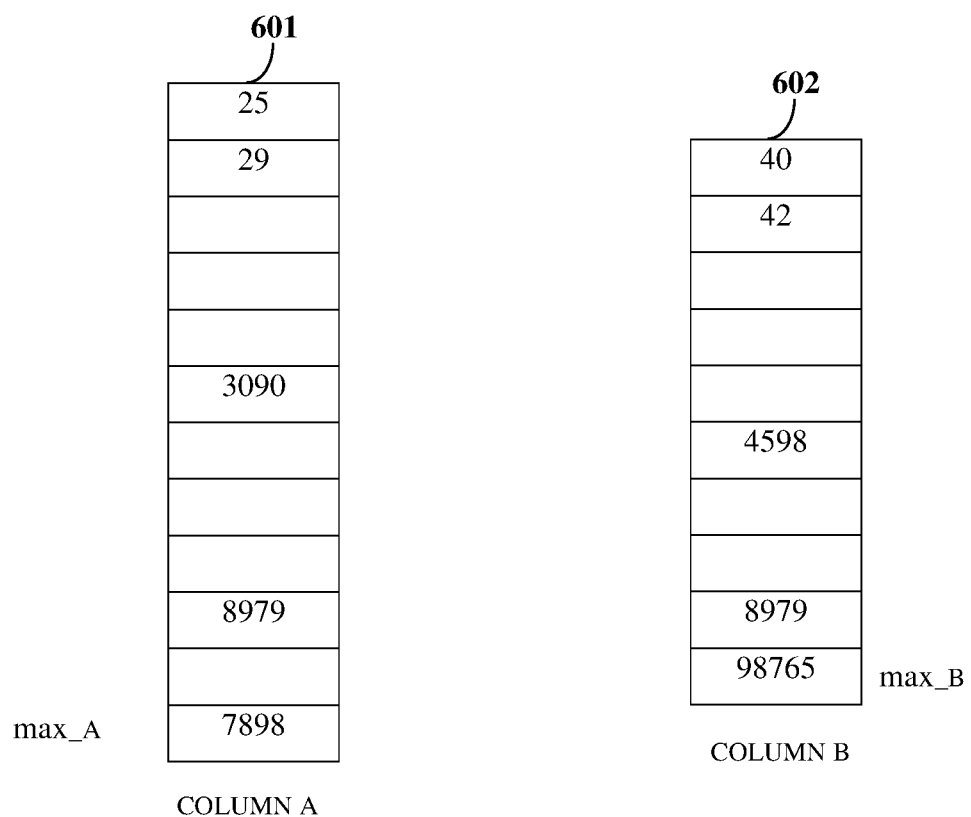
FIG. 6 exemplarily illustrates a pair of arranged columns determined by the inclusion dependency determination system to demonstrate a possibility of inclusion dependency.

FIG. 6 exemplarily illustrates a pair of arranged columns 601 and 602 determined by the inclusion dependency determination system (IDDS) to demonstrate a possibility of inclusion dependency. As exemplarily illustrated in FIG. 6, the IDDS arranges the two columns column A 601 and column B 602 in an increasing order of their minimum values. From the minimum values, there is a possibility that column A 601 can contain column B 602. That is, all data elements of column B 602 may be present in column A 601. The IDDS examines the maximum values of data of column A 601 and column B 602. The maximum value max_B of column B 602 is 98765 and is greater than the maximum value max_A of column A 601, that is, 7898. Column A 601 does not contain values greater than 7898 and thus, all the data elements of column B 602 will not be present in column A 601. Column A 601 therefore does not contain column B 602. Thus, the IDDS eliminates the column pair (A,B) from the column pairs that are examined for inclusion dependency. The IDDS eliminates column pairs based on the determined dependency characteristic data of the pairs of arranged columns. In the column pairs remaining after elimination of some column pairs, the IDDS identifies a first column of the column pair as a candidate primary key and a second column of the column pair as a candidate foreign key.

FIGS. 7A-7D exemplarily illustrate determination of inclusion dependency between a candidate primary key and a candidate foreign key in a determined pair of arranged columns by the inclusion dependency determination system (IDDS) using dynamically determined search techniques. Consider an example where the IDDS identifies column A 701 and column B 702 exemplarily illustrated in FIG. 7A, as a candidate primary key and a candidate foreign key respectively. The minimum value and the maximum value of data of column A 701 are 1 and 500000 respectively, and the minimum value and the maximum value of data of column B 702 are 400001 and 400010 respectively. To determine inclusion dependency, the IDDS examines the candidate primary key column A 701 for presence of all data elements of the candidate foreign key column B 702. That is, each data element of column B 702 is searched in column A 701 using multiple search techniques.

In this example, the inclusion dependency determination system (IDDS) dynamically determines the search technique to be used for determining inclusion dependency based on the average step size of column A 701. The IDDS computes the average step size of column A 701 as $(500000-1)/500000 \approx 1$. Since the minimum value min_B of column B 702 is substantially large when compared to the minimum value min_A of column A 701, performing a sequential search of each data element of column B 702 in column A 701 is more time consuming. The IDDS implements dynamic pointers pmin_A, pmin_B, pmax_A, and pmax_B and initializes the dynamic pointers to point to the minimum values min_A and min_B and the maximum values max_A and max_B of column A 701 and column B 702 respectively, as exemplarily illustrated in FIG. 7A. A dynamic pointer is a variable that points to a data element in a column. The dynamic pointer has a value that is an indexed position of a data element in the column. That is, pmin_A points to a minimum value of data of column A 701 and pmax_A points to a maximum value of data of column A 701. Therefore, pmin_A having a value 1, points to the minimum value 1 of column A 701, and pmax_A having a value 500000 points to the maximum value 500000 of column A 701. Similarly, pmin_B having a value 1, points to the minimum value 400001 of column B 702, and pmax_B having a value 10 points to the maximum value 400010 of column B 702. The IDDS compares the minimum values pointed by pmin_A and pmin_B and computes the difference "diff" as (minimum value pointed by pmin_B-minimum value pointed by pmin_A)/average step size of column A 701=$(400001-1)/1=400000$. The IDDS compares the difference "cliff" with a binary logarithm of (value of pmax_A-value of pmin_A)= $\log_2(500000-1)=19$, where (value of pmax_A-value of pmin_A) defines the number of data elements between the pointers pmin_A and pmax_A. Since the difference "cliff" is greater than 19, the IDDS selects a binary search as an optimal search technique to determine the presence of 400001 indicated by the dynamic pointer pmin_B, in column A 701.

The inclusion dependency determination system (IDDS) determines a middle value between the value of pmin_A and the value of pmax_A of column A 701 to be $(500000+1)/2=250000.5$ (250001) and the data element at position 250001 in column A 701 to be 250001. The IDDS determines whether the minimum value 400001 of column B 702 is greater than or less than 250001. Since 400001 is greater than 250001, the IDDS searches for the minimum value 400001 of column B 702 in the lower half of column A 701. The IDDS initializes the dynamic pointer pmin_A to 250001 and the dynamic pointer pmax_A to 500000. The IDDS determines a middle value between the value of pmin_A and the value of pmax_A of column A 701 to be $(250001+500000)/2=375000.5$ (~375001) and the data element at position 375001 in column A 701 to be 375001. The IDDS determines that the minimum value 400001 of column B 702 is greater than 375001. The IDDS initializes the dynamic pointer pmin_A to 375001 and the dynamic pointer pmax_A to 500000. Further, the IDDS determines a middle value between the value of pmin_A and the value of pmax_A to be $(375001+500000)/2=437500.5$ (~437501) and determines that the minimum value 400001 of column B 702 is less than 437501. The IDDS initializes the dynamic pointer pmin_A to 375001 and the dynamic pointer pmax_A to 437501. The IDDS determines a middle value between the value of pmin_A and the value of pmax_A to be $(375001+437501)/2=406251$ and the data element at position 406251 in column A 701 to be 406251. The IDDS determines that the minimum value 400001 of column B 702 is less than 406251. The IDDS initializes the dynamic pointer pmin_A to 375001 and the dynamic pointer pmax_A to 406251. The IDDS determines a middle value between the value of pmin_A and the value of pmax_A to be $(375001+406251)/2=390626$ and the data element at position 390626 in column A 701 to be 390626. The IDDS determines that the minimum value 400001 of column B 702 is greater than 390626. The IDDS initializes the dynamic pointer pmin_A to 390626 and the dynamic pointer pmax_A to 406251. The IDDS then determines a middle value between the value of pmin_A and the value of pmax_A to be $(390626+406251)/2=398438.5$ (~398439) and the data element at position 398439 in column A 701 to be 398439. The IDDS determines that the minimum value 400001 of column B 702 is greater than 398439. The IDDS initializes the dynamic pointer pmin_A to 398439 and the dynamic pointer pmax_A to 406251. The IDDS proceeds to determine a middle value between the value of pmin_A and the value of pmax_A to be $(398439+406251)/2=402345$ and the data element at position 402345 in column A 701 to be 402345. The IDDS determines that 402345 is greater than 400001. In this case, the IDDS repeats the binary search for maximum 19 times until the minimum value 400001 of column B 702 is found in column A 701. If the value pointed by pmin_B is not found in column A 701, the IDDS eliminates the arranged columns column A 701 and column B 702 from being an inclusion dependency pair. As exemplarily illustrated in FIG. 7B, the IDDS finds the minimum value 400001 of column B 702 in column A 701 and sets the dynamic pointer pmin_A to point to 400001 in column A 701 and the dynamic pointer pmax_A to point to 500000 since the remaining data elements of column B 702 will lie between 400001 and 500000.

To search for the data element max_B of column B 702, equal to 400010, pointed by the dynamic pointer pmax_B in column A 701, the inclusion dependency determination system (IDDS) compares the values pointed by pmax_A and pmax_B. The value of pmin_A is 400001 and value of pmax_A is 500000. The IDDS performs the search for max_B from the bottom of column A 701 as exemplarily illustrated in FIG. 7B. The IDDS computes the difference "cliff" as (maximum value pointed by pmax_A-maximum value pointed by pmax_B)/average step size of column A 701=(500000-400010)/1=99990. The IDDS compares the difference "cliff" with a binary logarithm of (value of pmax_A-value of pmin_A)=$\log_2$(500000-400001)=16.6. Since the difference "cliff" is greater than 16.6, the IDDS selects a binary search as an optimal search technique to determine the presence of 400010 pointed by the dynamic pointer pmax_B, in column A 701. The IDDS repeats the binary search for a maximum of 17 times until 400010 is found in column A 701. The IDDS then sets the dynamic pointer pmax_A to point to 400010 in column A 701 since the remaining data elements of column B 702 will lie between 400001 and 400010 in column A 701 as exemplarily illustrated in FIG. 7C.

Figure 7A:
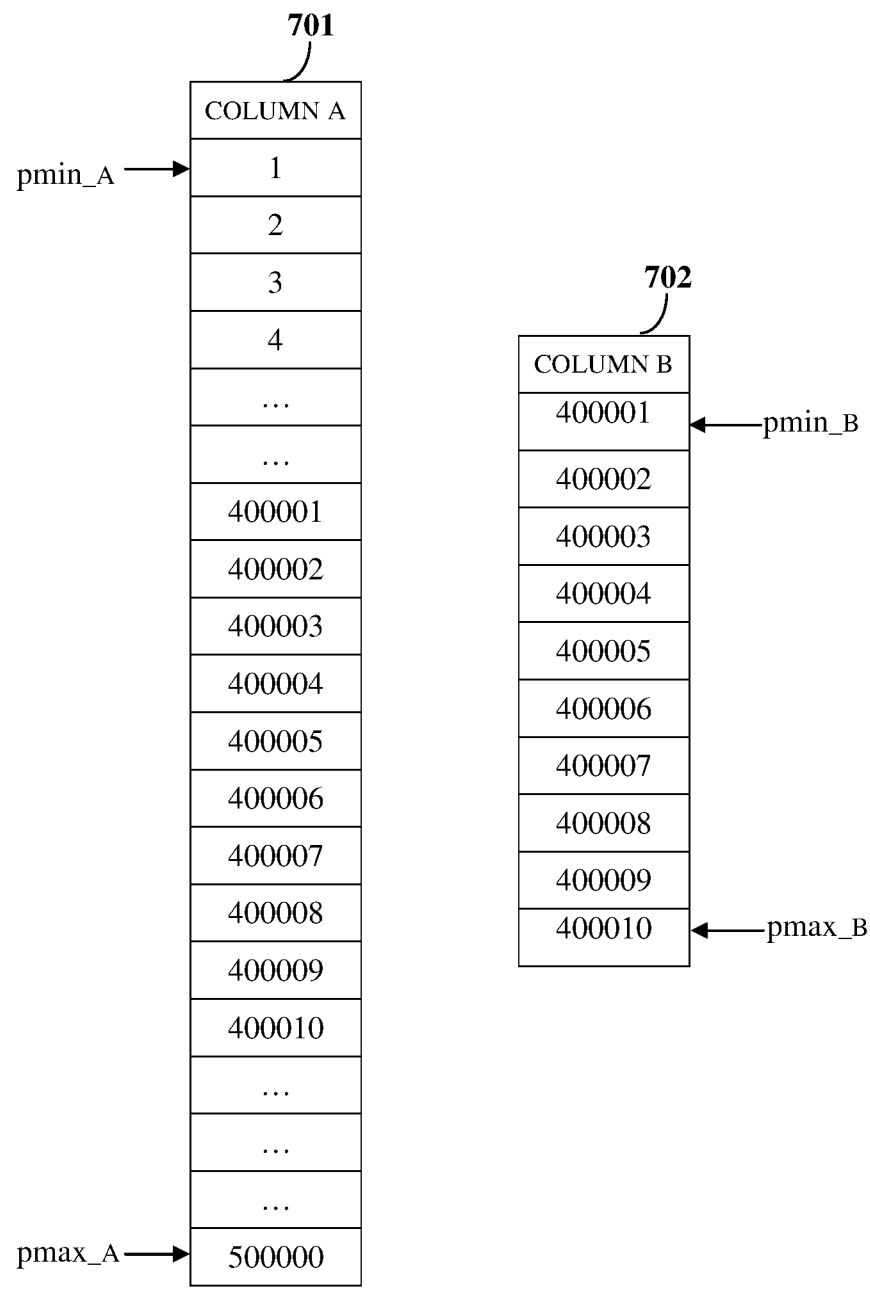
FIGS. 7A-7D exemplarily illustrate determination of inclusion dependency between a candidate primary key and a candidate foreign key in a determined pair of arranged columns by the inclusion dependency determination system using dynamically determined search techniques.
Figure 7B:
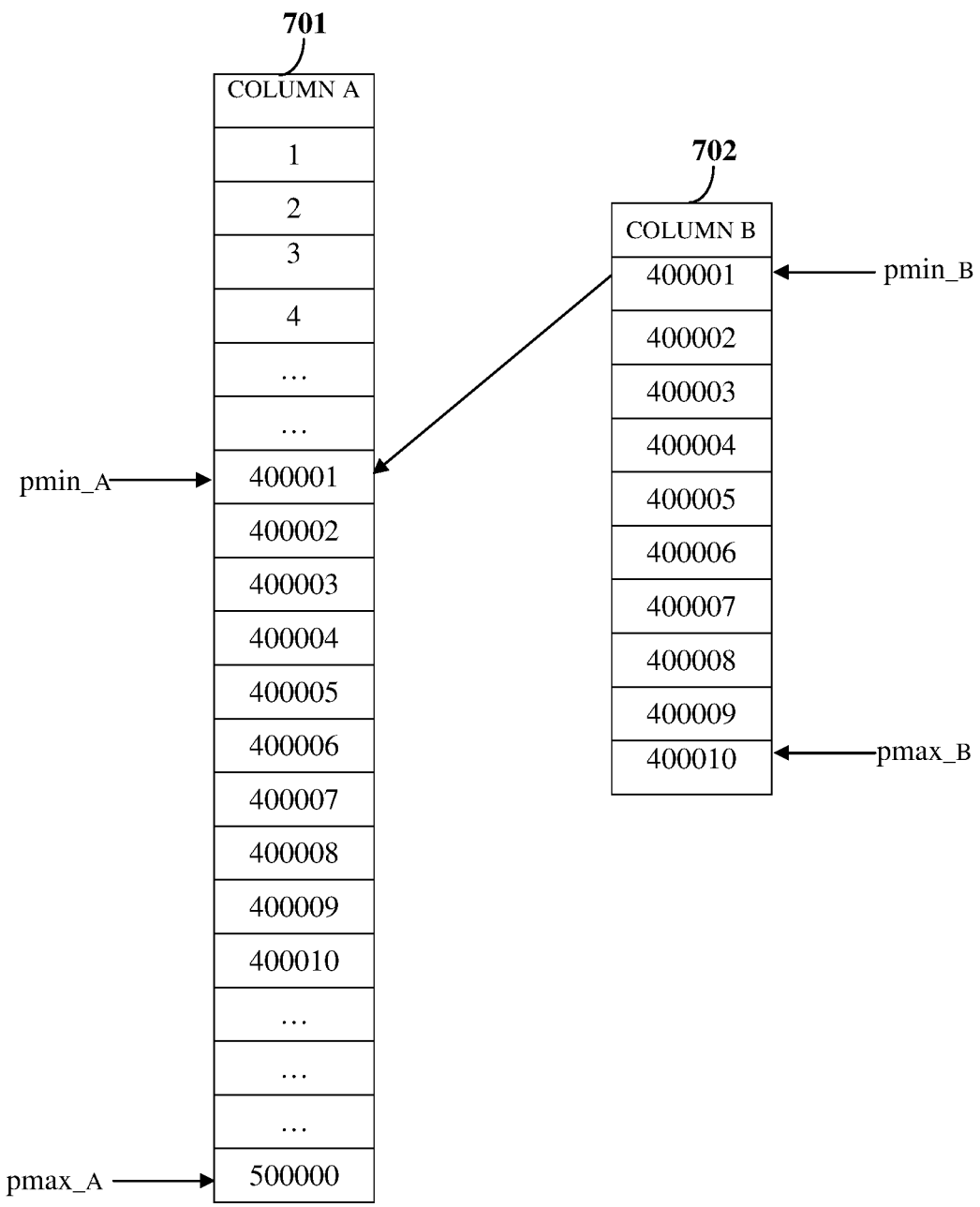
Figure 7C:
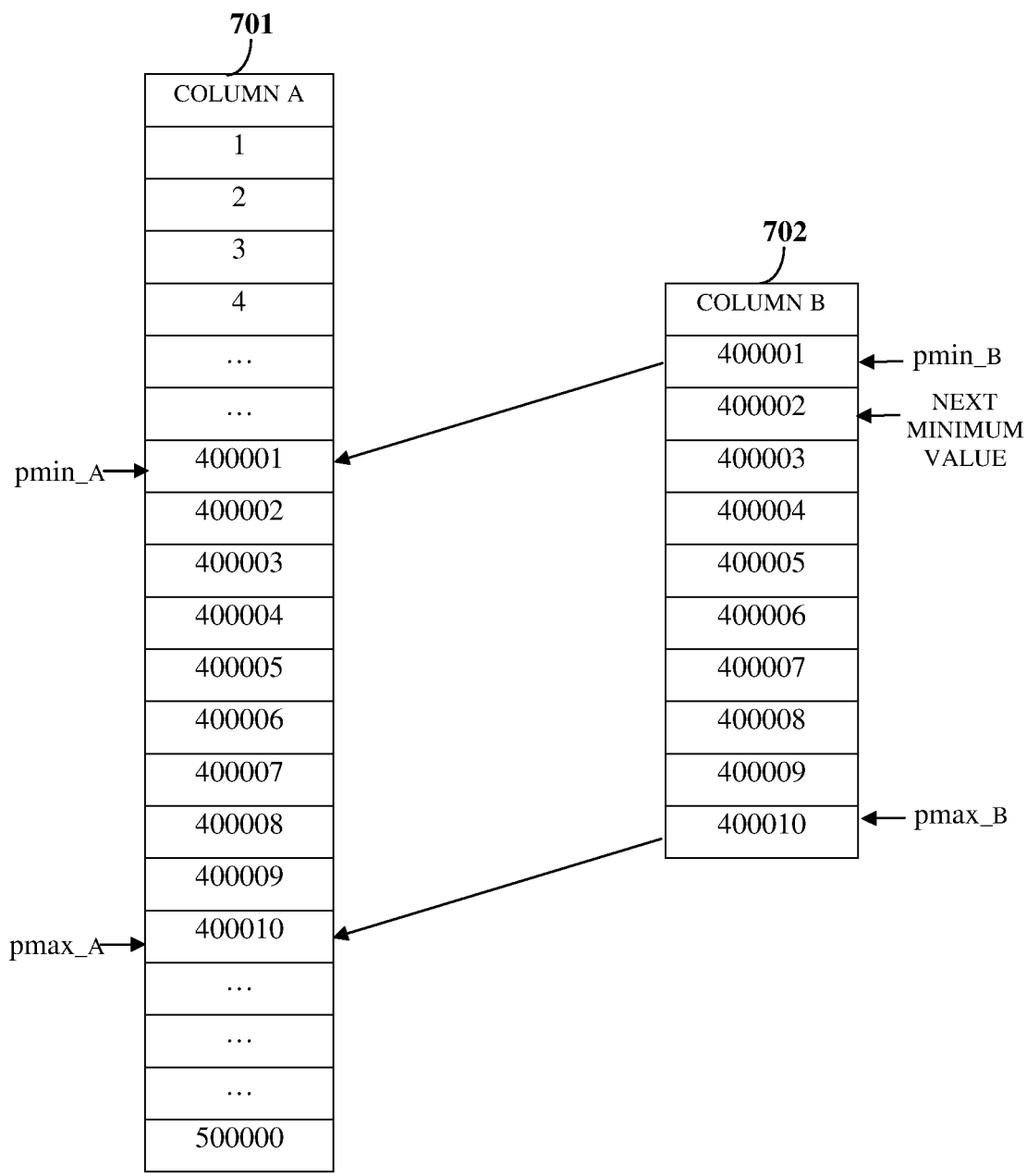
Figure 7D:
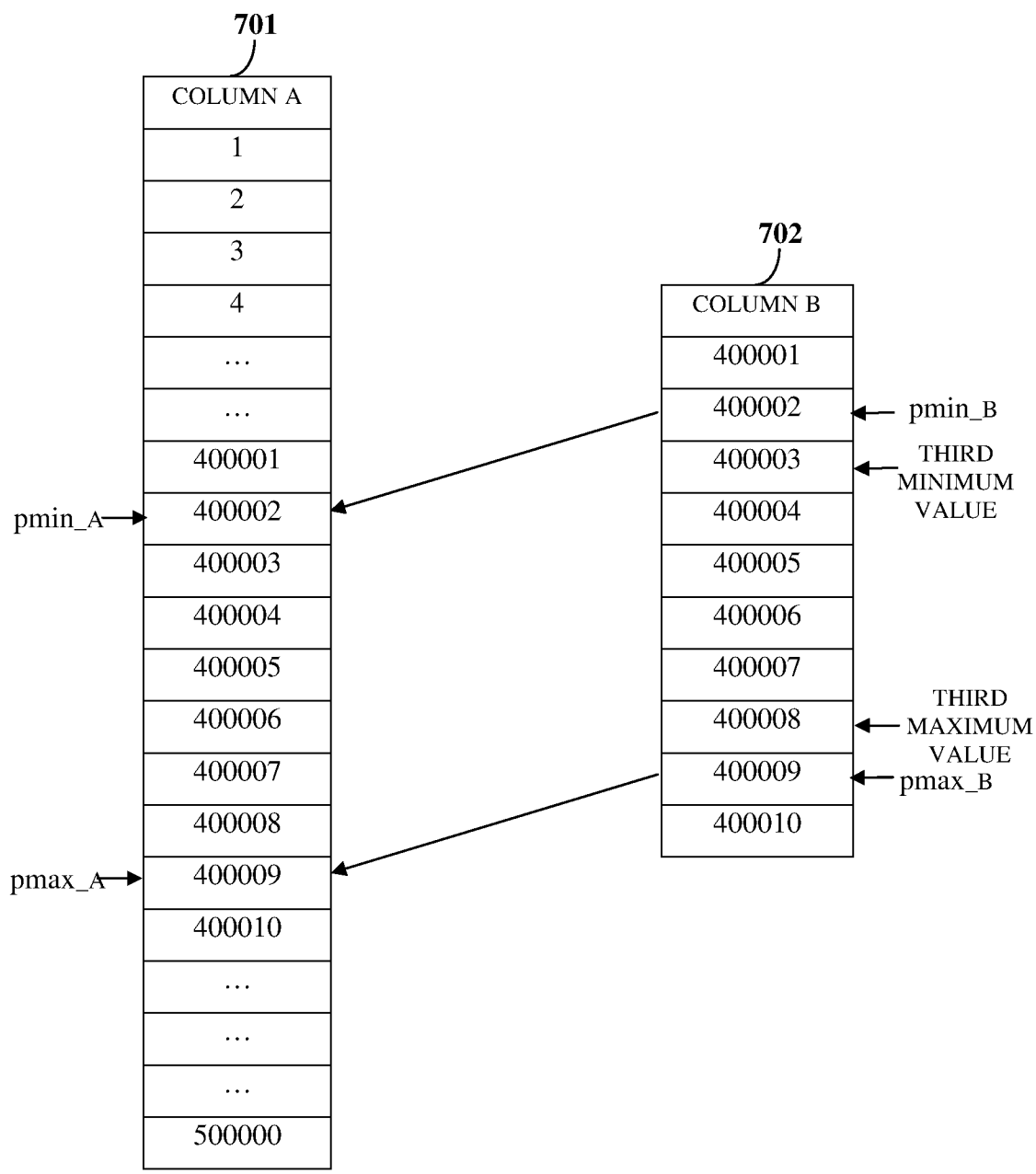

Once the data elements min_B and max_B pointed by the dynamic pointers pmin_B and pmax_B respectively, are found in column A 701, the inclusion dependency determination system (IDDS) increments the dynamic pointer pmin_B and decrements the dynamic pointer pmax_B as exemplarily illustrated in FIG. 7D. The IDDS then searches for a second minimum value 400002 pointed by the dynamic pointer pmin_B in column A 701. The IDDS compares the values pointed by the dynamic pointers pmin_B and pmin_A. The values of the dynamic pointers pmin_A and pmin_B are 400001 and 400002 respectively, and the values of the dynamic pointers pmax_A and pmax_B are 400010 and 400009 respectively. The IDDS computes the difference "diff" as (minimum value pointed by pmin_B-minimum value pointed by pmin_A)/average step size of column A 701=(400002-400001)/1=1. The IDDS compares the difference "diff" with a binary logarithm of (value of pmax_A-value of pmin_A)=$\log_2$(400010-400001)=3.17. Since the difference "diff" is less than 3.17, the IDDS selects a sequential search technique as an optimal search technique to determine the presence of 400002 indicated by the dynamic pointer pmin_B, in column A 701. The IDDS compares 400002 to every data element between 400001 and 400010 sequentially and finds 400002 in one step. To determine the position of a second maximum value 400009 pointed by the dynamic pointer pmax_B in column A 701, the IDDS compares the values pointed by pmax_A and pmax_B and computes the difference "diff" as (maximum value pointed by pmax_A-maximum value pointed by pmax_B)/average step size of column A 701=(400010-400009)/1=1. The IDDS compares the difference "diff" with a binary logarithm of (value of pmax_A-value of pmin_A) =$\log_2$(400010-400001)=3.17. Since the difference "diff" is less than 3.17, the IDDS selects a sequential search technique as an optimal search technique to determine the presence of 400009 indicated by the dynamic pointer pmax_B, in column A 701 sequentially from the bottom of column A 701, starting from the value pointed by pmax_A, and finds 400009 in column A 701 in one step. The IDDS sets the dynamic pointer pmin_A to point to 400002 in column A 701 and sets the dynamic pointer pmax_A to point to 400009 in column A 701 since the remaining data elements of column B 702 will lie between 400002 and 400009 as exemplarily illustrated in FIG. 7D. That is, the IDDS moves the dynamic pointers pmin_A and pmax_A to point to the position of the second minimum value and the second maximum value in column A 701 respectively.

The inclusion dependency determination system (IDDS) increments the dynamic pointer pmin_B and decrements the dynamic pointer pmax_B. The IDDS searches for a third minimum value 400003 pointed by the dynamic pointer pmin_B and a third maximum value 400008 pointed by the dynamic pointer pmax_B in column A 701 as exemplarily illustrated in FIG. 7D. The values of pmin_A and pmax_A are 400002 and 400009 respectively. To search for the third minimum value 400003 pointed by the dynamic pointer pmin_B, in column A 701, the IDDS compares the values pointed by the dynamic pointers pmin_B and pmin_A and computes the difference "cliff" as (minimum value pointed by pmin_B-minimum value pointed by pmin_A)/average step size of column A 701=(400003-400002)/1=1. The IDDS compares the difference "diff" with a binary logarithm of (value of pmax_A-value of pmin_A)=$\log_2$(400009-400002)=2.8. Since the difference "cliff" is less than 2.8, the IDDS selects a sequential search technique as an optimal search technique to determine the presence of 400003 indicated by the dynamic pointer pmin_B, in column A 701, and finds 400003 in column A 701 in one step. Similarly, for searching the third maximum value 400008 pointed by the dynamic pointer pmax_B, in column A 701, the IDDS selects a sequential search technique from the bottom of column A 701, starting backwards from the value 400009 pointed by pmax_A, and finds 400008 in column A 701 in one step.

The inclusion dependency determination system (IDDS) searches for all the data elements of column B 702 in column A 701 in a similar manner as disclosed above. When all the data elements of column B 702 are found in column A 701, the IDDS confirms that the column pair (A,B) is an inclusion dependency pair. If, at any stage, a data element of column B 702 is not found in column A 701, the IDDS stops searching further and confirms that the column pair (A, B) is not an inclusion dependency pair. A generic computer using a generic program cannot determine inclusion dependency between the candidate primary key and the candidate foreign key of each of the determined pairs of the arranged columns to establish primary key-foreign key relationships among the data in the columns, on comparing the data of the candidate primary key with the data of the candidate foreign key using multiple search techniques dynamically determined by the IDDS based on the average step size extracted from the determined dependency characteristic data, while minimizing the disk input and output operations in accordance with the method steps disclosed above.

FIG. 8 exemplarily illustrates a table 801 generated by the inclusion dependency determination system (IDDS) for minimizing disk input and output operations in determining inclusion dependency between a candidate primary key and a candidate foreign key. Consider an example where the IDDS determines pairs (A,B), (A,C), (B,C), (C,D), (C,E), and (E,F) of arranged columns A, B, C, D, E, and F to demonstrate a possibility of inclusion dependency. The IDDS has to further determine inclusion dependency between a candidate primary key and a candidate foreign key of each of the determined pairs. The IDDS reads the determined pair (A,B) from a pruned target database on a file system or a solid state hard drive to a memory unit of the IDDS. Column A is the candidate primary key and column B is the candidate foreign key in the determined pair (A, B). The IDDS computes number of fetches of column A and column B in the remaining determined pairs (A,C), (B,C), (C,D), (C,E), and (E,F). That is, the IDDS computes remaining usage of column A and column B in the remaining determined pairs (A,C), (B,C), (C,D), (C,E), and (E,F) to be 1 and 1 respectively. Column A is further used to determine inclusion dependency between the determined pair (A,C) and column B is further used to determine inclusion dependency between the determined pair (B,C). Since column A and column B are further used to determine inclusion dependency, the IDDS retains the candidate primary key column A and the candidate foreign key column B in the memory unit without relinquishing the candidate primary key column A and the candidate foreign key column B. On retaining column A and column B in the memory unit, the IDDS avoids multiple read operations to fetch column A and column B to the memory unit from the file system or the solid state hard drive. Using dynamically determined search techniques, the IDDS determines inclusion dependency between column A and column B.

The inclusion dependency determination system (IDDS) then proceeds to determine inclusion dependency between column A and column C of the determined pair (A,C). Since column A is present in the memory unit, the IDDS only fetches column C from the file system or the solid state drive to the memory unit. The IDDS computes the number of fetches of column A and column C in the remaining determined pairs (B,C), (C,D), (C,E), and (E,F) to be 0 and 3 respectively. Column A is not used in any of the remaining determined pairs while column C will be used three times to determine inclusion dependency between the determined pairs (B,C), (C,D), and (C,E). After using the dynamically determined search techniques, the IDDS determines inclusion dependency between column A and column C, and then relinquishes column A from the memory unit but retains column C in the memory unit. The IDDS then proceeds to determine inclusion dependency between column B and column C of the determined pair (B,C). Since column C is present in the memory unit, the IDDS only fetches column B from the file system or the solid state drive to the memory unit. For the determined pair (B,C), the IDDS computes the number of fetches of column B and column C in the remaining determined pairs (C,D), (C,E), and (E,F) to be 0 and 2 respectively. After the determined pair (B,C) is examined for inclusion dependency using the dynamically determined search techniques, the IDDS relinquishes column B, but retains column C in the memory unit.

The inclusion dependency determination system (IDDS) then proceeds to determine inclusion dependency between column C and column D of the determined pair (C,D). Since column C is present in the memory unit, the IDDS only fetches column D from the file system or the solid state drive to the memory unit. For the determined pair (C,D), the IDDS computes number of fetches of column C and column D in the remaining determined pairs (C,E) and (E,F) to be 1 and 0 respectively. After the determined pair (C,D) is examined for inclusion dependency using the dynamically determined search techniques, the IDDS relinquishes column D, but retains column C in the memory unit. The IDDS then proceeds to determine inclusion dependency between column C and column E of the determined pair (C,E). Since column C is present in the memory unit, the IDDS only fetches column E from the file system or the solid state drive to the memory unit. For the determined pair (C,E), the IDDS computes the number of fetches of column C and column E in the remaining determined pair (E,F) to be 0 and 1 respectively. After the determined pair (C,E) is examined for inclusion dependency using the dynamically determined search techniques, the IDDS relinquishes column C but retains column E in the memory unit. The IDDS then proceeds to determine inclusion dependency between column E and column F of the determined pair (E,F). Since column E is present in the memory unit, the IDDS only fetches column F from the file system or the solid state drive to the memory unit. For the determined pair (E,F), the IDDS computes the number of fetches of column E and column F to be 0 and 0 respectively, since there are no remaining determined pairs. The IDDS relinquishes column E and column F from the memory unit after the determined pair (E,F) is examined for inclusion dependency using the dynamically determined search techniques.

Since the inclusion dependency determination system (IDDS) computes the number of fetches of the candidate primary key and the candidate foreign key of each of the determined pairs of arranged columns, that is, the IDDS is aware of the candidate primary key and the candidate foreign key that are needed again for examining inclusion dependency, the IDDS stores the read candidate primary key and the read candidate foreign key in the memory unit and uses them later rather than reading the candidate primary key and the candidate foreign key from the pruned target database again as the reading of the candidate primary key and the candidate foreign key is more time consuming because of the repeated disk input and output operations. Thus, the IDDS saves database access time for each candidate primary key and each candidate foreign key. Empirically, the IDDS avoids the disk input and output operations for more than N times and hence the IDDS saves more than 50% database access time or disk input and output operations, if the IDDS determines inclusion dependency for N column pairs. A generic computer using a generic program cannot minimize disk input and output operations in determining inclusion dependency between a candidate primary key and a candidate foreign key in accordance with the method steps disclosed above.

On implementing the method disclosed herein, the end result is a tangible determination of inclusion dependency between multiple columns in the same table or different tables of the target database to establish primary key-foreign key relationships among data in the columns of the tables with minimized disk input and output operations. Determination of inclusion dependency narrows down the number of column pairs to be examined for determining primary key-foreign key relationships among data in the columns of the tables. On determining primary key-foreign key relationships among data in the columns, there is consistency in data references across application programs that access the target database, thereby reducing the time for development of the application programs. Determination of primary key-foreign key relationships maintains referential integrity of the tables in the target database. With the referential integrity, the quality of data stored in the tables of the target database is boosted. With the referential integrity maintained, writing custom programming codes for the tables individually is eliminated and chances of bugs in the programming code is reduced. The inclusion dependency determination system (IDDS) determines inclusion dependency among data in the columns of the tables to establish primary key-foreign key relationships between data in the columns of the tables whose metadata is not updated or maintained.

The data inputted to the inclusion dependency determination system (IDDS), for example, a configurable threshold of widths of the columns to eliminate column pairs from the target database, the characteristic data type used to prune the target database, etc., is transformed, processed, and executed by an algorithm in the IDDS. In pruning the target database based on the characteristic data type, the user is allowed to configure the data types of the columns that the user desires to eliminate from the target database since number and string data type are the probable data types of primary keys and foreign keys of the tables in the target database. The IDDS, using the input on the data type from the user, scans the target database for the data types, identifies the columns with the inputted data types, and eliminates the identified columns from being examined for inclusion dependency. To eliminate pairs of arranged columns from being examined for inclusion dependency, the IDDS allows the user to input a configurable column width of the columns. The column width of a primary key or a foreign key of a table is typically not a long string. Therefore, the IDDS eliminates columns with column widths greater than the inputted column width, for example, 100 from being examined for inclusion dependency.

The method disclosed herein improves the functionality of the computer and provides an improvement in database related technology related to determining primary key-foreign key relationships among data in multiple columns of multiple tables of the target database using inclusion dependency as follows: On implementing the method disclosed herein, the inclusion dependency determination system (IDDS) determines inclusion dependency between the columns of the tables in the target database substantially fast. The IDDS applies the predefined rules to the columns of the pruned target database as disclosed in the detailed description of FIGS. 3A-3B, for arranging the columns in an increasing order to examine for inclusion dependency from the vast set of columns of the pruned target database. For arranging the columns in an increasing order, the IDDS uses an intelligent combination of features, that is, the characteristic information of the data in the columns extracted from the metadata of the columns, for example, a combination of distinct count, null or blank value count, column width, etc., and the dependency characteristic data. On arranging the columns in an increasing order, the IDDS eliminates column pairs where the first column of each of the column pairs may not contain the second column of each of the column pairs. The IDDS verifies nonexistence of inclusion dependency between such invalid column pairs and eliminates the invalid column pairs from a candidate set of column pairs that are used to test for inclusion dependency.

The inclusion dependency determination system (IDDS) also minimizes the number of disk input and output operations for reducing latency and throughput of the disk to read and write between the pruned target database and the memory unit of the IDDS. By minimizing the disk input and output operations, the IDDS avoids data reloading from the pruned target database to the memory unit and saves time in reloading the data from the pruned target database to the memory unit. The IDDS uses an enhanced file loading technique by computing the number of fetches of the candidate primary keys and the candidate foreign keys and caches the candidate primary keys and candidate foreign keys in the memory unit based on the computed number of fetches. Moreover, the IDDS dynamically determines a search technique, for example, a sequential search, a binary search, a bidirectional search, etc., or any combination thereof to search for every data element of a candidate foreign key in a candidate primary key based on the computed average step size of the candidate primary key as disclosed in the detailed description of FIG. 1 and FIGS. 7A-7D. The computed average step size estimates the next data element or the previous data element to be searched in the candidate primary key from the minimum value or the maximum value of the candidate primary key respectively. The IDDS uses the estimation of the next data element or the previous data element in the candidate primary key to compute a difference between a data element of the candidate foreign key and the estimated the next data element or the previous data element. Based on the computed difference, the IDDS dynamically determines a search technique to search for the data element of the candidate foreign key in the candidate primary key and searches for every data element of the candidate foreign key in the candidate primary key using the dynamically determined search technique substantially fast. The columns with inclusion dependencies determined by the IDDS are optimal candidates to be examined for primary key-foreign key relationships.

The focus of the method and the inclusion dependency determination system (IDDS) disclosed herein is on an improvement to database technology and computer functionalities, and not on tasks for which a generic computer is used in its ordinary capacity. Accordingly, the method and the IDDS disclosed herein are not directed to an abstract idea. Rather, the method and the IDDS disclosed herein are directed to a specific improvement to the way the processor in the IDDS operates, embodied in, for example, determining dependency characteristic data comprising an average step size of each of the columns in the pruned target database, arranging the columns in the pruned target database by applying one or more predefined rules to the columns based on a minimum value of the data of each of the columns extracted from the determined dependency characteristic data, determining pairs of arranged columns that demonstrate a possibility of inclusion dependency based on the determined dependency characteristic data of the pairs of arranged columns, and determining inclusion dependency between the candidate primary key and the candidate foreign key of each of the determined pairs of arranged columns to establish the primary key-foreign key relationships among the data in the columns, on comparing the data of the candidate primary key with the data of the candidate foreign key using multiple search techniques dynamically determined based on the average step size extracted from the determined dependency characteristic data, while minimizing the disk input and output operations.

In the method disclosed herein, the design and flow of data and interactions between the target database and the inclusion dependency determination system (IDDS) are deliberate, designed, and directed. The columns received from the target database are processed by the IDDS to steer the IDDS towards a finite set of outcomes. The IDDS implements seven or more specific computer programs and subprograms for determining inclusion dependency between columns of tables in a target database substantially fast to establish primary key-foreign key relationships among data in the columns with minimized disk input and output operations, the execution of which cannot be performed by a person using a generic computer with a generic program. The steps performed by the IDDS disclosed above are tangible, provide useful results, and are not abstract. The software implementation of the IDDS is an improvement in computer related and database technology.

Figure 9A:
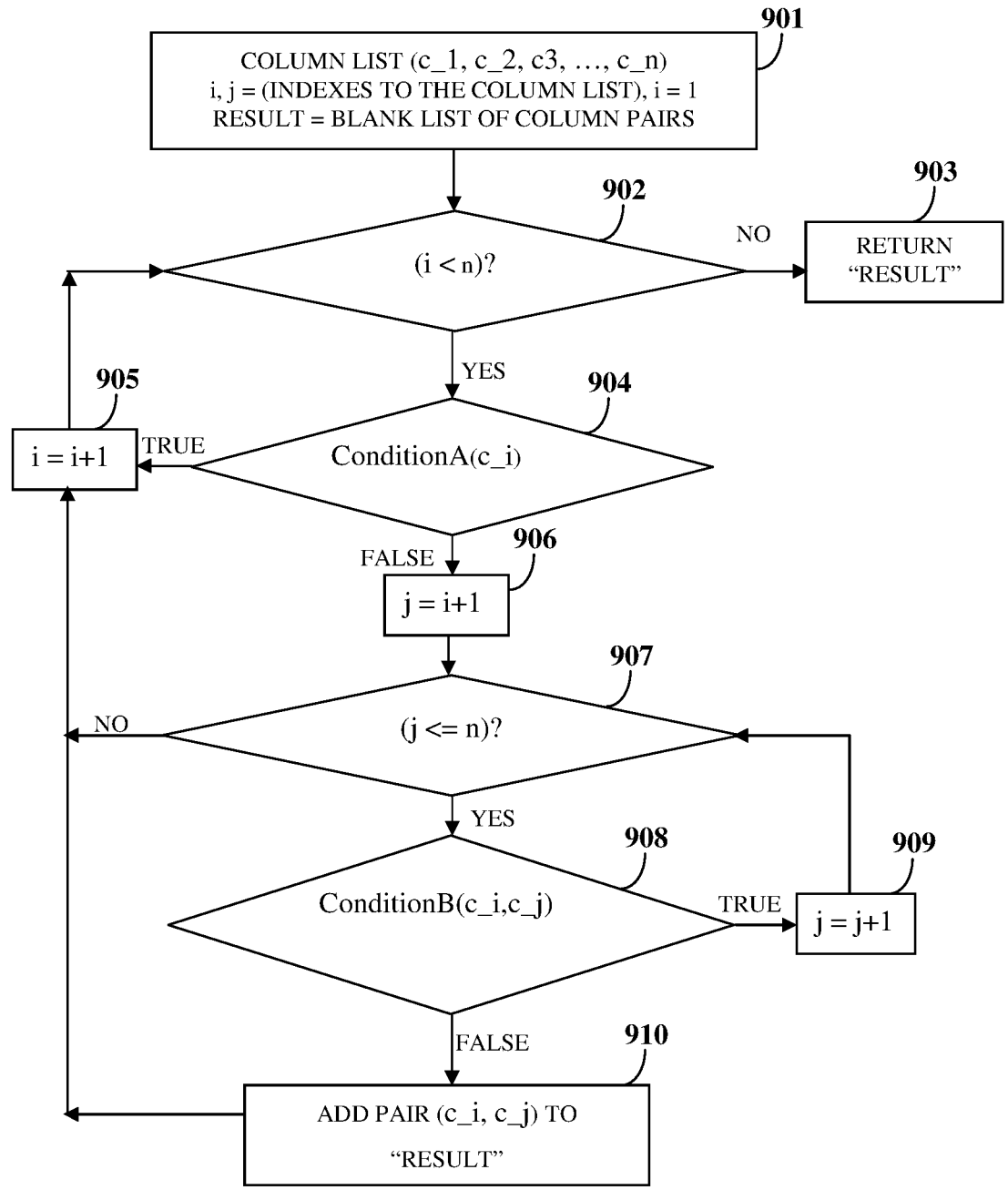

FIGS. 9A-9C exemplarily illustrate a flowchart comprising the steps performed by the inclusion dependency determination system (IDDS) for determining pairs ($c\_i, c\_j$) of arranged columns that demonstrate a possibility of inclusion dependency. As exemplarily illustrated in FIG. 9A, the input 901 to the IDDS is a list of arranged columns, that is, a column list ($c\_1, c\_2, c3, \ldots, c\_n$), and indexes "i" and "j" of the arranged columns, where "i" is the index of a first column in each of the pairs of the arranged columns and "j" is the index of a second column in each of the pairs of the arranged columns. The IDDS initializes index "i" as 1 and "result" as a blank list of determined pairs of arranged columns. For every pair of arranged columns, for example, (c_1,c_2), (c_2,c_1), (c_1,c_3), etc., the IDDS compares 902 the index of the first column "i" with the total number of arranged columns "n". If the index "i" is greater than "n", the IDDS returns 903 the list of determined pairs of arranged columns in "result". If the index "i" is less than "n", the IDDS checks 904 whether the first column in the column list meets ConditionA (c_i) 911 exemplarily illustrated in FIG. 9B. If the ConditionA (c_i) 911 is true for the first column with index "i", the IDDS increments 905 the index "i" by 1 and iterates the comparison 902 of "i" with "n". If the ConditionA (c_i) 911 is false for the first column with index "i", the IDDS assigns 906 the index of the second column "j" in the pair of arranged columns with "i+1". The IDDS compares 907 the index "j" with "n". If the index "j" is greater than "n", the IDDS increments 905 the index "i" by 1 and iterates the process from step 902. If "j" is less than or equal to "n", the IDDS checks 908 whether the pair of the arranged columns in the column list meets ConditionB (c_i,c_j) 912 exemplarily illustrated in FIG. 9C. If the ConditionB (c_i,c_j) 912 for the pair of arranged columns is true, the IDDS increments 909 the index "j" by 1 and iterates the comparison 907 of "j" with "n". If the Condition (c_i,c_j) 912 is false for the pair of arranged columns, the IDDS adds 910 the determined pair (c_i,c_j) to the list of determined pairs of arranged columns in "result", increments 905 the index "i" by 1, and iterates the process from step 902.

FIG. 9B exemplarily illustrates conditions examined by the inclusion dependency determination system (IDDS) to determine whether an arranged column c_i qualifies as a candidate primary key or a candidate foreign key. The IDDS determines whether the arranged column (c_i) is a foreign key, or whether the arranged column (c_i) has a null or a blank value present in the arranged column (c_i), or whether width of the arranged column (c_i) is greater than 100, or whether distinct count of the arranged column (c_i) is less than total count of the arranged column (c_i). If any of the conditions recited in ConditionA (c_i) 911 is true, the IDDS continues to the step 905 disclosed in the detailed description of FIG. 9A. A candidate primary key or a candidate foreign key will not have a null or a blank value present in the arranged column (c_i) and width of the arranged column (c_i) will not be greater than 100. A width of 100 of an arranged column indicates the data element in the arranged column is a long string and hence the arranged column does not qualify to be a candidate primary key or a candidate foreign key. The distinct count of the arranged column being less than the total count of the arranged column indicates that the arranged column has duplicate data elements and cannot be a candidate primary key or a candidate foreign key. The IDDS eliminates the arranged columns that satisfy the ConditionA (c_i) 911 exemplarily illustrated in FIG. 9B.

FIG. 9C exemplarily illustrates conditions examined by the inclusion dependency determination system (IDDS) to determine whether a pair of arranged columns (c_i,c_j) qualifies as a determined pair of a candidate primary key and a candidate foreign key. The IDDS checks the following conditions: whether a maximum value of the arranged column (c_i) is less than a maximum value of the arranged column (c_j); or whether the distinct count of the arranged column (c_i) is less than the distinct count of the arranged column (c_j); or whether the data type of both the arranged columns (c_i) and (c_j) is different; or whether the arranged column (c_j) is a primary key; or whether width of the arranged column (c_j) is greater than 100; or whether a unique constraint is applied on the arranged column (c_j); or whether a sequence constraint is applied on the arranged column (c_j); or whether the arranged columns (c_i) and (c_j) are from the same table and whether the data type of the arranged column (c_i) is not "number"; or whether the arranged columns (c_i) and (c_j) are from the same table and whether names of the arranged columns (c_i) and (c_j) do not end with "ID", "KEY", "NUM", "NUMBER", "CD", and "CODE". If any of the conditions recited in Condition (c_i,c_j) 912 is true, the IDDS eliminates the arranged column (c_j) from being a candidate foreign key and also the column pair (c_i,c_j) from being a determined pair of a candidate primary key and a candidate foreign key. The output of the flowchart exemplarily illustrated in FIG. 9A, is the result comprising the determined pairs of arranged columns that do not satisfy the conditions exemplarily illustrated in FIG. 9B and FIG. 9C, and that demonstrate a possibility of inclusion dependency.

FIGS. 10A-10G exemplarily illustrate flowcharts comprising the steps performed by the inclusion dependency determination system (IDDS) for determining inclusion dependency between a candidate primary key and a candidate foreign key using dynamically determined search techniques. As exemplarily illustrated in FIGS. 10A-10B, the input 1001 to the IDDS is two arranged columns, column A and column B; dynamic pointers pmin_A and pmin_B that point to minimum values of data of column A and column B respectively, dynamic pointers pmax_A and pmax_B that point to maximum values of data of column A and column B respectively, and values min_A, min_B, max_A, and max_B pointed by the dynamic pointers pmin_A, pmin_B, pmax_A, and pmax_B respectively. The IDDS compares 1002 min_A with min_B. If min_A is less than min_B, the IDDS determines 1004 a search technique for the minimum value min_B as exemplarily illustrated in FIG. 10C. If min_A is greater than min_B, the IDDS exits 1003 the process since column A will not contain all the data elements of column B. Based on the flowchart exemplarily illustrated in FIG. 10C, the IDDS performs a binary search 1005 as exemplarily illustrated in FIG. 10E, or a performs a sequential search 1006 as exemplarily illustrated in FIG. 10F, for the minimum value min_B pointed by the dynamic pointer pmin_B, in column A. The IDDS checks 1007 whether min_B is found in column A. If min_B is not found in column A, the IDDS exits 1008 the process, since column A will not contain all the data elements of column B. If the min_B is found in column A, the IDDS compares 1009 max_A with max_B. If max_A is less than max_B, the IDDS exits 1010 the process, since column A will not contain all the data elements of column B. If max_A is greater than max_B, the IDDS determines 1011 a search technique for the maximum value max_B as exemplarily illustrated in FIG. 10D.

Figure 10A:
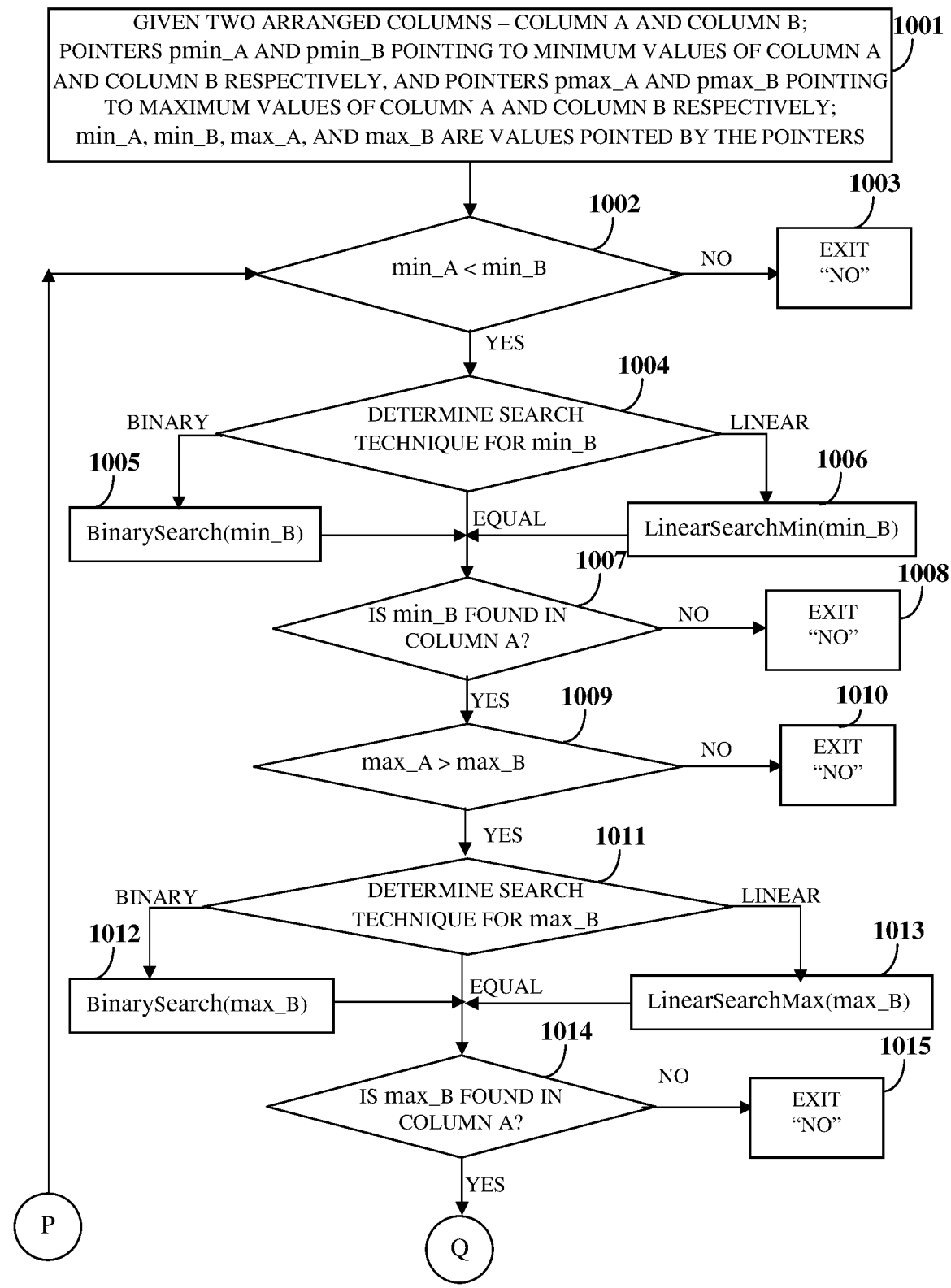
FIGS. 10A-10G exemplarily illustrate flowcharts comprising the steps performed by the inclusion dependency determination system for determining inclusion dependency between a candidate primary key and a candidate foreign key using dynamically determined search techniques.
Figure 10B:
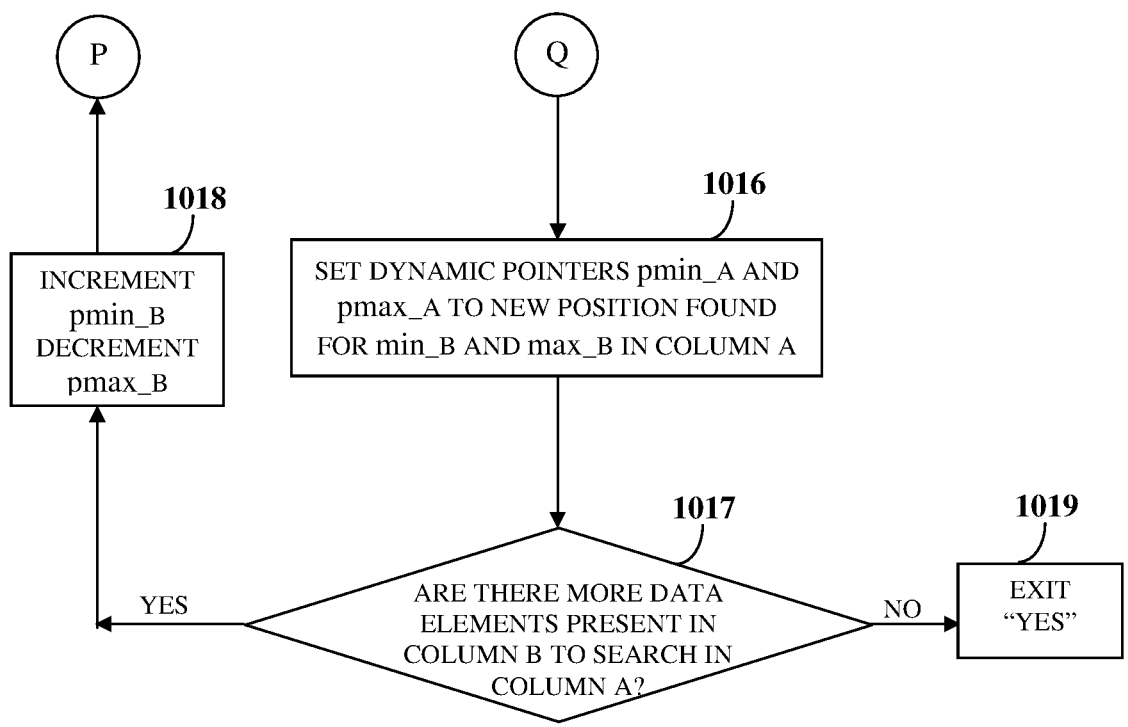
Figure 10C:
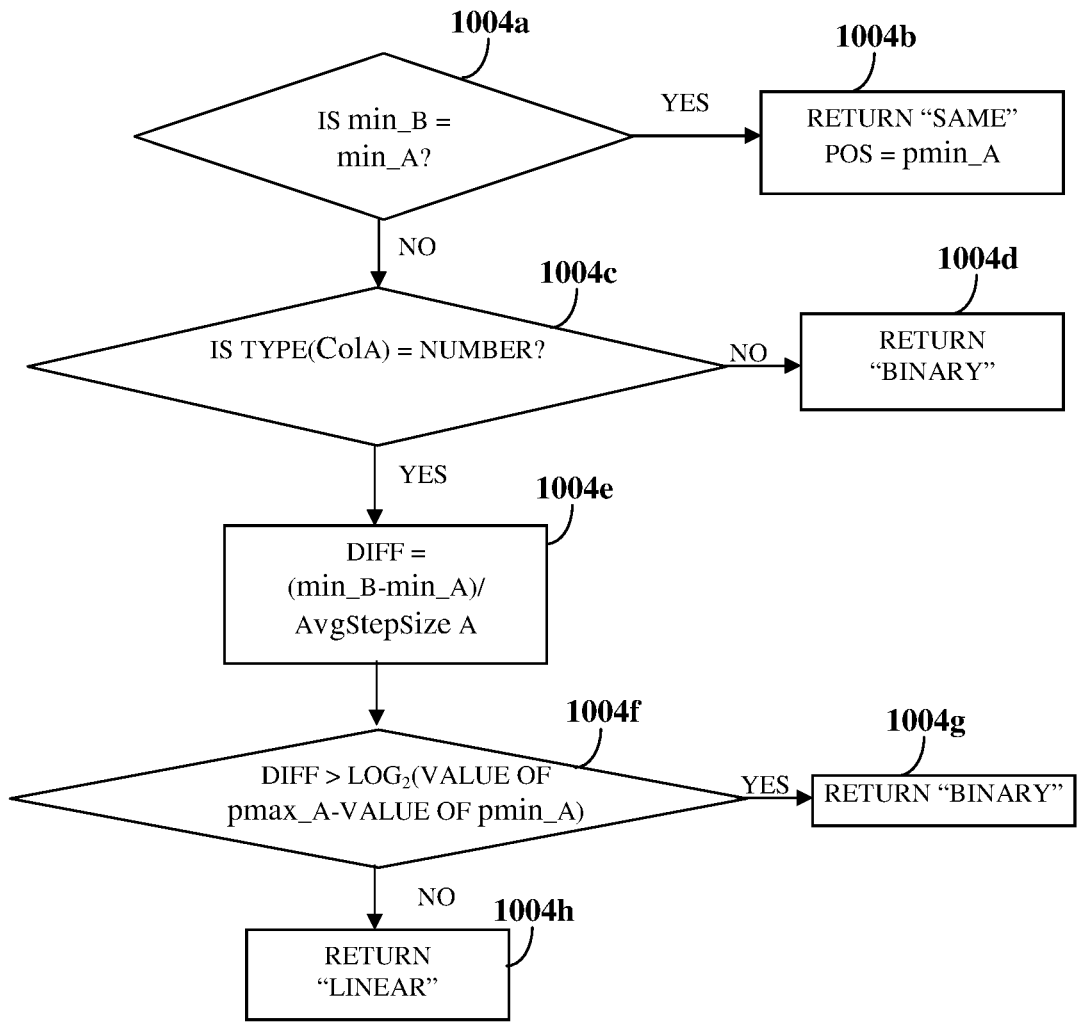
Figure 10D:
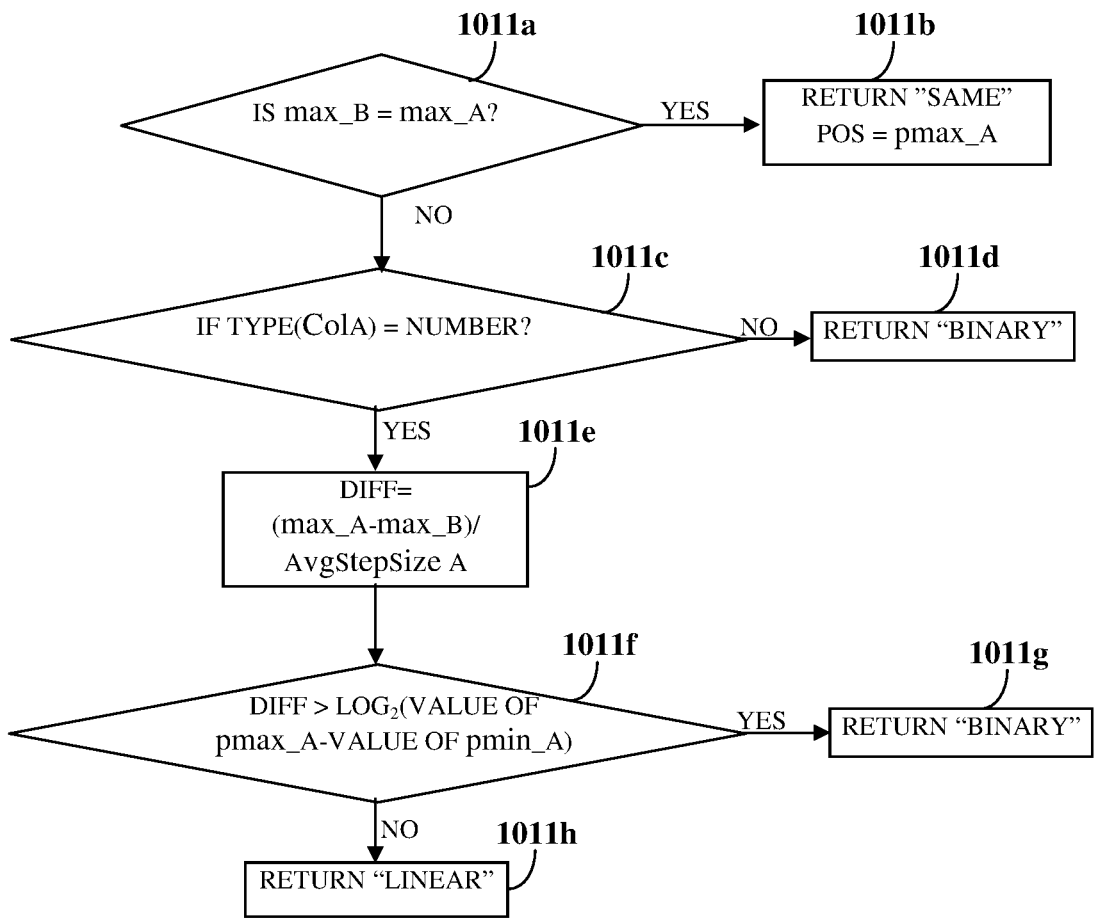
Figure 10E:
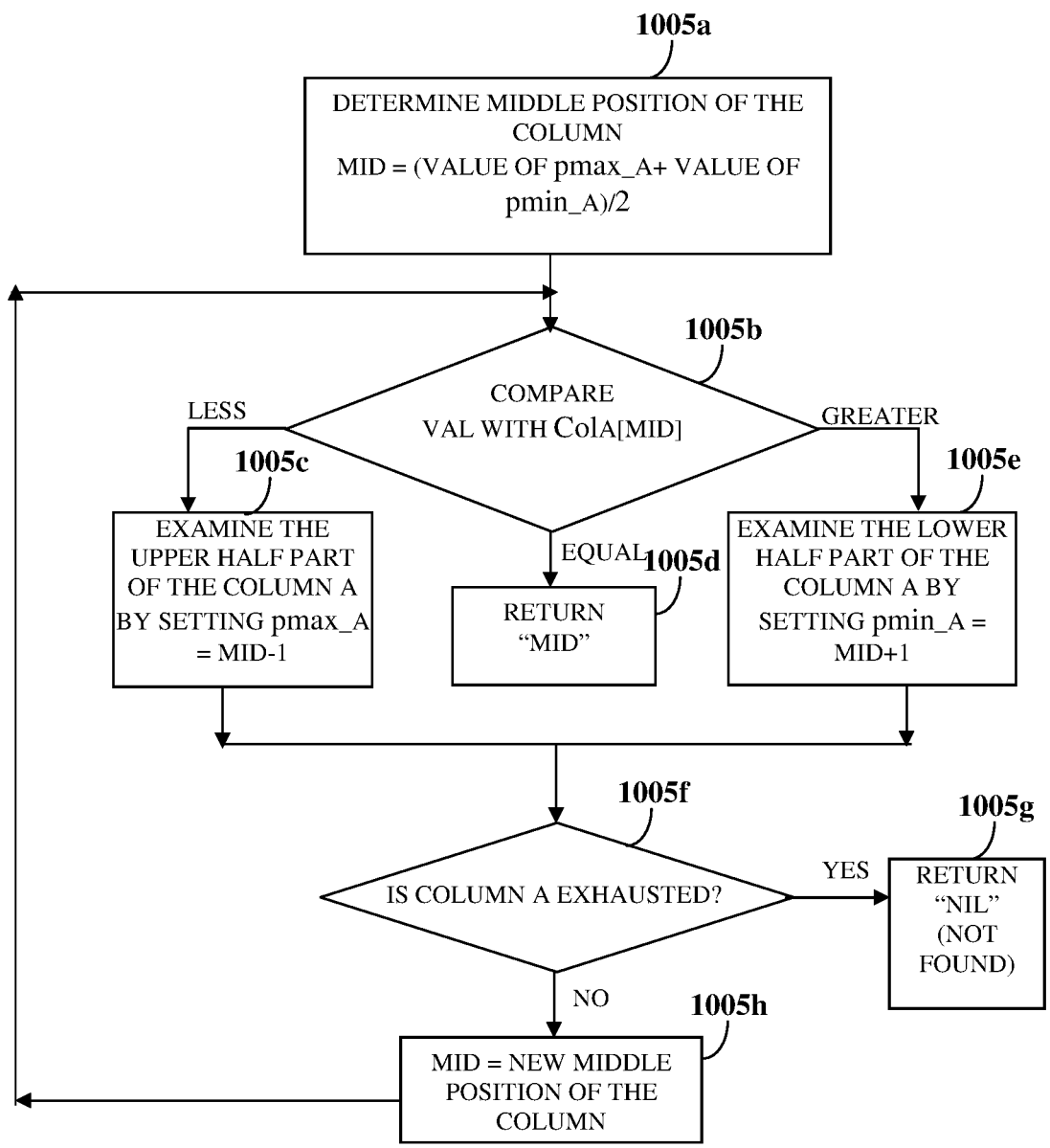
Figure 10F:
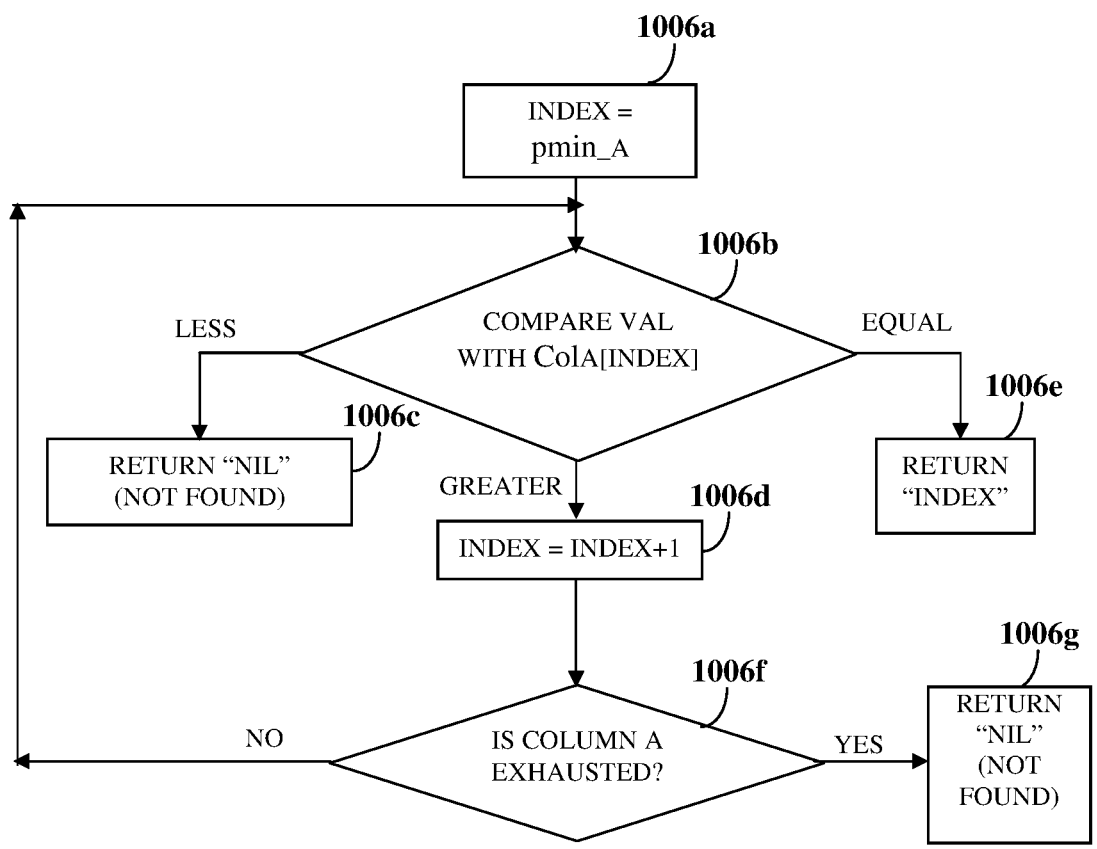
Figure 10G:
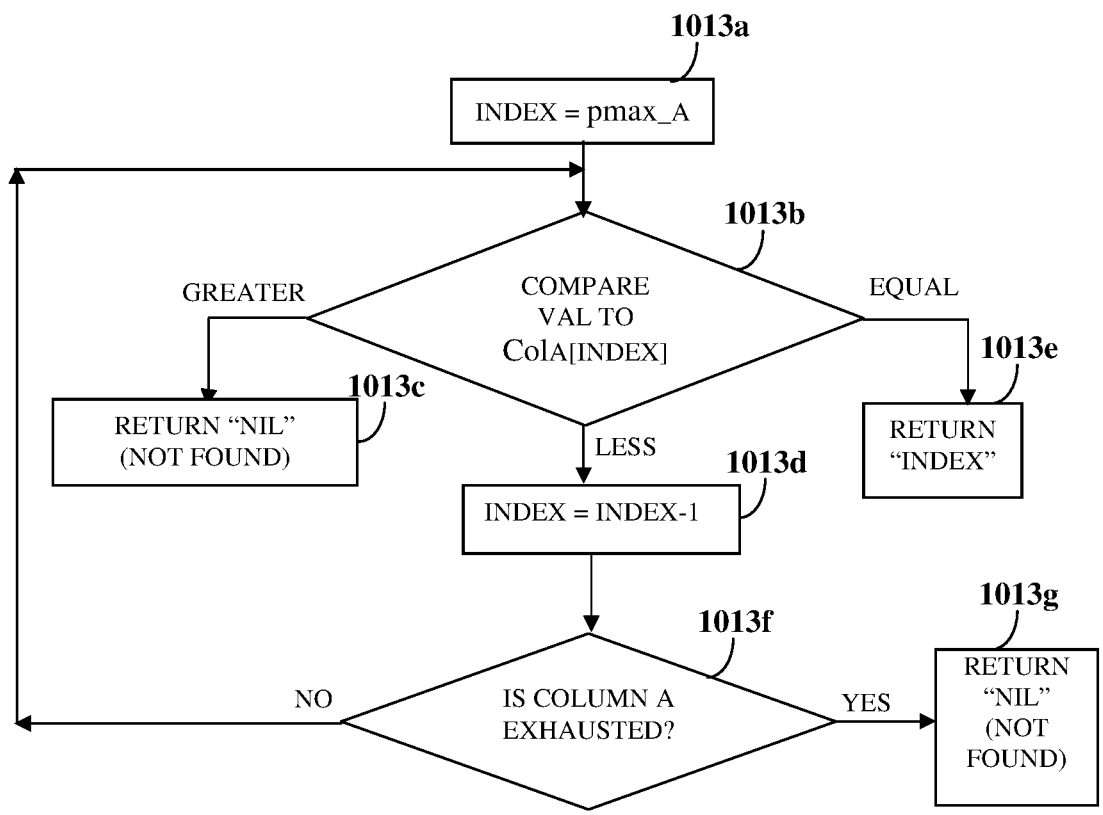

Based on the flowchart exemplarily illustrated in FIG. 10D, the inclusion dependency determination system (IDDS) performs a binary search 1012 as exemplarily illustrated in FIG. 10E, or a performs a sequential search 1013 as exemplarily illustrated in FIG. 10G, for the maximum value max_B pointed by the pmax_B, in column A. The IDDS checks 1014 whether max_B is found in column A. If max_B is not found in column A, the IDDS exits 1015 the process, since column A will not contain all the data elements of column B. If max_B is found in column A, the IDDS sets 1016 the dynamic pointers pmin_A and pmax_A to a new position found for min_B and max_B respectively, in column A. Further, the IDDS checks 1017 whether there are more data elements present in column B to search in column A. If there are more data elements present in column B to search in column A, the IDDS increments 1018 the dynamic pointer pmin_B and decrements the dynamic pointer pmax_B to point to the next minimum value and the next maximum value in column B respectively. The IDDS iterates the process from step 1002 for all the data elements in column B. If there are no more data elements present in column B, the IDDS exits 1019 the process and confirms that the determined pair of column A and column B forms an inclusion dependency pair since all the data elements of column B are found in column A.

FIG. 10C exemplarily illustrates a flowchart comprising the steps performed by the inclusion dependency determination system (IDDS) for dynamically determining a search technique for searching for the minimum value min_B pointed by the dynamic pointer pmin_B, in column A. The IDDS checks 1004a whether min_B and min_A are equal. If min_B is equal to min_A, the IDDS returns 1004b the position of min_A pointed by the dynamic pointer pmin_A as the position of min_B POS, in column A. If the values min_B and min_A are not equal, the IDDS checks 1004c whether the data type of column A ColA is "number". If the data type of column A is not "number", the IDDS returns 1004d "binary" and determines the binary search as the optimal search technique to find min_B in column A. That is, if column A and column B are of a string data type, the IDDS performs a binary search of the data elements of column B in column A. If the data type of column A is number, the IDDS computes 1004e a difference "diff" as (min_B−min_A)/average step size of column A. The IDDS proceeds to determine 1004f whether the difference "diff" is greater than $\log_2$(value of pmax_A-value of pmin_A). If the difference "diff" is greater than $\log_2$ (value of pmax_A-value of pmin_A), the IDDS returns 1004g "binary" and determines the binary search as the optimal search technique to find min_B in column A. If the difference "diff" is less than $\log_2$(value of pmax_A-value of pmin_A), the IDDS returns 1004h "linear" and determines the sequential search or the linear search as the optimal search technique to find min_B in column A.

FIG. 10D exemplarily illustrates a flowchart comprising the steps performed by the inclusion dependency determination system (IDDS) for dynamically determining a search technique for searching for the maximum value max_B pointed by the dynamic pointer pmax_B, in column A. The IDDS checks 1011a whether max_B and max_A are equal. If max_B is equal to max_A, the IDDS returns 1011b the position of max_A pointed by the dynamic pointer pmax_A as the position of max_B POS in column A. If the values max_B and max_A are not equal, the IDDS checks 1011c whether the data type of column A ColA is "number". If the data type of column A is not "number", the IDDS returns 1011d "binary" and determines the binary search as the optimal search technique to find max_B in column A. That is, if column A and column B are of a string data type, the IDDS performs a binary search of the data elements of column B in column A. If the data type of column A is number, the IDDS computes 1011e a difference "diff" as (max_A−max_B)/average step size of column A. The IDDS proceeds to determine 1011f whether the difference "diff" is greater than $\log_2$(value of pmax_A-value of pmin_A). If the difference "diff" is greater than $\log_2$(value of pmax_A-value of pmin_A), the IDDS returns 1011g "binary" and determines the binary search technique as the optimal search technique to find max_B in column A. If the difference "diff" is less than $\log_2$(value of pmax_A-value of pmin_A), the IDDS returns 1011h "linear" and determines the sequential search technique as the optimal search technique to find max_B in column A.

FIG. 10E exemplarily illustrates a flowchart comprising the steps performed by the inclusion dependency determination system (IDDS) in a binary search to determine a position of a data element "VAL" in column A, where the minimum value and the maximum value of column A are min_A and max_A pointed by the dynamic pointers pmin_A and pmax_A respectively. The IDDS determines 1005a a middle position of column A as MID=(value of pmax_A+ value of pmin_A)/2. The IDDS compares 1005b "VAL" with a data element ColA[MID] at the position MID in column A. If VAL is less than ColA[MID], the IDDS examines 1005c the upper half part of column A by setting the dynamic pointer pmax_A to MID-1 with the dynamic pointer pmin_A still pointing to min_A. If the VAL is equal to ColA[MID], the IDDS returns 1005d MID as the position of the data element VAL in column A. If VAL is greater than ColA[MID], the IDDS examines 1005e the lower half part of column A by setting the dynamic pointer pmin_A to MID+1 with the dynamic pointer pmax_A still pointing to max_A. If VAL is less or greater than ColA[MID], after examining the upper half part or the lower half part of column A respectively, the IDDS checks 1005f whether the binary search of column A is completed by checking whether column A is exhausted. If the binary search is completed, the IDDS returns 1005g "NIL" as the data element "VAL" is not found. If the binary search of column A is not completed, the IDDS assigns 1005h the new middle position of column A as MID and iterates the process from step 1005b. The flow chart exemplarily illustrated in FIG. 10E comprises the steps of performing the binary search of data elements of column B pointed by the dynamic pointers pmin_B and pmax_B, in column A.

FIG. 10F exemplarily illustrates a flowchart comprising the steps performed by the inclusion dependency determination system (IDDS) in a sequential search to determine a position of a data element "VAL" in column A. The IDDS assigns 1006a the value of pmin_A to INDEX and compares 1006b the data element VAL with data element ColA[IN-DEX] at the position INDEX in column A. If the data element VAL is less than ColA[INDEX], the IDDS returns 1006c "NIL" since the data element VAL will not be found in column A. If the data element VAL is greater than ColA[INDEX], the IDDS increments 1006d INDEX by 1. If the data element VAL is equal to ColA[INDEX], the IDDS returns 1006e INDEX as the position of the data element VAL in column A. After incrementing INDEX by 1, the IDDS determines 1006f whether column A is exhausted. If column A is exhausted, the IDDS returns 1006g "NIL" since the data element VAL is not found in column A. If column A is not exhausted, the IDDS iterates the sequential search from step 1006b for the data element VAL in column A with the incremented INDEX.

FIG. 10G exemplarily illustrates a flowchart comprising the steps performed by the inclusion dependency determination system (IDDS) in a sequential search to determine a position of a data element "VAL" in column A. The IDDS assigns 1013a the value of pmax_A to INDEX and compares 1013b the data element VAL with data element ColA[IN-DEX] at the position INDEX in column A. If the data element VAL is greater than ColA[INDEX], the IDDS returns 1013c "NIL" since the data element VAL will not be found in column A. If the data element VAL is less than ColA[INDEX], the IDDS decrements 1013*d* INDEX by 1. If the data element VAL is equal to ColA[INDEX], the IDDS returns 1013*e* INDEX as the position of the data element VAL in column A. After decrementing INDEX by 1, the IDDS determines 1013*f* whether column A is exhausted. If column A is exhausted, the IDDS returns 1013*g* "NIL" since the data element VAL is not found in column A. If column A is not exhausted, the IDDS iterates the sequential search from step 1013*b* for the data element VAL in column A with the decremented INDEX.

Figure 11:
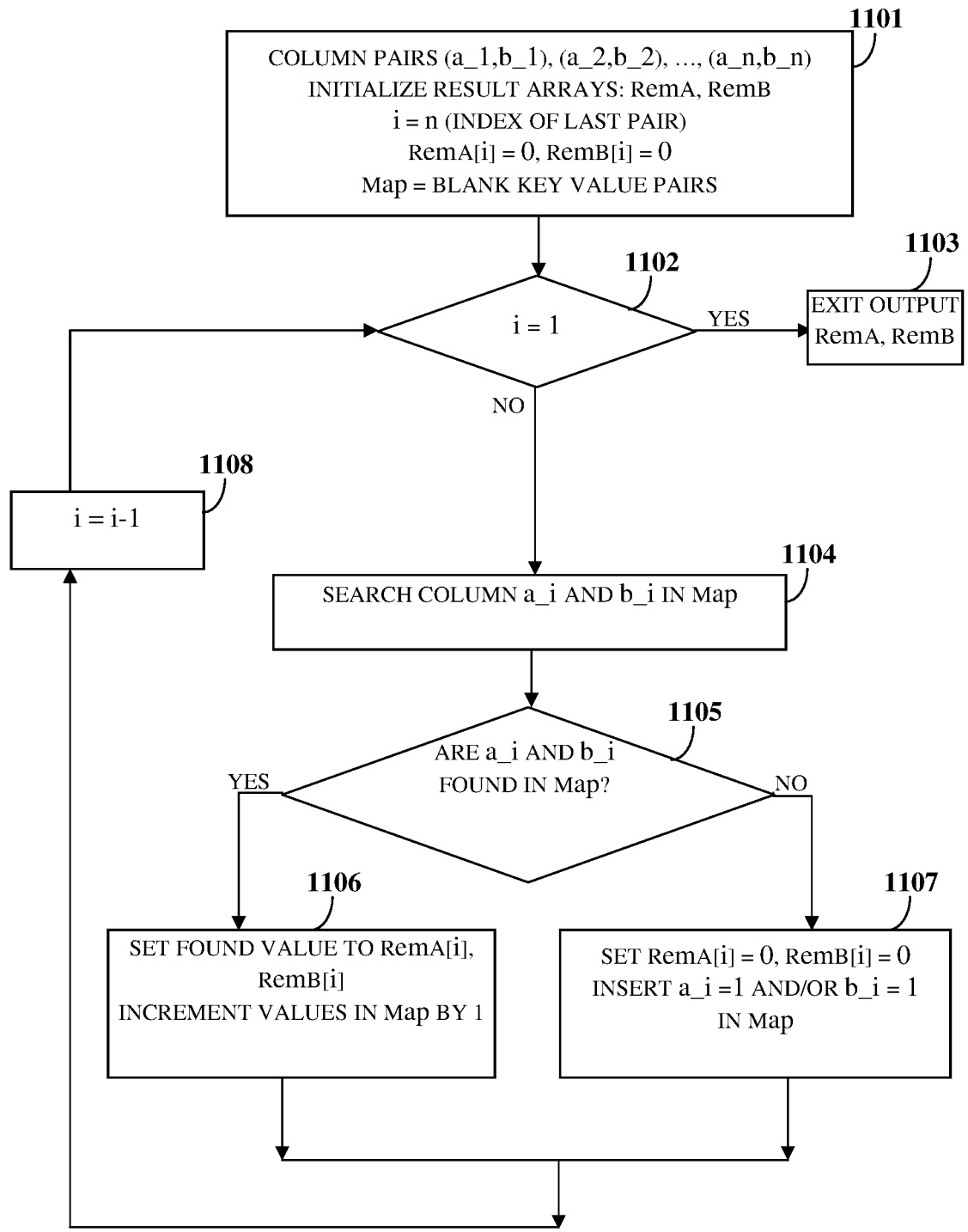
FIG. 11 exemplarily illustrates a flowchart comprising the steps performed by the inclusion dependency determination system for minimizing number of disk input and output operations in determining inclusion dependency between a candidate primary key and a candidate foreign key of each of the determined pairs of arranged columns.

FIG. 11 exemplarily illustrates a flowchart comprising the steps performed by the inclusion dependency determination system (IDDS) for minimizing number of disk input and output operations in determining inclusion dependency between a candidate primary key and a candidate foreign key of each of the determined pairs of arranged columns. The IDDS receives 1101 the determined pairs (a_1,b_1), (a_2,b_2), . . . , (a_n,b_n), result arrays RemA and RemB indicating remaining usage of the candidate primary key and the candidate foreign key in the determined pairs respectively, an index "i" to identify each of the determined pairs, and blank key value pairs in "Map" to map the determined pairs. The IDDS initializes the index "i" with n, RemA[i]=0, RemB[i]=0, and Map=0. The IDDS checks 1102 whether the index "i"=1. If the index "i" is equal to 1, the IDDS exits 1103 the process and returns the values in RemA[i] and RemB[i]. If the index "i" is not equal to 1, the IDDS searches 1104 for the column a_i and the column b_i in Map. The IDDS determines 1105 whether a_i and b_i are found in Map. If a_i and/or b_i are found in Map, the IDDS sets 1106 the values corresponding to a_i and/or b_i in Map as the values of RemA[i] and RemB[i] respectively. The IDDS increments the values in Map corresponding to a_i and/or b_i by 1. The IDDS retains the column a_i and/or b_i in the memory unit of the IDDS. If a_i and/or b_i are not found in Map, the IDDS sets 1107 RemA[i] as 0 and/or RemB[i] as 0 and sets the values corresponding to a_i and/or b_i in Map as 1. The IDDS fetches the column a_i and/or b_i from a file system or a solid state drive to the memory unit of the IDDS. The IDDS decrements 1108 the index "i" by 1 and iterates the process from step 1102.

FIG. 12 exemplarily illustrates a candidate primary key 701 and a candidate foreign key 702 in a pair of arranged columns determined by the inclusion dependency determination system (IDDS) for performing a comparison of a conventional approach and an approach followed by the IDDS for determining inclusion dependency between the candidate primary key 701 and the candidate foreign key 702. Consider an example where the conventional approach and the approach followed by the IDDS determine inclusion dependency between the candidate primary key 701, herein referred to as column A 701, and the candidate foreign key 702, herein referred to as column B 702, exemplarily illustrated in FIG. 12. The total count of column A 701 is 500000 and the total count of column B 702 is 10. The conventional approach to determine inclusion dependency between column A 701 and column B 702 is to consider a first data element of column B 702 starting from the minimum value, for example, 400001, and compare the first data element 400001 of column B 702 with every data element of column A 701 until the first data element 400001 is found in column A 701 or until a value greater than 400001 is found in column A 701. This conventional approach is repeated for all the data elements of column B 702. Since the average step size of column A 701 is 1, the number of comparisons needed to compare the minimum value of column B 702, that is, 400001 with the data elements of column A 701 to find 400001 is 400001. The number of comparisons for finding the remaining 9 data elements of column B 702 in column A 701 is 9. Thus, the total number of comparisons to determine inclusion dependency between column A 701 and column B 702 in the conventional approach is 400001+9=400010.

To determine inclusion dependency between column A 701 and column B 702, the inclusion dependency determination system (IDDS) dynamically determines a search technique based a computed difference "cliff" as disclosed in the detailed description of FIGS. 7A-7D. For the minimum value of column B 702, 400001, the IDDS determines that a binary search is an optimal search technique to find 400001 in column A 701. The number of comparisons needed for finding the minimum value of column B 702, 400001, in column A 701 is $\log_2(500000) \cong 19$. The number of comparisons for finding the maximum value of column B 702, 400010, in column A 701 is 17, since the IDDS determines a binary search to be an optimal technique to find 400010 in column A 701 as disclosed in the detailed description of FIGS. 7A-7D. The number of comparisons for finding the remaining 8 data elements of column B 702 in column A 701 is 8, since the IDDS dynamically determines a sequential search as an optimal search technique to find the remaining 8 data elements in column A 701 as disclosed in the detailed description of FIGS. 7A-7D. Thus, the total number of comparisons to determine inclusion dependency between column A 701 and column B 702 by the IDDS are 19+17+8=44. Therefore, the IDDS is substantially faster, that is, 9091 times faster than the conventional approach in determining inclusion dependency between column A 701 and column B 702 to establish primary key-foreign key relationships among data in column A 701 and column B 702.

FIG. 13 exemplarily illustrates a table showing a comparison of a conventional approach and an approach followed by the inclusion dependency determination system (IDDS) for determining inclusion dependency between columns in a target database to establish primary key-foreign key relationships among data in the columns. Consider an example where the number of tables in the target database is 1000 and the number of columns per table is 50. Therefore, the total number of columns in the target database is 50000. Consider about 10000 columns are eliminated both in the conventional approach and the approach followed by the IDDS due to pruning based on a characteristic data type as disclosed in the detailed description of FIG. 1. The number of remaining columns is 40000. The number of column pairs possible is 1600000000. Using the dependency characteristic data, the number of column pairs that are eliminated by the conventional approach is 80000000 and by the approach followed by the IDDS is 900000000. The number of remaining column pairs after elimination by the conventional approach and by the approach followed by the IDDS is 1520000000 and 700000000 respectively. The average number of data elements in each column is 100000. The number of search operations needed for searching the data elements of one column in another column of the remaining column pairs in the target database is 1.52E+14 in the conventional approach and 7E+13 in the approach followed by the IDDS. The average number of comparisons for searching each data element in the conventional approach disclosed in the detailed description of FIG. 12, and in the approach followed by the IDDS using the dynamically determined search techniques is 3000 and 1000 respectively. The total number of comparisons for searching all the data elements in the conventional approach and in the approach followed by the IDDS is 4.56E+18 and 7E+16 respectively. As exemplarily illustrated in FIG. 13, the approach followed by the IDDS is about 65 times faster than the conventional approach in determining inclusion dependency between 50000 columns of 1000 tables in the target database to establish primary key-foreign key relationships among data in the 50000 columns.

Figure 14:
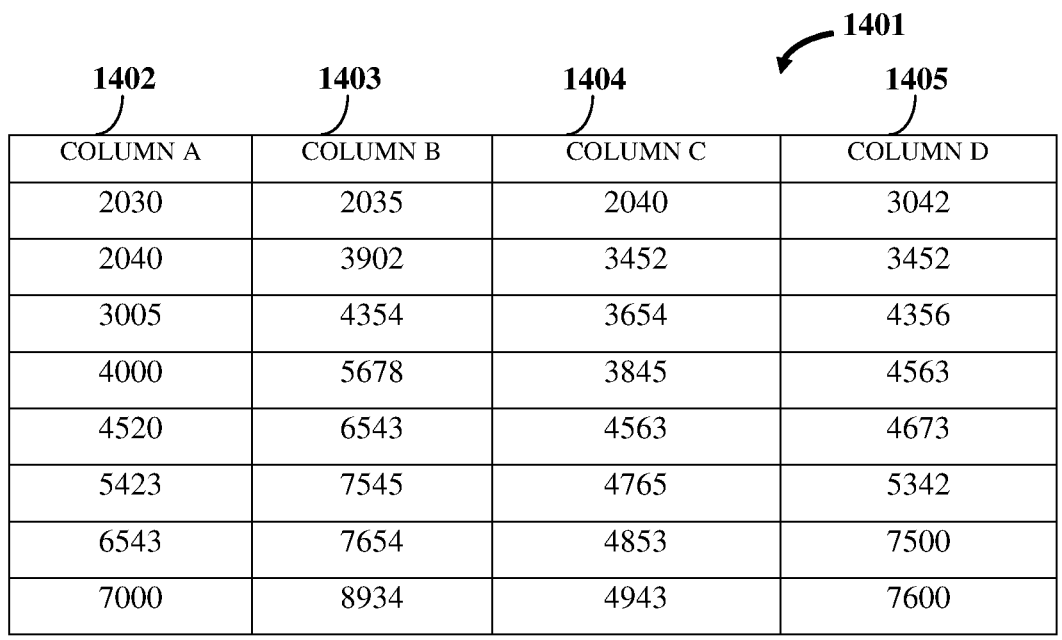
FIG. 14 exemplarily illustrates a table containing columns examined by the inclusion dependency determination system for determining inclusion dependency between the columns to establish primary key-foreign key relationships among data in the columns.

FIG. 14 exemplarily illustrates a table 1401 containing columns 1402, 1403, 1404, and 1405 examined by the inclusion dependency determination system (IDDS) for determining inclusion dependency between the columns 1402, 1403, 1404, and 1405 to establish primary key-foreign key relationships among data in the columns 1402, 1403, 1404, and 1405. The IDDS prunes the target database, sorts the data of the columns 1402, 1403, 1404, and 1405 of the pruned target database in an increasing order, and determines dependency characteristic data of each of the columns 1402, 1403, 1404, and 1405 prior to arranging the columns 1402, 1403, 1404, and 1405 as exemplarily illustrated in FIG. 14. The IDDS determines the dependency characteristic data of column A 1402 as: minimum value=2030, maximum value=7000, total count=8, distinct count=8, minimum data length=4, maximum data length=4, null value count=0, and average step size=621.25 as disclosed in the detailed description of FIG. 1 and FIGS. 2A-2D. Similarly, the IDDS determines the dependency characteristic data of column B 1403, column C 1404, and column D 1405. The total number of possible pairs of columns in table 1401 is 12. The possible pairs of columns are (A,B), (B,A), (A,C), (C,A), (A,D), (D,A), (B,C), (C,B), (B,D), (D,B), (C,D), and (D,C).

Since the minimum values of the columns 1402, 1403, 1404, and 1405 are unequal, the inclusion dependency determination system (IDDS) arranges the columns 1402, 1403, 1404, and 1405 in an increasing order of the minimum values of the columns 1402, 1403, 1404, and 1405. The IDDS arranges the columns 1402, 1403, 1404, and 1405 as exemplarily illustrated in FIG. 14. The columns 1402, 1403, 1404, and 1405 are herein referred to as "arranged columns". After arranging the columns 1402, 1403, 1404, and 1405 in an increasing order of the minimum values of the columns 1402, 1403, 1404, and 1405, the IDDS determines pairs of the arranged columns 1402, 1403, 1404, and 1405 that demonstrate a possibility of inclusion dependency based on the determined dependency characteristic data of the pairs of the arranged columns 1402, 1403, 1404, and 1405. The IDDS compares the minimum values of the arranged columns 1402, 1403, 1404, and 1405. The IDDS determines that column A 1402 may contain column B 1403, while column B 1403 will not contain column A 1402, since the minimum value of column B 1403 is greater than the minimum value of column A 1402. The IDDS eliminates the column pair (B,A) from the possible pairs of the arranged columns 1402, 1403, 1404, and 1405. Similarly, the IDDS eliminates the column pairs (C,A), (D,A), (C,B), (D,B), and (D,C) based on the minimum values of the arranged columns 1402, 1403, 1404, and 1405. The IDDS therefore eliminates 6 pairs of the arranged columns 1402, 1403, 1404, and 1405 and retains the pairs (A,B), (A,C), (A,D), (B,C), (B,D), and (C,D) as disclosed in the detailed description of FIG. 1. The IDDS compares the maximum values of the arranged columns 1402, 1403, 1404, and 1405 and determines that column A 1402 will not contain column B 1403 and column D 1405, since the maximum value of column A 1402 is less than the maximum values of column B 1403 and column D 1405, Similarly, the IDDS determines that column C 1404 will not contain column D 1405, since the maximum value of column C 1404 is less than the maximum value column D 1405. The IDDS therefore eliminates 3 pairs of the arranged columns 1402, 1403, 1404, and 1405 and determines the pairs (A,C), (B,C), and (B,D) to demonstrate a possibility of inclusion dependency.

Figure 15:
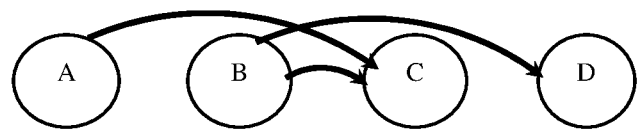
FIG. 15 exemplarily illustrates a relationship mapping between the columns of the table exemplarily illustrated in FIG. 14, arranged by the inclusion dependency determination system, for indicating possibilities of inclusion dependencies between the columns.

FIG. 15 exemplarily illustrates a relationship mapping between the columns 1402, 1403, 1404, and 1405 of the table 1401 exemplarily illustrated in FIG. 14, arranged by the inclusion dependency determination system (IDDS), for indicating possibilities of inclusion dependencies between the columns 1402, 1403, 1404, and 1405. The arranged columns column A 1402, column B 1403, column C 1404, and column D 1405, represented as circles, are connected in a unidirectional chain. As exemplarily illustrated in FIG. 15, column A 1402 may contain column C 1404; column B 1403 may contain column C 1404; and column B 1403 may contain column D 1405. The relationship mapping helps in determining the number of pairs of columns 1402, 1403, 1404, and 1405 that demonstrate a possibility of inclusion dependency to be 3 out of the 12 possible pairs of columns 1402, 1403, 1404, and 1405 exemplarily illustrated in FIG. 14.

The inclusion dependency determination system (IDDS) computes the number of fetches of the candidate primary key and the candidate foreign key of each of the determined pairs (A,C), (B,C), and (B,D) of the arranged columns 1402, 1403, 1404, and 1405 from a file system or a solid state hard drive for the determination of inclusion dependency. The IDDS fetches the column pair (A,C) from the file system or the solid state hard drive to the memory unit of the IDDS and computes the number of fetches of column A 1402 and column C 1404 from the file system or the solid state hard drive in the remaining determined pairs (B,C) and (B,D), to be 0 and 1 respectively. After determining inclusion dependency between column A 1402 and column C 1404, since column A 1402 is not used in any of the remaining determined pairs (B,C) and (B,D) and since column C 1404 is further used to determine inclusion dependency between the determined pair (B,C), the IDDS relinquishes column A 1402 from the memory unit and retains column C 1404 in the memory unit. Since column C 1404 is retained in the memory unit, the IDDS then fetches only column B 1403 from the file system or the solid state hard drive to the memory unit and computes the number of fetches of column B 1403 and column C 1404 from the file system or the solid state hard drive to be 1 and 0 respectively. After determining inclusion dependency between column B 1403 and column C 1404, since column C 1404 is not used in the remaining determined pair (B,D) and since column B 1403 is further used to determine inclusion dependency between the determined pair (B,D), the IDDS relinquishes column C 1404 from the memory unit and retains column B 1403 in the memory unit. Since column B 1403 is retained in the memory unit, the IDDS then fetches only column D 1405 from the file system or the solid state hard drive to the memory unit and computes the number of fetches of column B 1403 and column D 1405 from the file system or the solid state hard drive to be 0 and 0 respectively. The IDDS relinquishes column B 1403 and column D 1405 from the memory unit after determining inclusion dependency between column B 1403 and column D 1405.

Figure 16A:
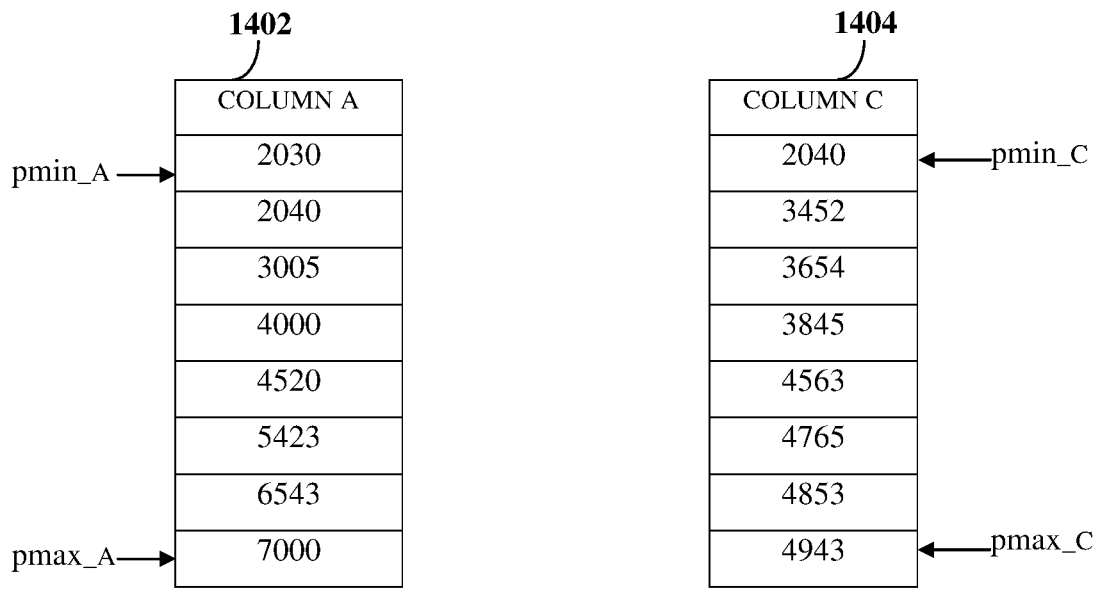
FIGS. 16A-16B exemplarily illustrate determination of inclusion dependency between a candidate primary key and a candidate foreign key in a determined pair of arranged columns exemplarily illustrated in FIG. 14, by the inclusion dependency determination system using dynamically determined search techniques.
Figure 16B:
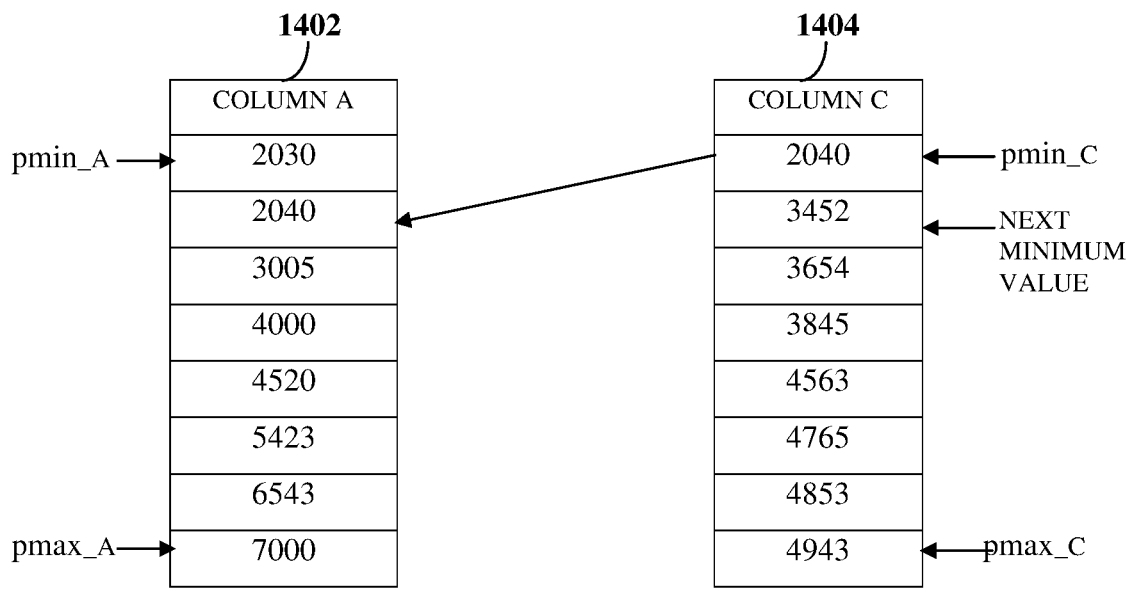

FIGS. 16A-16B exemplarily illustrate determination of inclusion dependency between a candidate primary key column A 1402 and a candidate foreign key column C 1404 in a determined pair of arranged columns 1402 and 1404 exemplarily illustrated in FIG. 14, by the inclusion dependency determination system (IDDS) using dynamically determined search techniques. The IDDS fetches column A 1402 and column C 1404 from the file system or the solid state hard drive to the memory unit of the IDDS. The minimum values of column A 1402 and column C 1404 are 2030 and 2040 respectively, and the maximum values of column A 1402 and column C 1404 are 7000 and 4943 respectively. The IDDS computes the average step size of column A 1402 as 621. The IDDS implements dynamic pointers pmin_A, pmin_C, pmax_A, and pmax_C. The IDDS initializes the dynamic pointers pmin_A and pmin_C to point to the minimum values min_A and min_C of column A 1402 and column C 1404 respectively, and the dynamic pointers pmax_A and pmax_C to point to the maximum values max_A and max_C of column A 1402 and column C 1404 respectively, as exemplarily illustrated in FIG. 16A.

The inclusion dependency determination system (IDDS) compares the values pointed by the dynamic pointers pmin_A and pmin_C and computes the difference "cliff" as (minimum value pointed by pmin_C-minimum value pointed by pmin_A)/average step size of column A 1402= (2040-2030)/621=0.02. The value of the dynamic pointer pmax_A is 8 and the value of the dynamic pointer pmin_A is 1 as there are 8 data elements in column A 1402 between the values pointed by the dynamic pointers pmin_A and pmax_A. The IDDS compares the difference "diff" with a binary logarithm of (value of pmax_A-value of pmin_A)= $\log_2(8-1)=2.8$ (~3). Since the difference "diff" is less than 3, the IDDS selects a sequential search as an optimal search technique to determine the presence of 2040 indicated by the dynamic pointer pmin_C, in column A 1402. The IDDS compares 2040 to every data element in column A 1402 and finds 2040 in one step at the second position in column A 1402 as exemplarily illustrated in FIG. 16B. To determine the position of the maximum value 4943 pointed by the dynamic pointer pmax_C, in column A 1402, the IDDS compares the values pointed by the dynamic pointers pmax_A and pmax_C and computes the difference "diff" as (maximum value pointed by pmax_A-maximum value pointed by pmax_C)/average step size of column A 1402= (7000-4943)/621=3.3. The IDDS compares the difference "cliff" with a binary logarithm of (value of pmax_A-value of pmin_A)=$\log_2 (8-1)=2.8$ (~3). Since the difference "diff" is greater than 3, the IDDS selects a binary search as an optimal search technique to determine the presence of 4943 indicated by the dynamic pointer pmax_C, in column A 1402.

The inclusion dependency determination system (IDDS) determines a middle value between the value of the dynamic pointer pmin_A and the value of the dynamic pointer pmax_A of column A 1402 to be (8+1)/2=4.5 (~5), and the data element at position 5 in column A 1402 is 4520. The IDDS determines whether 4943 is greater than or less than 4520. Since 4943 is greater than 4520, the IDDS searches for 4943 in the lower half of column A 1402. The IDDS initializes the dynamic pointer pmin_A to point to 4520 and the dynamic pointer pmax_A to point to 7000, where the value of the dynamic pointer pmin_A is 5 and the value of the dynamic pointer pmax_A is 8. The IDDS determines a middle value of the value of the dynamic pointer pmin_A and the value of the dynamic pointer pmax_A of column A 1402 to be (5+8)/2=6.5 (~7), and the data element between 4520 and 7000 in column A 1402 at position 7 is 6543. The IDDS determines that 4943 is less than 6543. The IDDS initializes the dynamic pointer pmin_A to point to 4520 and the dynamic pointer pmax_A to point to 6543, where the value of the dynamic pointer pmin_A is 5 and the value of the dynamic pointer pmax_A is 7. Further, the IDDS determines a middle value between the value of the dynamic pointer pmin_A and the value of the dynamic pointer pmax_A to be (5+7)/2=6, and the data element between 4520 and 6543 at position 6 in column A 1402 is 5423. The IDDS determines that 4943 is less than 5423. The IDDS initializes the dynamic pointer pmin_A to point to 4520 and the dynamic pointer pmax_A to point to 5423. The IDDS determines that there is no middle value between 4520 and 5423 in column A 1402, since 4520 and 5423 are consequent data elements in column A 1402. The IDDS does not find 4943 in column A 1402. The IDDS determines that the column pair (A,C) does not form an inclusion dependency pair since the maximum value of column C 1404 pointed by the dynamic pointer pmax_C is not found in column A 1402.

The inclusion dependency determination system (IDDS) relinquishes column A 1402 from the memory unit while retaining column C 1404. To determine inclusion dependency between the column pair (B,C), the IDDS fetches column B 1403 from the file system or the solid state hard drive. The IDDS searches for presence of the data elements of column C 1404 in column B 1403 as disclosed above and determines that the column pair (B,C) also does not form an inclusion dependency pair. The IDDS computes the number of fetches of column B 1403 and column C 1404 and relinquishes column C 1404, while retaining column B 1403 in the memory unit. Similarly, to determine inclusion dependency between the column pair (B,D), the IDDS fetches column D 1405 from the file system or the solid state hard drive. The IDDS searches for presence of the data elements of column D 1405 in column B 1403 as disclosed above, and determines that the column pair (B,D) also does not form an inclusion dependency pair. The IDDS computes the number of fetches of column B 1403 and column D 1405 and relinquishes both column B 1403 and column D 1405 from the memory unit. The IDDS determines that none of the arranged columns 1402, 1403, 1404, and 1405 in the table 1401 exemplarily illustrated in FIG. 14, form inclusion dependency pairs.

Figure 17:
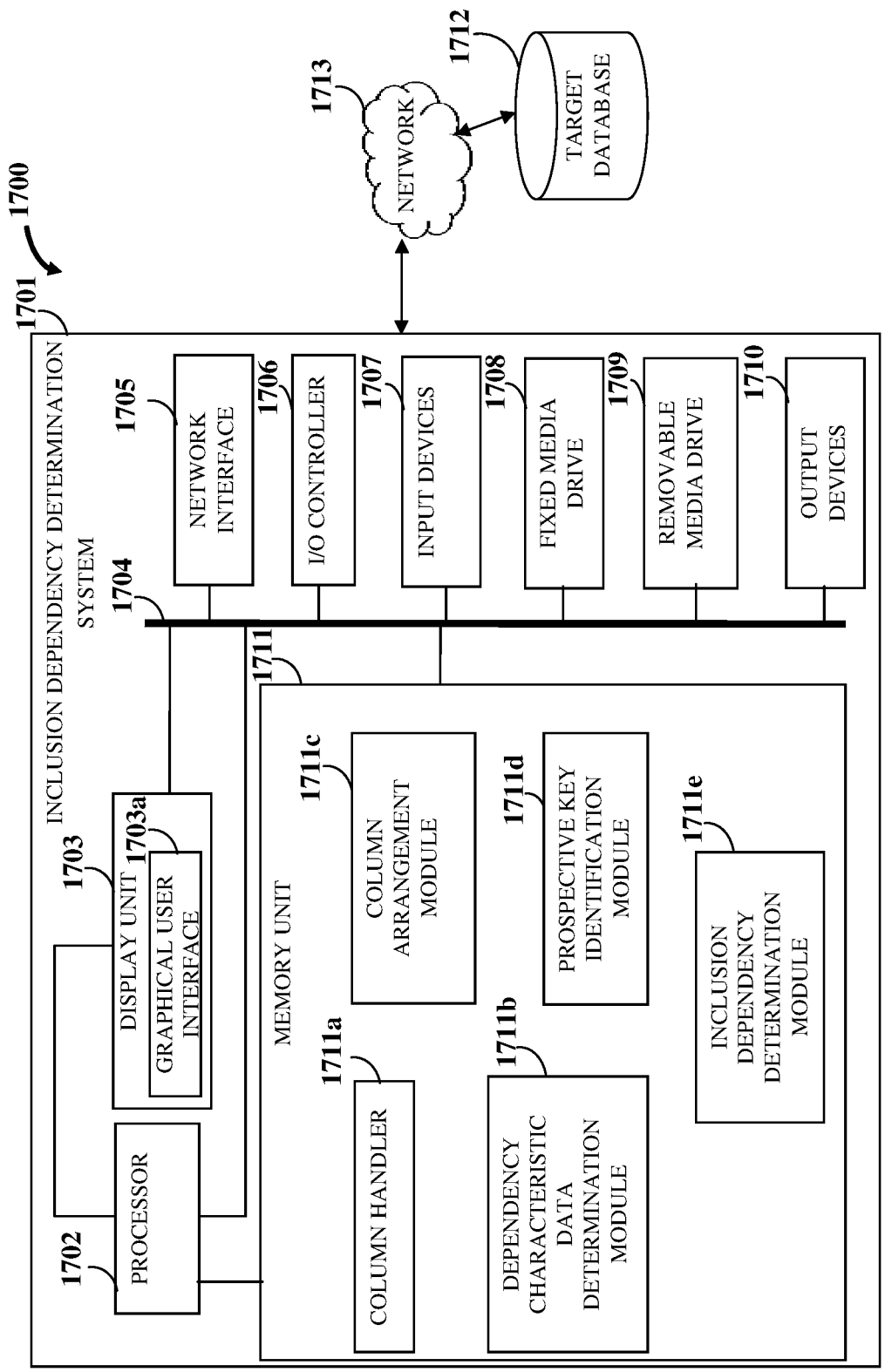
FIG. 17 exemplarily illustrates a system comprising the inclusion dependency determination system for determining inclusion dependency between columns of multiple tables in a target database to establish primary key-foreign key relationships among data in the columns with minimized disk input and output operations.

FIG. 17 exemplarily illustrates a system 1700 comprising the inclusion dependency determination system (IDDS) 1701 for determining inclusion dependency between columns of multiple tables in a target database 1712 to establish primary key-foreign key relationships among data in the columns with minimized disk input and output operations. The IDDS 1701 is a computer system that is programmable using a high level computer programming language. In an embodiment, the IDDS 1701 uses programmed and purposeful hardware. In an embodiment, the IDDS 1701 is implemented on a computing device, for example, a personal computer, a tablet computing device, a mobile computer, a portable computing device, a laptop, a touch centric device, a workstation, a server, a portable electronic device, a network enabled computing device, an interactive network enabled communication device, any other suitable computing equipment, combinations of multiple pieces of computing equipment, etc. In an embodiment, the IDDS 1701 communicates with the target database 1712 via a network 1713, for example, a short range network or a long range network.

The network 1713 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the inclusion dependency determination system (IDDS) 1701 is accessible to users, for example, through a broad spectrum of technologies and devices such as personal computers with access to the internet, internet enabled cellular phones, tablet computing devices, etc.

As exemplarily illustrated in FIG. 17, the inclusion dependency determination system (IDDS) 1701 comprises a non-transitory computer readable storage medium, for example, a memory unit 1711 for storing programs and data, and at least one processor 1702 communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 1702. The non-transitory computer readable storage medium is configured to store computer program instructions defined by modules, for example, 1711*a*, 1711*b*, 1711*c*, 1711*d*, 1711*e*, etc., of the IDDS 1701. The modules, for example, 1711*a*, 1711*b*, 1711*c*, 1711*d*, 1711*e*, etc., of the IDDS 1701 are installed and stored in the memory unit 1711 of the IDDS 1701. The memory unit 1711 is used for storing program instructions, applications, and data. The memory unit 1711 is, for example, a random access memory (RAM) or another type of dynamic storage device that stores information and instructions for execution by the processor 1702. The memory unit 1711 also stores temporary variables and other intermediate information used during execution of the instructions by the processor 1702. The IDDS 1701 further comprises a read only memory (ROM) or another type of static storage device that stores static information and instructions for the processor 1702.

The processor 1702 is configured to execute the computer program instructions defined by the modules, for example, 1711*a*, 1711*b*, 1711*c*, 1711*d*, 1711*e*, etc., of the inclusion dependency determination system (IDDS) 1701. The processor 1702 refers to any of one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 1702 is implemented as a processor set comprising, for example, a programmed microprocessor and a math or graphics co-processor. The processor 1702 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The IDDS 1701 disclosed herein is not limited to employing a processor 1702. In an embodiment, the IDDS 1701 employs a controller or a microcontroller. The processor 1702 executes the modules, for example, 1711*a*, 1711*b*, 1711*c*, 1711*d*, 1711*e*, etc., of the IDDS 1701.

As exemplarily illustrated in FIG. 17, the inclusion dependency determination system (IDDS) 1701 further comprises a display unit 1703, a data bus 1704, a network interface 1705, an input/output (I/O) controller 1706, input devices 1707, a fixed media drive 1708 such as a hard drive, a removable media drive 1709 for receiving removable media, output devices 1710, etc. The display unit 1703 comprises, for example, a video display, a liquid crystal display, a plasma display, an organic light emitting diode (OLED) based display, etc. The display screen 1703 displays a graphical user interface (GUI) 1703*a*. The GUI 1703*a* is, for example, one of a webpage of a website hosted by the IDDS 1701, an online web interface, a web based downloadable application interface, a mobile based downloadable application interface, etc. The GUI 1703 allows a user of the IDDS 1701 to input, for example, a configurable threshold of widths of the columns of the tables in the target database 1712 to eliminate column pairs from the target database 1712 and also to input the characteristic data type used to prune the target database 1712. The input devices 1707 are used to input data into the IDDS 1701 and for routine maintenance of the IDDS 1701. The user uses the input devices 1707 to provide inputs to the IDDS 1701. The input devices 1707 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 1710 output the results of operations performed by the IDDS 1701.

The data bus 1704 permits communications between the modules, for example, 1702, 1703, 1705, 1706, 1707, 1708, 1709, 1710, 1711, etc., of the IDDS 1701. The network interface 1705 enables connection of the IDDS 1701 to the network 1713. In an embodiment, the network interface 1705 is provided as an interface card also referred to as a "line card". The network interface 1705 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 1706 controls input actions and output actions performed by the IDDS 1701.

The modules of the inclusion dependency determination system (IDDS) 1701 comprise a column handler 1711a, a dependency characteristic data determination module 1711b, a column arrangement module 1711c, a prospective key identification module 1711d, and an inclusion dependency determination module 1711e stored in the memory unit 1711 of the IDDS 1701. The column handler 1711a collects characteristic information from metadata of each of the columns in the target database 1712. For each of the columns, the column handler 1711a extracts the metadata and from the extracted metadata, the column handler 1711a collects the characteristic information comprising, for example, name of the column, data type of the column, column width, a null constraint on the column, a unique constraint on the column, a sequence constraint on the column, a primary key constraint on the column, and a foreign key constraint on the column as disclosed in the detailed description of FIG. 1 and FIGS. 2A-2D. The column arrangement module 1711c arranges the columns in the pruned target database 1712 by applying one or more predefined rules to the columns based on a minimum value of the data of each of the columns extracted from the determined dependency characteristic data as disclosed in the detailed description of FIG. 1. The prospective key identification module 1711d determines pairs of the arranged columns that demonstrate a possibility of inclusion dependency based on the determined dependency characteristic data of the pairs of the arranged columns. The prospective key identification module 1711d identifies a first column of each of the determined pairs of the arranged columns as a candidate primary key, and a second column of each of the determined pairs of the arranged columns as a candidate foreign key. A pseudocode of the prospective key identification module 1711d executed by the processor 1702 for determining pairs of the arranged columns that demonstrate a possibility of inclusion dependency is disclosed below:

```
Input: Ordered List of n columns of same type with all the dependency characteristic data
gathered
Output: Two lists FirstColumn and SecondColumn containing indexes of columns from
the input such that they form pairwise candidate, for example, pair (FirstColumn[i],
SecondColumn[j]), etc.
Consider i, j are indices in the list of columns and n is the total number of columns
for (int i = 1 to n-1)
{
   if Column[i] is a Foreign Key defined by Metadata then continue;
   if Blank/Null present in Column[i] continue;
   if width of Column[i] is more than 100 continue;
   if DistinctCount[i] is less than TotalCount[i] continue;
   for (int j = i+1 to n)
   {
      if(MaxValue[i] < MaxValue[j] continue;
      if(DistinctCount[i] < DistinctCount[j] continue;
      if Column[j] is Primary Key defined by Meta Data, continue;
      if width of Column[j] is more than 500 continue;
      if there is unique constraint of Column[j] continue;
      if there is sequence constraint of Column[j] continue;
      if Column[i], Column[j] are from same table
         if DataType[i] is not number continue;
         if Column[i] or Column[j] does not end with either of ID, Key,
         Num, Code continue;
      Insert i, j in the candidate columns FirstColumn and SecondColumn
   }
}
``` detailed description of FIG. 1. Based on a characteristic data type in the collected characteristic information of each of the columns, the column handler 1711a prunes the target database 1712 and sorts data in the columns of the pruned target database 1712 in an increasing order.

The dependency characteristic data determination module 1711b determines dependency characteristic data comprising an average step size of each of the columns in the pruned target database 1712 as disclosed in the detailed description of FIG. 1. The dependency characteristic data determination module 1711b computes the average step size of each of the columns in the pruned target database 1712 using the minimum value of the data of each of the columns, a maximum value of the data of each of the columns, and a total count of data elements in each of the columns as The inclusion dependency determination module 1711e determines inclusion dependency between the candidate primary key and the candidate foreign key of each of the determined pairs of the arranged columns to establish primary key-foreign key relationships among the data in the columns, on comparing the data of the candidate primary key with the data of the candidate foreign key using multiple search techniques dynamically determined based on the average step size extracted from the determined dependency characteristic data. A pseudocode of the inclusion dependency determination module 1711e executed by the processor 1702 for determining inclusion dependency between the candidate primary key and the candidate foreign key of each of the determined pairs of arranged columns is disclosed below:

1. Initially pmin_A pointer is pointing to the beginning of Column A and pmin_B is pointing to the beginning of Column B.
2. Repeat the following steps

```
3.  If Col_B[pmin_B] > Col_A[pmin_A] then exit "No"
4.  If Col_B[pmin_B] = Col_A[pmin_A] then go to step (9)
5.  If Col_B[pmin_B] < Col_A[pmin_A]
6.  Diff = (Col_B[pmin_B] − Col_A[pmin_A])/AvgStepSize_A
7.  If Diff > Log2(value of pmax_A − value of pmin_A)
       i.   Position = Binary search (Col_B[pmin_B] in Col_A(pmin_A, pmax_A)
       ii.  If Position not found, then exit "No"
       iii. If position found then pmin_A = Position, Go to step (9)
8.  Else do the following
       a. pmin_A = pmin_A + 1
       b. If (Col_A[pmin_A] > Col_B[pmin_B]) exit "No"
       c. If Col_A[pmin_A] == Col_B[pmin_B] go to step (9)
       d. Go to (a)
9.  If Col_B[pmax_B] < Col_A[pmax_A] then exit "No"
10. If Col_B [pmax_B] == Col_A[pmax_A] then go to step (15)
11. If Col_B [pmax_B] > Col_A[pmax_A]
12. Diff = (Col_A[pmax_A] − Col_B[pmax_B])/AvgStepSize_A
13. If Diff > Log2(value of pmax_A − value of pmin_A)
       i.   Position = Binary search (Col_B[pmax_B] in Col_A(pmin_A,pmax_A)
       ii.  If Position is < 0 then exit "No"
       iii. If position found, then pmax_A = Position
14. Else do the following
       1. pmax_A = pmax_A − 1
       2. If (Col_A[pmax_A] < Col_B[pmax_B]) exit "No"
       3. If Col_A[pmax_A] == Col_B[pmax_B] go to step (15)
       4. Go to 1
15. If no more element in Col_B to find in Col_A then exit "Yes"
16. pmin_A = pmin_A + 1, pmax_A = pmax_A − 1
17. Go to (2)
```

The processor 1702 executes the following algorithm defined by the inclusion dependency determination module 1711e for performing a binary search to determine inclusion dependency between the candidate primary key and the candidate foreign key of each of the determined pairs of the arranged columns:

Compare the item with a middle data element—if match then report

If item is greater, search in Second Half (Problem is reduced by half)

If item is smaller, search in First Half (Problem is reduced by half)

A pseudocode of the inclusion dependency determination module 1711e executed by the processor 1702 for performing a binary search to determine inclusion dependency between the candidate primary key and the candidate foreign key of each of the determined pairs of the arranged columns is disclosed below:

```
Search (Item, Min, Max, List)
{
    If (Min > Max) return "Not found"
    Find middle Position = (Min + Max)/2
    Compare the item with item at middle position.
    If Item matches, then return middle position
    Else if given item is greater than middle item then
        Search(Item, Middle+1, Max, List)
    Else if given item is less than middle item then
        Search(Item, Min, Middle−1, List)
}
```

The column handler 1711a further computes number of fetches of the candidate primary key and the candidate foreign key of each of the determined pairs of the arranged columns from a disk for the determination of inclusion dependency. The column handler 1711a retains or relinquishes the candidate primary key and/or the candidate foreign key of each of the determined pairs of the arranged columns in the memory unit 1711 based on the computed number of fetches, thereby minimizing disk input and output operations as disclosed in the detailed description of FIG. 8. A pseudocode of the column handler 1711a executed by the processor 1702 for minimizing the disk input and output operations is disclosed below:

```
1. Input: A sequence of n column pairs obtained after eliminating unwanted pairs.
   Prepare two lists ColumnFirst and ColumnSecond of size n each, where ColumnFirst
   contains the names of First Columns of the pairs and ColumnSecond list contains
   names of Second Columns of the pairs
2. Make two lists RemainingUsageFirst and RemainingUsageSecond of the same size n.
   Initialize each item of these two lists to 0;
3. Define a Map for entries Column −> Usage Count
4. For (int i = n to 0) repeat following steps
       a.      Col_A = ColumnFirst [i];
       b.      Search Col_A in Map
       c.      If found then
       d.          Count = Value found in Map for Col_A
       e.          RemainingUsageFirst[i] = Count
```

```
    f.              Increase Usage Count of Col_A in Map by 1
    g.          Else
    h.              Add Col_A -> 1 to Map
    i.              RemainingUsageFirst[i] = 0
    j.          Col_B = ColumnSecond [i];
    k.          Search Col_B in Map
    l.          If found then
    m.              Count = Value found in Map for Col_B
    n.              RemainingUsageSecond[i] = Count
    o.              Increase Usage Count of Col_B in Map by 1
    p.          Else
    q.              Add Col_B -> 1 to Map
    r.              RemainingUsageSecond[i] = 0
5.  Output is in the two lists RemainingUsageFirst and RemainingUsageSecond
```

The target database 1712 of the inclusion dependency determination system (IDDS) 1701 can be any storage area or medium that can be used for storing data and files. In an embodiment, the target database 1712 is an external database, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the target database 1712 can also be a location on a file system. In another embodiment, the target database 1712 can be remotely accessed by the IDDS 1701 via the network 1713. In another embodiment, the target database 1712 is configured as a cloud based database implemented in a cloud computing environment, where computing resources are delivered as a service over the network 1713.

Computer applications and programs are used for operating the inclusion dependency determination system (IDDS) 1701. The programs are loaded onto the fixed media drive 1708 and into the memory unit 1711 of the IDDS 1701 via the removable media drive 1709. In an embodiment, the computer applications and programs are loaded into the memory unit 1711 directly via the network 1713. The processor 1702 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The IDDS 1701 employs the operating system for performing multiple tasks. The operating system is responsible for management and coordination of activities and sharing of resources of the IDDS 1701. The operating system further manages security of the IDDS 1701, peripheral devices connected to the IDDS 1701, and network connections. The operating system employed on the IDDS 1701 recognizes, for example, inputs provided by a user of the IDDS 1701 using one of the input devices 1707, the output devices 1710, files, and directories stored locally on the fixed media drive 1708. The operating system on the IDDS 1701 executes different programs using the processor 1702. The processor 1702 and the operating system together define a computer platform for which application programs in high level programming languages are written.

The processor 1702 retrieves instructions defined by the column handler 1711a, the dependency characteristic data determination module 1711b, the column arrangement module 1711c, the prospective key identification module 1711d, and the inclusion dependency determination module 1711e stored in the memory unit 1711 of the inclusion dependency determination system (IDDS) 1701, for performing respective functions disclosed above. The processor 1702 retrieves instructions for executing the modules, for example, 1711a, 1711b, 1711c, 1711d, 1711e, etc., of the IDDS 1701 from the memory unit 1711. A program counter determines the location of the instructions in the memory unit 1711. The program counter stores a number that identifies the current position in the program of each of the modules, for example, 1711a, 1711b, 1711c, 1711d, 1711e, etc., of the IDDS 1701. The instructions fetched by the processor 1702 from the memory unit 1711 after being processed are decoded. The instructions are stored in an instruction register in the processor 1702. After processing and decoding, the processor 1702 executes the instructions, thereby performing one or more processes defined by those instructions.

At the time of execution, the instructions stored in the instruction register are examined to determine the operations to be performed. The processor 1702 then performs the specified operations. The operations comprise arithmetic operations and logic operations. The operating system performs multiple routines for performing a number of tasks required to assign the input devices 1707, the output devices 1710, and the memory unit 1711 for execution of the modules, for example, 1711a, 1711b, 1711c, 1711d, 1711e, etc., of the inclusion dependency determination system (IDDS) 1701. The tasks performed by the operating system comprise, for example, assigning memory to the modules, for example, 1711a, 1711b, 1711c, 1711d, 1711e, etc., of the IDDS 1701 and to data used by the IDDS 1701, moving data between the memory unit 1711 and disk units, and handling input/output operations. The operating system performs the tasks on request by the operations and after performing the tasks, the operating system transfers the execution control back to the processor 1702. The processor 1702 continues the execution to obtain one or more outputs. The outputs of the execution of the modules, for example, 1711a, 1711b, 1711c, 1711d, 1711e, etc., of the IDDS 1701 are displayed to a user of the IDDS 1701 on the display unit 1703 via the graphical user interface 1703a and/or through the output devices 1710.

For purposes of illustration, the detailed description refers to the inclusion dependency determination system (IDDS) 1701 being run locally as a single computer system; however the scope of the method and system 1700 disclosed herein is not limited to the IDDS 1701 being run locally as a single computer system via the operating system and the processor 1702, but may be extended to run remotely over the network 1713 by employing a web browser and a remote server, a mobile phone, or other electronic devices. In an embodiment, one or more portions of the IDDS 1701 are distributed across one or more computer systems (not shown) coupled to the network 1713.

The non-transitory computer readable storage medium disclosed herein stores computer program codes comprising instructions executable by at least one processor 1702 for determining inclusion dependency between multiple columns of multiple tables in the target database 1712 to establish primary key-foreign key relationships among data in the columns with minimized disk input and output operations. The computer program codes comprise a first computer program code for determining dependency characteristic data comprising an average step size of each of the columns in the pruned target database 1712; a second computer program code for arranging the columns in the pruned target database 1712 by applying one or more predefined rules to the columns based on a minimum value of the data of each of the columns extracted from the determined dependency characteristic data; a third computer program code for determining pairs of the arranged columns that demonstrate a possibility of inclusion dependency based on the determined dependency characteristic data of the pairs of the arranged columns, where the third computer program code identifies a first column of each of the determined pairs of the arranged columns as a candidate primary key, and a second column of each of the determined pairs of the arranged columns as a candidate foreign key; and a fourth computer program code for determining inclusion dependency between the candidate primary key and the candidate foreign key of each of the determined pairs of the arranged columns to establish the primary key-foreign key relationships among the data in the columns, on comparing the data of the candidate primary key with the data of the candidate foreign key using multiple search techniques dynamically determined based on the average step size extracted from the determined dependency characteristic data, while minimizing the disk input and output operations.

The second computer program code arranges the columns in an increasing order of the minimum value of the data of each of the columns, if the minimum value of the data of each of the columns is unequal to the minimum value of the data of each of the other columns. The second computer program code applies the tiebreaking rules to pairs of the columns, if the minimum value of the data of a first column of each of the pairs of the columns is equal to the minimum value of the data of a second column of each of the pairs of the columns as disclosed in the detailed description of FIGS. 3A-3B. The computer program codes further comprise a fifth computer program code for computing number of fetches of the candidate primary key and the candidate foreign key of each of the determined pairs of the arranged columns from a disk for the determination of inclusion dependency; and a sixth computer program code for performing retention or relinquishment of the candidate primary key and/or the candidate foreign key of each of the determined pairs of the arranged columns in the non-transitory computer readable storage medium based on the computed number of fetches, thereby minimizing the disk input and output operations. The first computer program code further comprises a seventh computer program code for computing the average step size of each of the columns in the pruned target database 1712 using the minimum value of the data of each of the columns, a maximum value of the data of each of the columns, and a total count of data elements in each of the columns.

The computer program codes further comprise one or more additional computer program codes for performing additional steps that may be required and contemplated for determining inclusion dependency between multiple columns of multiple tables in the target database 1712 to establish primary key-foreign key relationships among data in the columns with minimized disk input and output operations. In an embodiment, a single piece of computer program code comprising computer executable instructions performs one or more steps of the method disclosed herein for determining inclusion dependency between multiple columns of multiple tables in the target database 1712 to establish primary key-foreign key relationships among data in the columns with minimized disk input and output operations. The computer program codes comprising computer executable instructions are embodied on the non-transitory computer readable storage medium. The processor 1702 of the inclusion dependency determination system (IDDS) 1701 retrieves these computer executable instructions and executes them. When the computer executable instructions are executed by the processor 1702, the computer executable instructions cause the processor 1702 to perform the steps of the method for determining inclusion dependency between multiple columns of multiple tables in the target database 1712 to establish primary key-foreign key relationships among data in the columns with minimized disk input and output operations.

It will be readily apparent in different embodiments that the various methods, algorithms, and computer programs disclosed herein are implemented on non-transitory computer readable storage media programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft®.NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the inclusion dependency determination system (IDDS) 1701 disclosed herein are implemented in a non-programmed environment comprising documents created, for example, in a hypertext markup language (HTML), an extensible markup language (XML), or other format that render aspects of the graphical user interface (GUI) 1703a or perform other functions, when viewed in a visual area or a window of a browser program. In another embodiment, various aspects of the method and the IDDS 1701 disclosed herein are implemented as programmed elements, or non-programmed elements, or any suitable combination thereof.

Where databases are described such as the target database 1712, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the inclusion dependency determination system (IDDS) 1701, the databases are integrated to communicate with each other for enabling simultaneous updates of data linked across the databases, when there are any updates to the data in one of the databases.

The method and the inclusion dependency determination system (IDDS) 1701 disclosed herein can be configured to work in a network environment comprising one or more computers that are in communication with one or more devices via the network 1713. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 1713. Each of the computers and the devices executes an operating system, examples of which are disclosed above. While the operating system may differ depending on the type of computer, the operating system provides the appropriate communications protocols to establish communication links with the network 1713. Any number and type of machines may be in communication with the computers.

The method and the inclusion dependency determination system (IDDS) 1701 disclosed herein are not limited to a particular computer system platform, processor, operating system, or network. In an embodiment, one or more aspects of the method and the IDDS 1701 disclosed herein are distributed among one or more computer systems, for example, servers configured to provide one or more services to one or more client computers, or to perform a complete task in a distributed system. For example, one or more aspects of the method and the IDDS 1701 disclosed herein are performed on a client-server system that comprises components distributed among one or more server systems that perform multiple functions according to various embodiments. These components comprise, for example, executable, intermediate, or interpreted code, which communicate over the network 1713 using a communication protocol. The method and the inclusion dependency determination system (IDDS) 1701 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the inclusion dependency determination system (IDDS) 1701 disclosed herein. While the method and the IDDS 1701 have been described with reference to various embodiments, it is understood that the words, which have been used herein, are words of description and illustration, rather than words of limitation. Further, although the method and the IDDS 1701 have been described herein with reference to particular means, materials, and embodiments, the method and the IDDS 1701 are not intended to be limited to the particulars disclosed herein; rather, the method and the IDDS 1701 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the IDDS 1701 disclosed herein in their aspects.

We claim:

1. A method for determining inclusion dependency between a plurality of columns of a plurality of tables in a target database to establish primary key-foreign key relationships among data in said columns with minimized disk input and output operations, said method employing an inclusion dependency determination system comprising at least one processor configured to execute computer program instructions for performing said method comprising:

determining dependency characteristic data comprising an average step size of each of said columns in a pruned target database by said inclusion dependency determination system, wherein said target database is pruned based on a characteristic data type, and said data of said columns in said pruned target database is sorted, prior to said determination of said dependency characteristic data;

arranging said columns in said pruned target database by applying one or more predefined rules to said columns based on a minimum value of said data of said each of said columns extracted from said determined dependency characteristic data, by said inclusion dependency determination system;

determining pairs of said arranged columns that demonstrate a possibility of said inclusion dependency by said inclusion dependency determination system based on said determined dependency characteristic data of said pairs of said arranged columns, wherein a first column of each of said determined pairs of said arranged columns is identified as a candidate primary key, and a second column of said each of said determined pairs of said arranged columns is identified as a candidate foreign key; and determining said inclusion dependency between said candidate primary key and said candidate foreign key of said each of said determined pairs of said arranged columns by said inclusion dependency determination system to establish said primary key-foreign key relationships among said data in said columns, by comparing said data of said candidate primary key with said data of said candidate foreign key using a plurality of search techniques dynamically determined by said inclusion dependency determination system based on said average step size extracted from said determined dependency characteristic data, and determining a presence of data elements of the candidate foreign key within data elements of the candidate primary key from at least two or more directions along the candidate primary key, while minimizing said disk input and output operations.

2. The method of claim 1, further comprising:

computing number of fetches of said candidate primary key and said candidate foreign key of said each of said determined pairs of said arranged columns from a disk for said determination of said inclusion dependency by said inclusion dependency determination system; and performing one of retention and relinquishment of one or more of said candidate primary key and said candidate foreign key of said each of said determined pairs of said arranged columns in a non-transitory computer readable storage medium of said inclusion dependency determination system by said inclusion dependency determination system based on said computed number of fetches, thereby minimizing said disk input and output operations.

3. The method of claim 1, wherein said determination of said dependency characteristic data comprises computing said average step size of said each of said columns in said pruned target database by said inclusion dependency determination system using said minimum value of said data of said each of said columns, a maximum value of said data of said each of said columns, and a total count of data elements in said each of said columns.

4. The method of claim 1, wherein said dependency characteristic data of said each of said columns further comprises a name of said each of said columns, a data type of said each of said columns, said minimum value of said data of said each of said columns, a maximum value of said data of said each of said columns, a total count of data elements in said each of said columns, a distinct count of said data elements in said each of said columns, a minimum length and a maximum length of said data in said each of said columns, and a null value count of said data of said each of said columns.

5. The method of claim 1, wherein said one or more predefined rules applied to said columns by said inclusion dependency determination system for said arrangement of said columns in said pruned target database comprise:

arranging said columns in an increasing order of said minimum value of said data of said each of said columns, if said minimum value of said data of said each of said columns is unequal to said minimum value of said data of each of other of said columns; and applying tiebreaking rules to pairs of said columns, if said minimum value of said data of a first column of each of said pairs of said columns is equal to said minimum value of said data of a second column of said each of said pairs of said columns.

6. The method of claim 1, wherein said search techniques dynamically determined by said inclusion dependency determination system comprise a binary search, a sequential search, a bidirectional search, and any combination thereof.

7. An inclusion dependency determination system for determining inclusion dependency between a plurality of columns of a plurality of tables in a target database to establish primary key-foreign key relationships among data in said columns with minimized disk input and output operations, said inclusion dependency determination system comprising:

a non-transitory computer readable storage medium configured to store computer program instructions defined by modules of said inclusion dependency determination system; and at least one processor communicatively coupled to said non-transitory computer readable storage medium, said at least one processor configured to execute said computer program instructions defined by said modules of said inclusion dependency determination system, said modules comprising:

a dependency characteristic data determination module for determining dependency characteristic data comprising an average step size of each of said columns in a pruned target database, wherein said target database is pruned based on a characteristic data type, and said data of said columns in said pruned target database is sorted, prior to said determination of said dependency characteristic data;

a column arrangement module for arranging said columns in said pruned target database by applying one or more predefined rules to said columns based on a minimum value of said data of said each of said columns extracted from said determined dependency characteristic data;

a prospective key identification module for determining pairs of said arranged columns that demonstrate a possibility of said inclusion dependency based on said determined dependency characteristic data of said pairs of said arranged columns, wherein said prospective key identification module identifies a first column of each of said determined pairs of said arranged columns as a candidate primary key, and a second column of said each of said determined pairs of said arranged columns as a candidate foreign key; and an inclusion dependency determination module for determining said inclusion dependency between said candidate primary key and said candidate foreign key of said each of said determined pairs of said arranged columns to establish said primary key-foreign key relationships among said data in said columns, by comparing said data of said candidate primary key with said data of said candidate foreign key using a plurality of search techniques dynamically determined based on said average step size extracted from said determined dependency characteristic data, and determining a presence of data elements of the candidate foreign key within data elements of the candidate primary key from at least two or more directions along the candidate primary key, while minimizing said disk input and output operations.

8. The inclusion dependency determination system of claim 7, wherein said modules further comprise a column handler for computing number of fetches of said candidate primary key and said candidate foreign key of said each of said determined pairs of said arranged columns from a disk for said determination of said inclusion dependency by said inclusion dependency determination module, and wherein column handler further performs one of retention and relinquishment of one or more of said candidate primary key and said candidate foreign key of said each of said determined pairs of said arranged columns in said non-transitory computer readable storage medium based on said computed number of fetches, thereby minimizing said disk input and output operations.

9. The inclusion dependency determination system of claim 7, wherein said determination of said dependency characteristic data by said dependency characteristic data determination module comprises computing said average step size of said each of said columns in said pruned target database using said minimum value of said data of said each of said columns, a maximum value of said data of said each of said columns, and a total count of data elements in said each of said columns.

10. The inclusion dependency determination system of claim 7, wherein said dependency characteristic data of said each of said columns further comprises a name of said each of said columns, a data type of said each of said columns, said minimum value of said data of said each of said columns, a maximum value of said data of said each of said columns, a total count of data elements in said each of said columns, a distinct count of said data elements in said each of said columns, a minimum length and a maximum length of said data in said each of said columns, and a null value count of said data of said each of said columns.

11. The inclusion dependency determination system of claim 7, wherein said one or more predefined rules applied to said columns by said column arrangement module for said arrangement of said columns in said pruned target database comprise:
arranging said columns in an increasing order of said minimum value of said data of said each of said columns, if said minimum value of said data of said each of said columns is unequal to said minimum value of said data of each of other of said columns; and
applying tiebreaking rules to pairs of said columns, if said minimum value of said data of a first column of each of said pairs of said columns is equal to said minimum value of said data of a second column of said each of said pairs of said columns.

12. The inclusion dependency determination system of claim 7, wherein said search techniques dynamically determined by said inclusion dependency determination module comprise a binary search, a sequential search, a bidirectional search, and any combination thereof.

13. A non-transitory computer readable storage medium having embodied thereon, computer program codes comprising instructions executable by at least one processor for determining inclusion dependency between a plurality of columns of a plurality of tables in a target database to establish primary key-foreign key relationships among data in said columns with minimized disk input and output operations, said computer program codes comprising:
a first computer program code for determining dependency characteristic data comprising an average step size of each of said columns in a pruned target database, wherein said target database is pruned based on a characteristic data type, and said data of said columns in said pruned target database is sorted, prior to said determination of said dependency characteristic data;
a second computer program code for arranging said columns in said pruned target database by applying one or more predefined rules to said columns based on a minimum value of said data of said each of said columns extracted from said determined dependency characteristic data;
a third computer program code for determining pairs of said arranged columns that demonstrate a possibility of said inclusion dependency based on said determined dependency characteristic data of said pairs of said arranged columns, wherein said third computer program code identifies a first column of each of said determined pairs of said arranged columns as a candidate primary key, and a second column of said each of said determined pairs of said arranged columns as a candidate foreign key; and
a fourth computer program code for determining said inclusion dependency between said candidate primary key and said candidate foreign key of said each of said determined pairs of said arranged columns to establish said primary key-foreign key relationships among said data in said columns, on comparing said data of said candidate primary key with said data of said candidate foreign key using a plurality of search techniques dynamically determined based on said average step size extracted from said determined dependency characteristic data, and determining a presence of data elements of the candidate foreign key within data elements of the candidate primary key from at least two or more directions along the candidate primary key, while minimizing said disk input and output operations.

14. The non-transitory computer readable storage medium of claim 13, wherein said computer program codes further comprise:
a fifth computer program code for computing number of fetches of said candidate primary key and said candidate foreign key of said each of said determined pairs of said arranged columns from a disk for said determination of said inclusion dependency; and
a sixth computer program code for performing one of retention and relinquishment of one or more of said candidate primary key and said candidate foreign key of said each of said determined pairs of said arranged columns in said non-transitory computer readable storage medium based on said computed number of fetches, thereby minimizing said disk input and output operations.

15. The non-transitory computer readable storage medium of claim 13, wherein said first computer program code further comprises a seventh computer program code for computing said average step size of said each of said columns in said pruned target database using said minimum value of said data of said each of said columns, a maximum value of said data of said each of said columns, and a total count of data elements in said each of said columns.

16. The non-transitory computer readable storage medium of claim 13, wherein said dependency characteristic data of said each of said columns further comprises a name of said each of said columns, a data type of said each of said columns, said minimum value of said data of said each of said columns, a maximum value of said data of said each of said columns, a total count of data elements in said each of said columns, a distinct count of said data elements in said each of said columns, a minimum length and a maximum length of said data in said each of said columns, and a null value count of said data of said each of said columns.

17. The non-transitory computer readable storage medium of claim 13, wherein said one or more predefined rules applied to said columns for said arrangement of said columns in said pruned target database by said second computer program code comprises:

arranging said columns in an increasing order of said minimum value of said data of said each of said columns, if said minimum value of said data of said each of said columns is unequal to said minimum value of said data of each of other of said columns; and applying tiebreaking rules to pairs of said columns, if said minimum value of said data of a first column of each of said pairs of said columns is equal to said minimum value of said data of a second column of said each of said pairs of said columns.

18. The non-transitory computer readable storage medium of claim 13, wherein said search techniques dynamically determined by said fourth computer program code comprise a binary search, a sequential search, a bidirectional search, and any combination thereof.

\* \* \* \* \*